US011853927B1

(12) United States Patent
Rackley, III et al.

(10) Patent No.: US 11,853,927 B1
(45) Date of Patent: Dec. 26, 2023

(54) METHOD AND SYSTEM FOR OPTIMIZING EXPERIENCES AND/OR PURCHASES AT LIVE EVENTS THROUGH VIRTUAL ELECTRONIC TICKETS ON A PORTABLE COMPUTING DEVICE (PCD)

(71) Applicant: SOUTHERN EXPERIENCE, LLC, Atlanta, GA (US)

(72) Inventors: Brady L. Rackley, III, Atlanta, GA (US); Ben Ackerman, Atlanta, GA (US); Garrett Langley, Atlanta, GA (US); Matthew Feury, Atlanta, GA (US); Erik Göranson, Atlanta, GA (US); Richard Cabrera, Atlanta, GA (US)

(73) Assignee: SOUTHERN EXPERIENCE, LLC, Atlanta, GA (US)

( * ) Notice: Subject to any disclaimer, the term of this patent is extended or adjusted under 35 U.S.C. 154(b) by 1482 days.

(21) Appl. No.: 15/979,408

(22) Filed: May 14, 2018

Related U.S. Application Data

(63) Continuation of application No. 14/176,029, filed on Feb. 7, 2014, now abandoned, and a continuation-in-part of application No. 13/798,045, filed on Mar. 12, 2013, now abandoned, and a continuation-in-part of application No. 13/611,157, filed on Sep. 12, 2012, now abandoned.

(51) Int. Cl.
*G06Q 10/02* (2012.01)
(52) U.S. Cl.
CPC .................. *G06Q 10/02* (2013.01)

(58) Field of Classification Search
CPC ........................................................ G06Q 10/02
See application file for complete search history.

(56) References Cited

U.S. PATENT DOCUMENTS 7,031,945 B1    4/2006  Donner
7,562,051 B1 *  7/2009  Donner .............. G06Q 20/3674
                                              705/5

(Continued)

OTHER PUBLICATIONS

Marburger, Daniel R. "Optimal ticket pricing for performance goods." Managerial and Decision Economics 18.5 (1997): 375-381. (Year: 1997).*

*Primary Examiner* — Emmett K. Walsh
(74) *Attorney, Agent, or Firm* — Smith Tempel; Steven P. Wigmore

(57) ABSTRACT

A computer implemented method and system includes receiving a request to participate in an electronic seating optimization algorithm and retrieving data about an existing electronic ticket, the data including a location of a seat within a venue. A first list of one or more requests to participate in the electronic seating optimization algorithm may be generated where the first list is ranked in accordance with at least a location of each seat associated with an electronic ticket. Subsequently, a seating optimization algorithm is executed to identify optimal and available seats corresponding to one or more seats from each request to participate. A second list of the one or more requests to participate is generated where the second list is ranked in accordance with the results of the electronic seating optimization algorithm. The location of a seat is then transmitted over a communications network in response to at least one request.

15 Claims, 64 Drawing Sheets

(56) References Cited

U.S. PATENT DOCUMENTS

| | | |
|---|---|---|
| 7,565,328 B1 | 7/2009 | Donner |
| 7,577,620 B1 | 8/2009 | Donner |
| 2003/0036931 A1 | 2/2003 | Maulsby et al. |
| 2003/0069764 A1 | 4/2003 | Gathman et al. |
| 2003/0069789 A1 | 4/2003 | Gathman et al. |
| 2007/0027798 A1* | 2/2007 | Brett .................. G06Q 10/02 705/37 |
| 2007/0244731 A1 | 10/2007 | Barhydt et al. |
| 2008/0052192 A1 | 2/2008 | Fisher |
| 2008/0189207 A1 | 8/2008 | Wurster |
| 2009/0177502 A1 | 7/2009 | Doinoff et al. |
| 2009/0319306 A1 | 12/2009 | Chanick |
| 2010/0145741 A1 | 6/2010 | Carey et al. |
| 2010/0257105 A1 | 10/2010 | Wurster |
| 2011/0282700 A1* | 11/2011 | Cockcroft .............. G06Q 30/06 709/205 |
| 2012/0166231 A1* | 6/2012 | Denker ................ G06Q 30/06 715/810 |

* cited by examiner

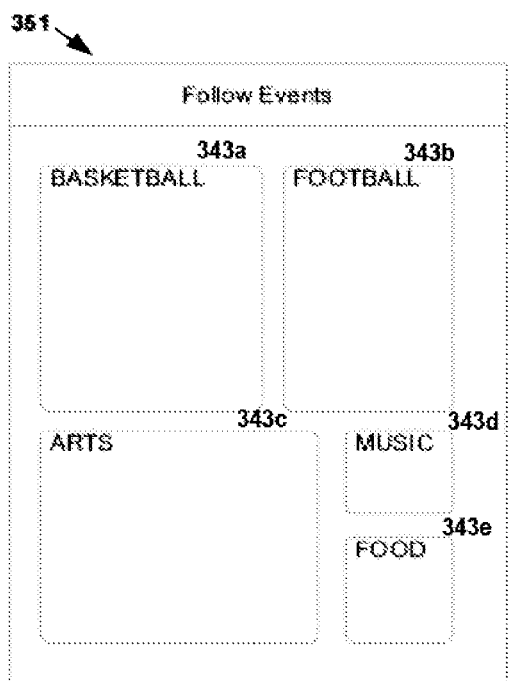
FIG. 3C
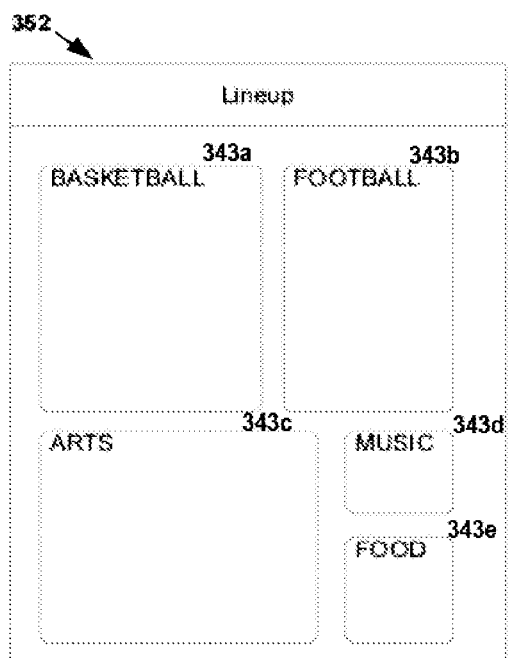
FIG. 3D
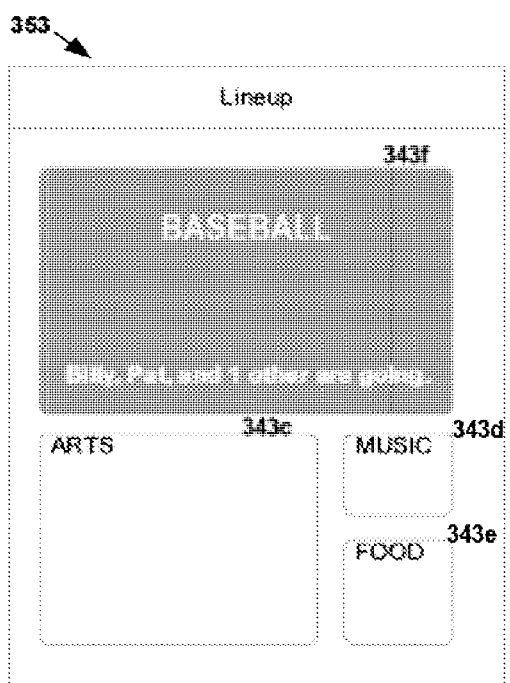
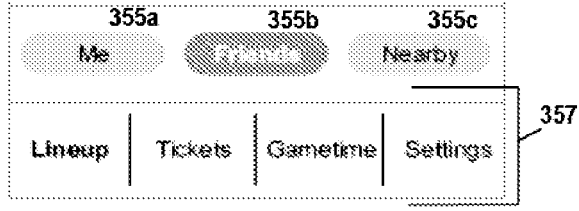
FIG. 3E

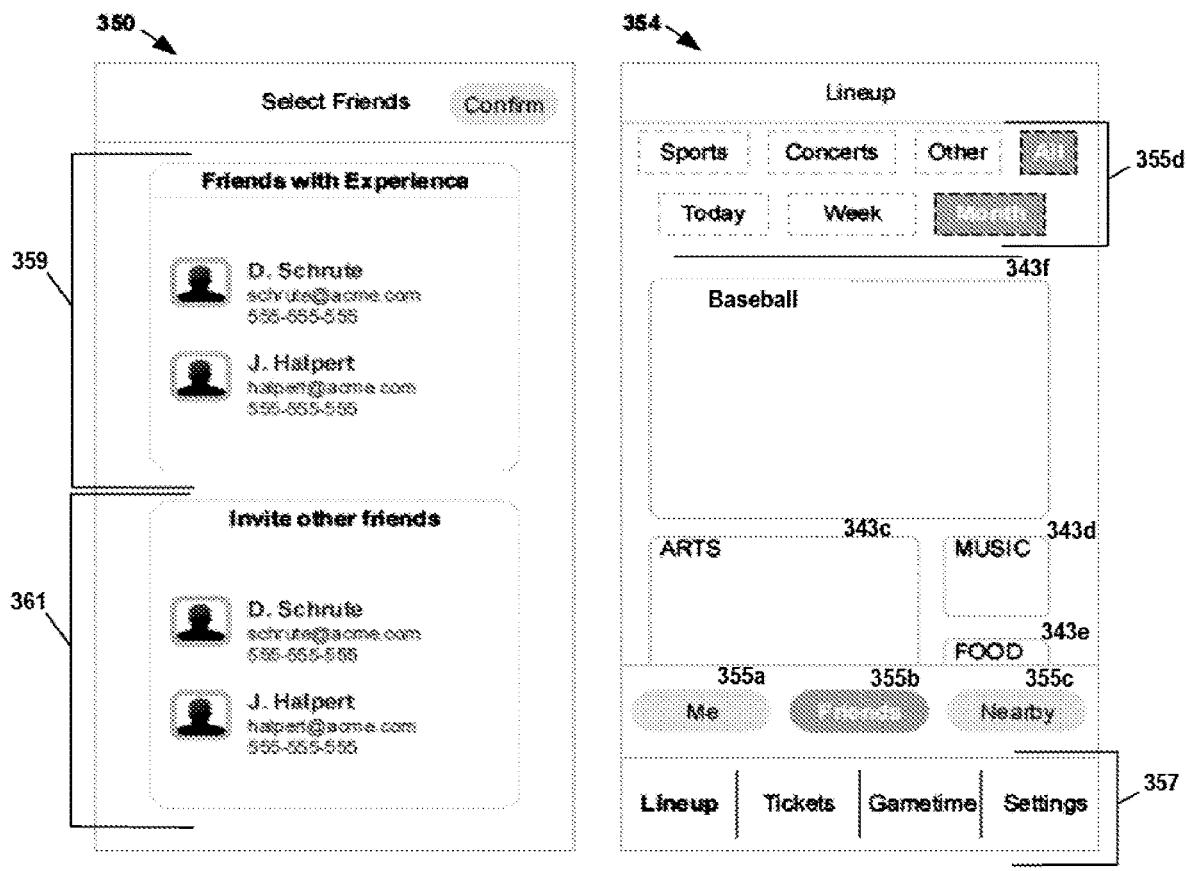
FIG. 3F  FIG. 3G

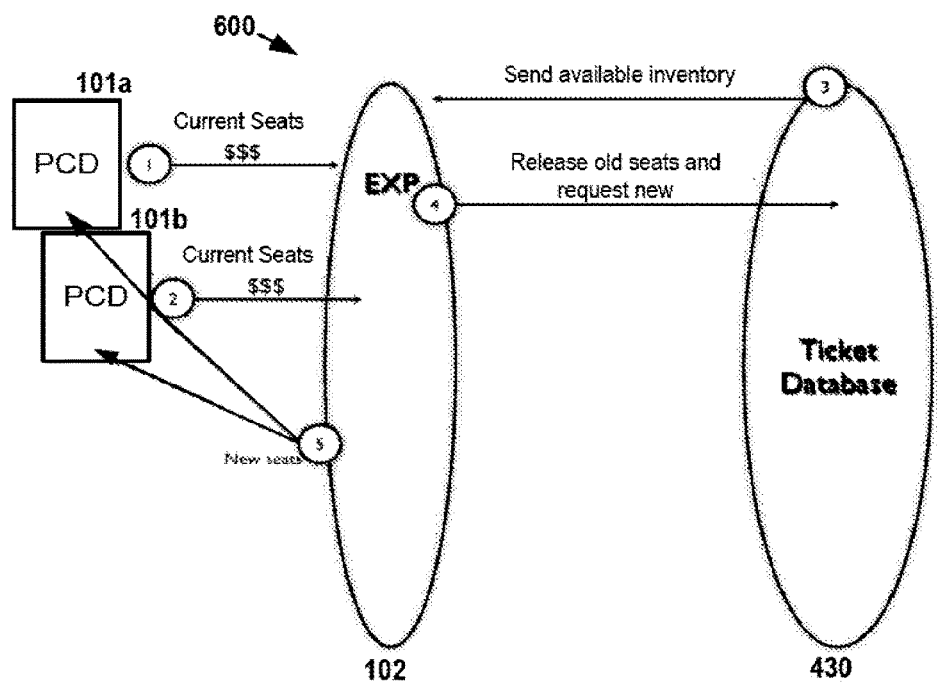

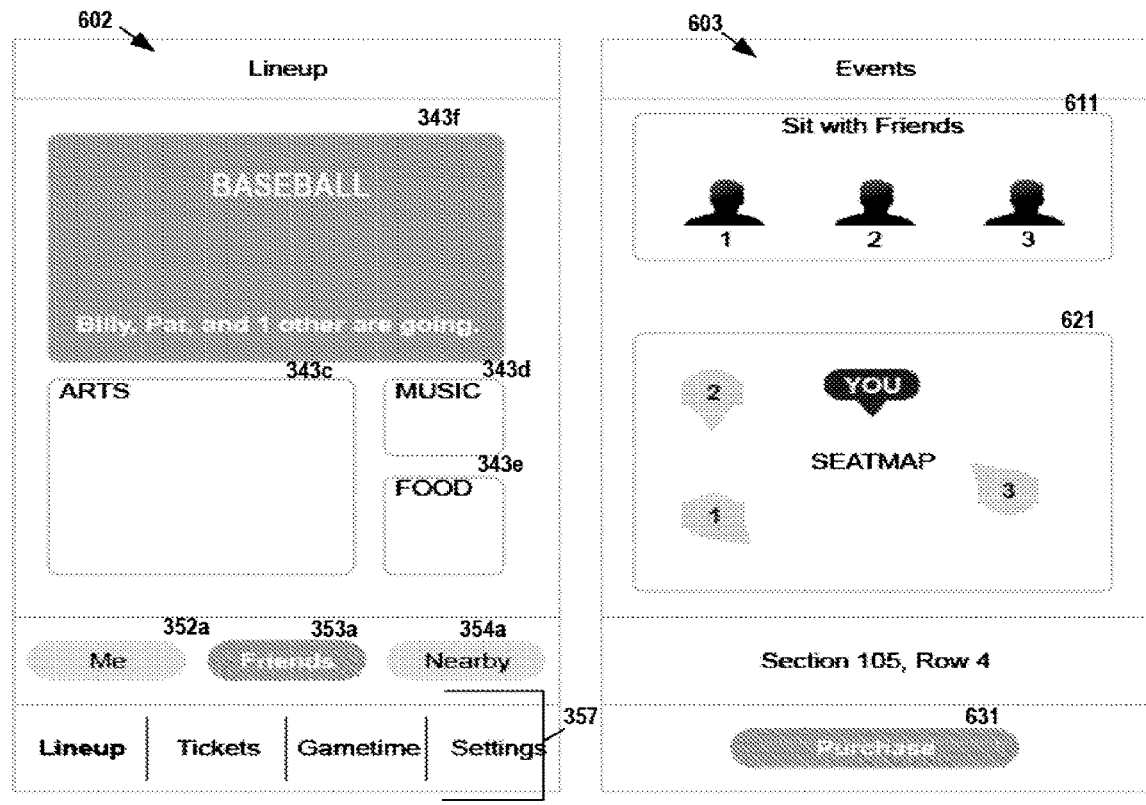
FIG. 6C
FIG. 6D
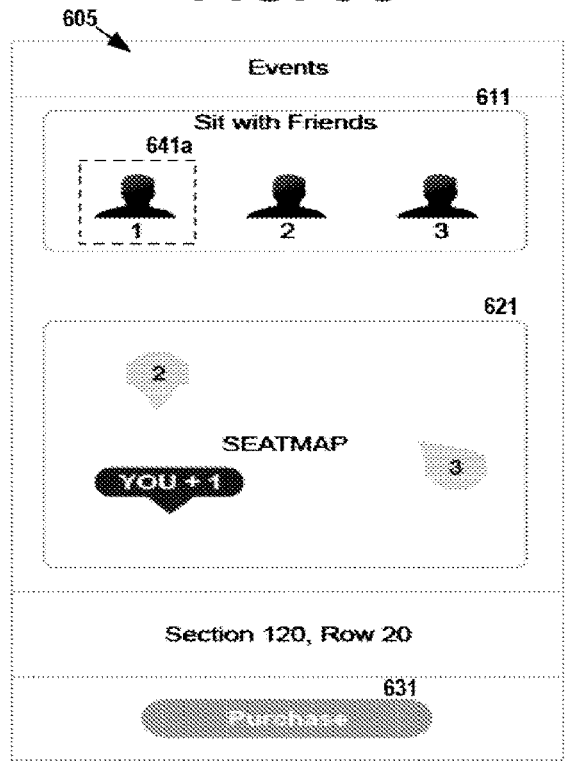
FIG. 6E
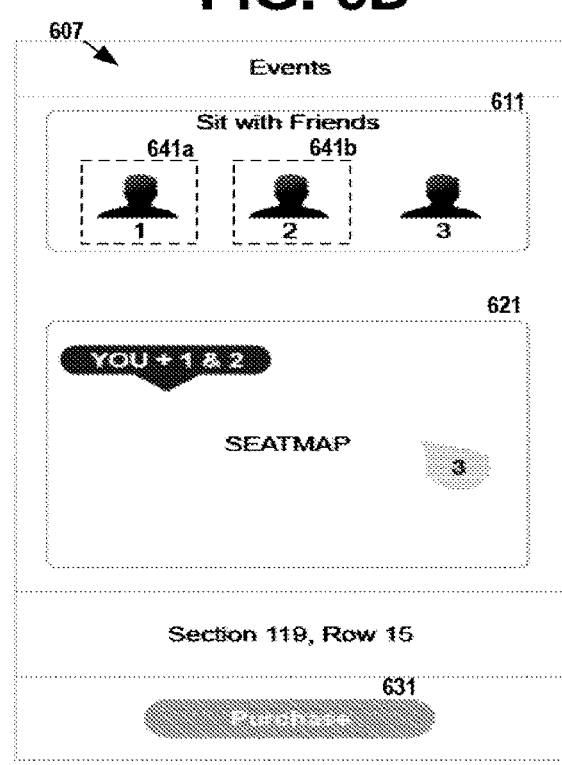
FIG. 6F

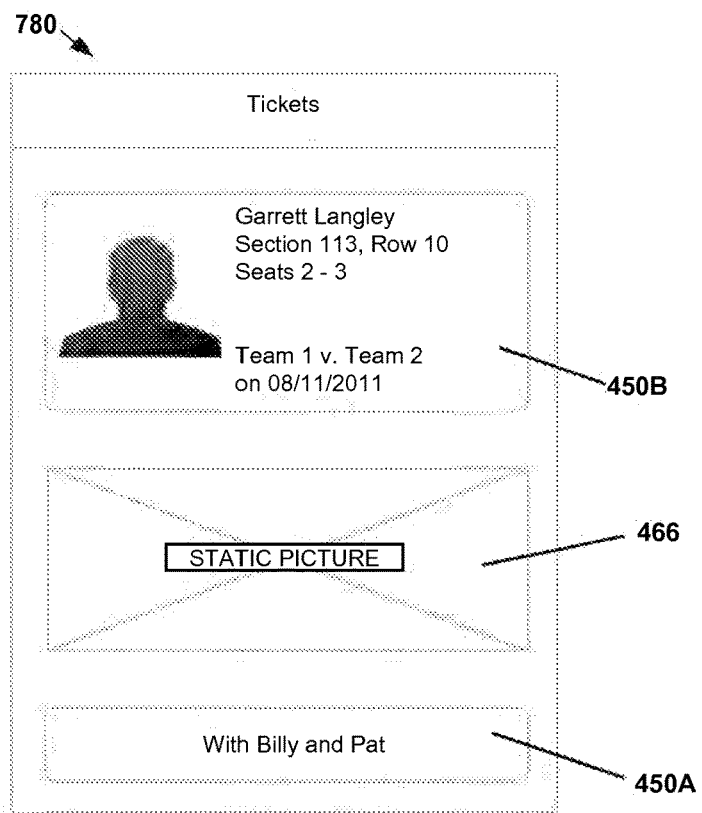
FIG. 7C
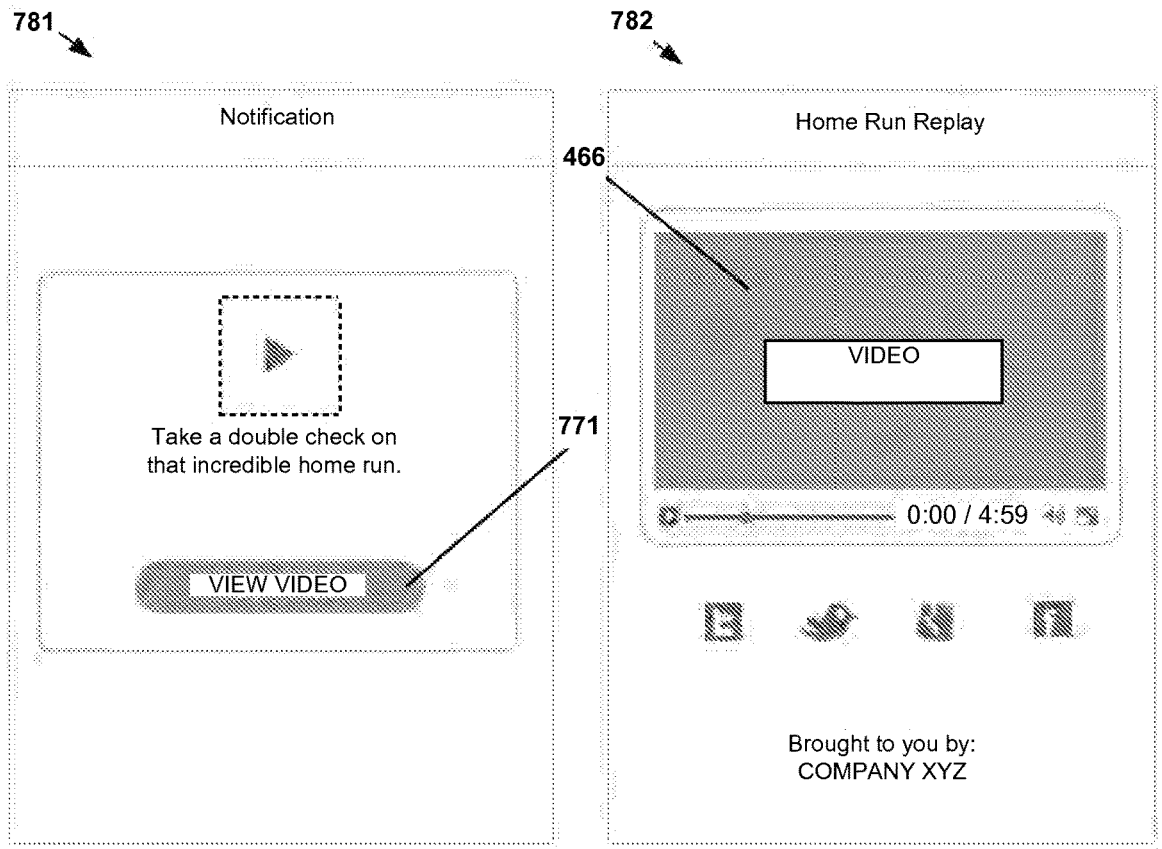
FIG. 7D     FIG. 7E

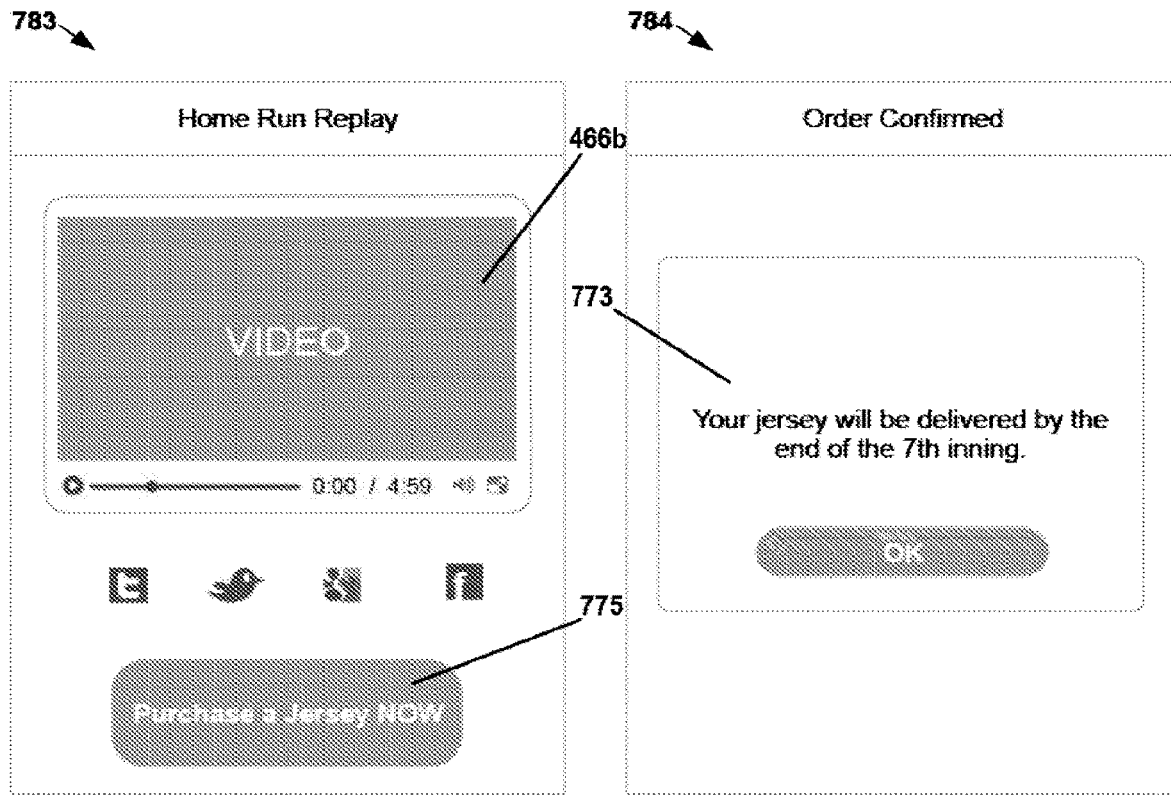
FIG. 7F  FIG. 7G
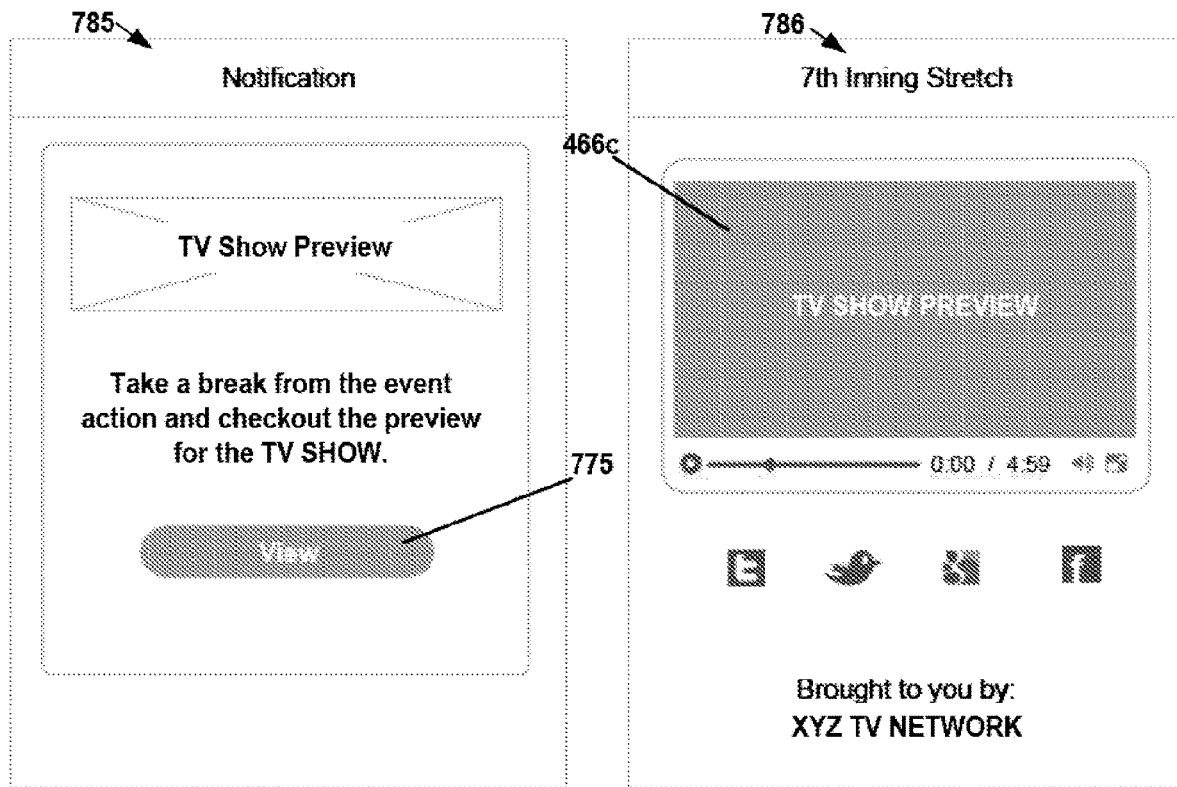
FIG. 7H  FIG. 7I

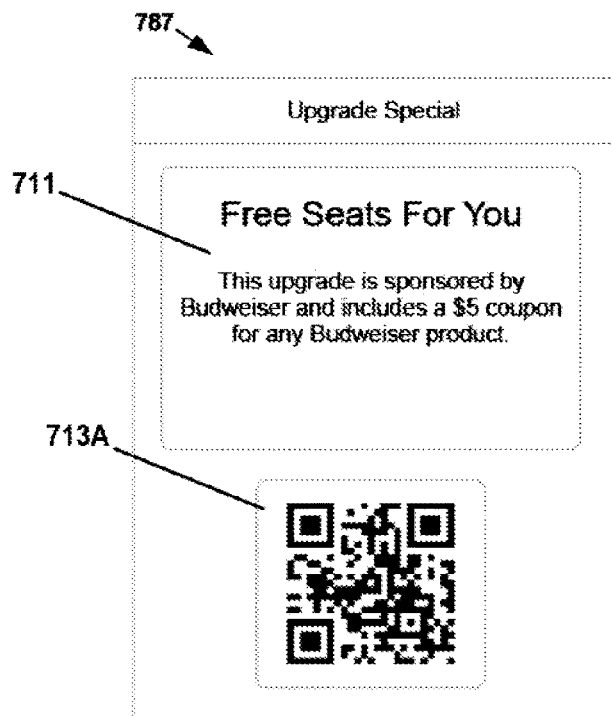
FIG. 7J
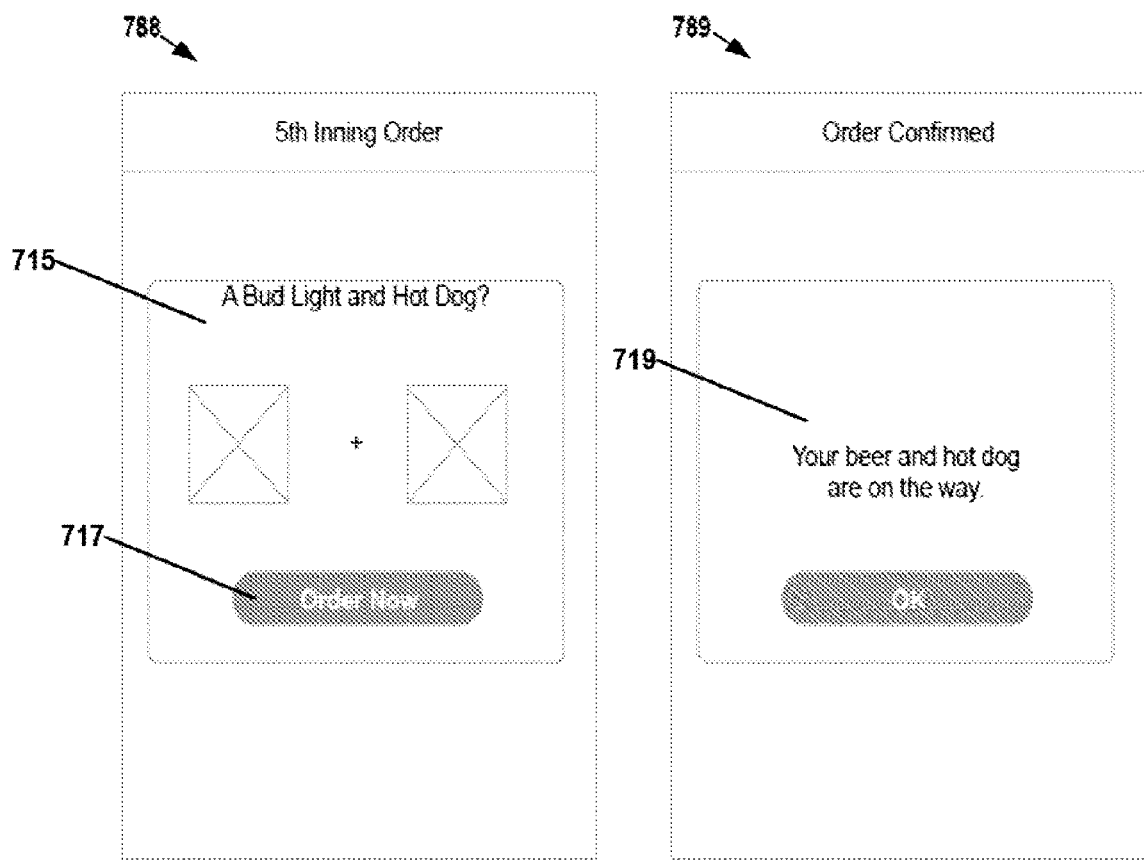
FIG. 7K
FIG. 7L

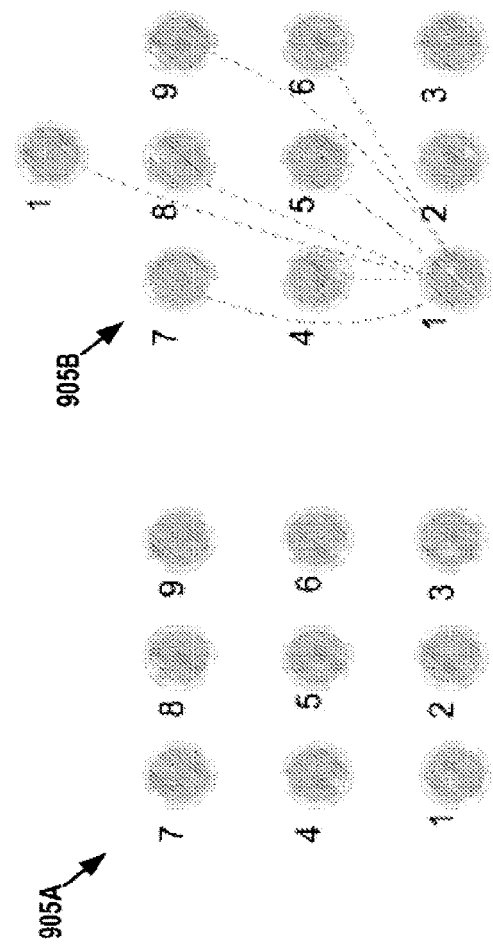
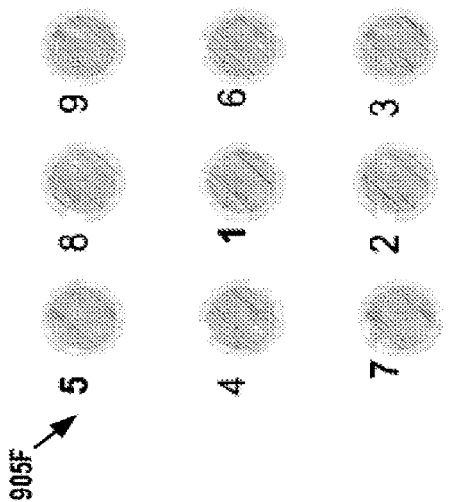
FIG. 9E  FIG. 9F  FIG. 9G
FIG. 9H  FIG. 9I  FIG. 9J

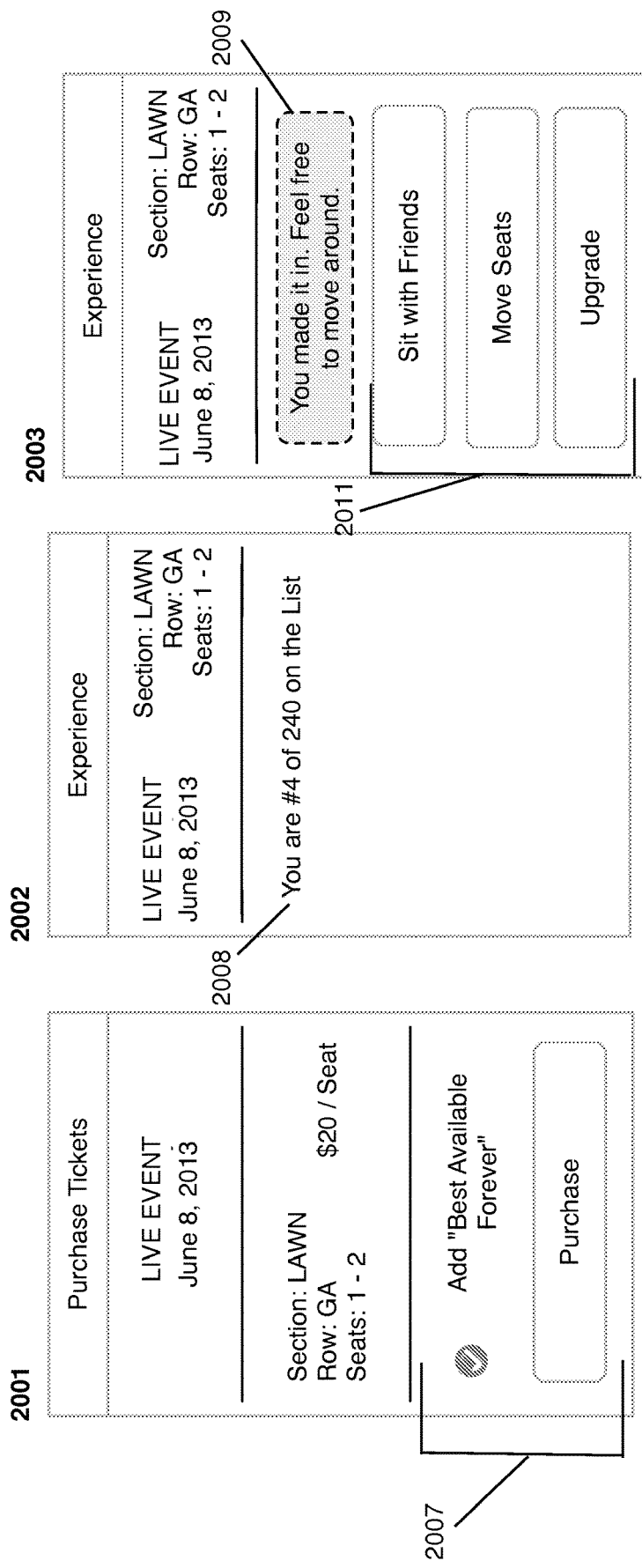

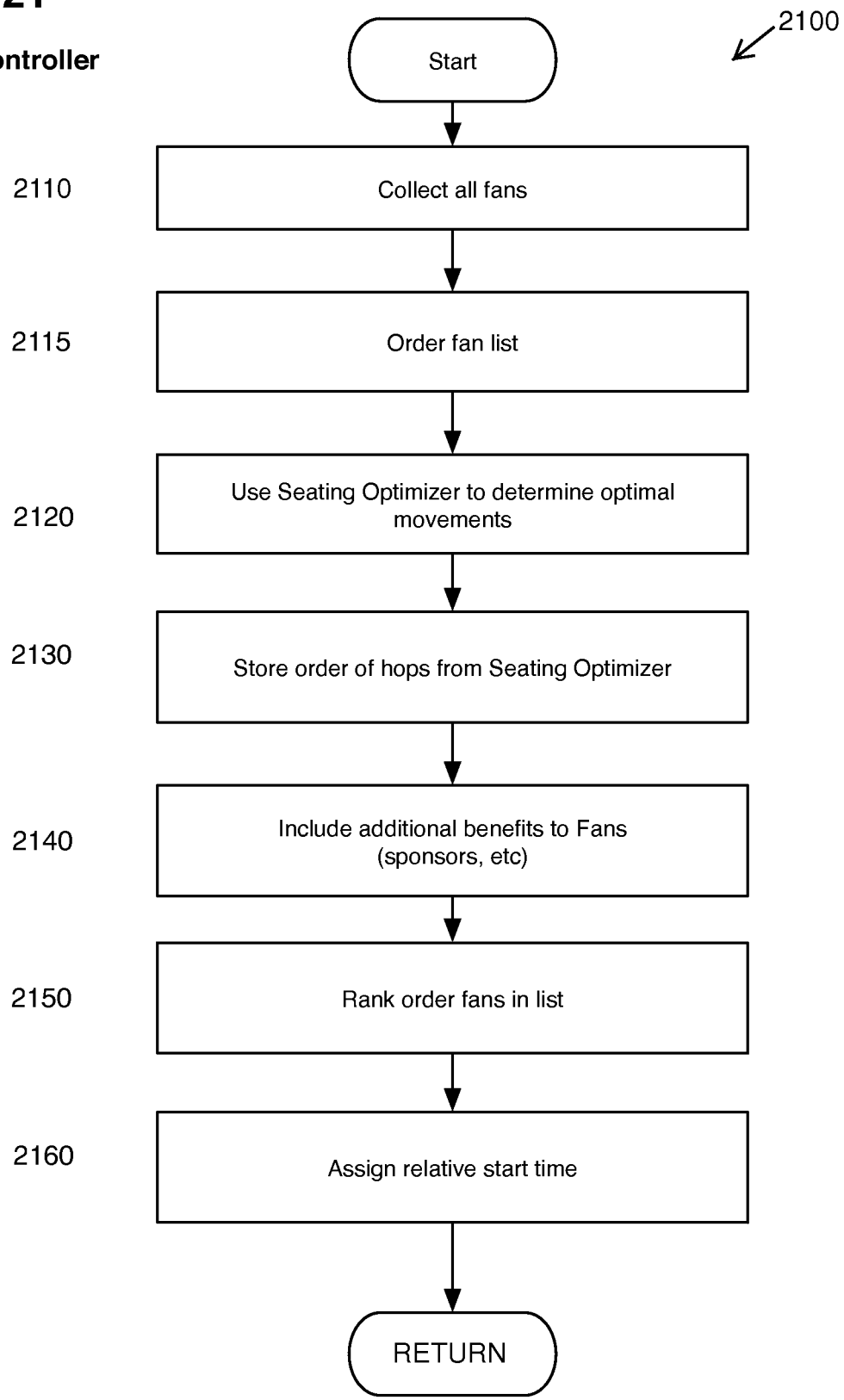

Figure 22A  Secondary Ticketing System Integration  ⟋2200

Sell your tickets on Second Market Exchange.com

Ticket Information

Select the Game ▼

| Seat Section | Seat Row | First Seat | - | Last Seat |

$ Price per ticket

*NEW* Final Offer Information

☑ Change price as game approaches

Time Relative to Game    New Price per Ticket (Optional)

Submit   Cancel

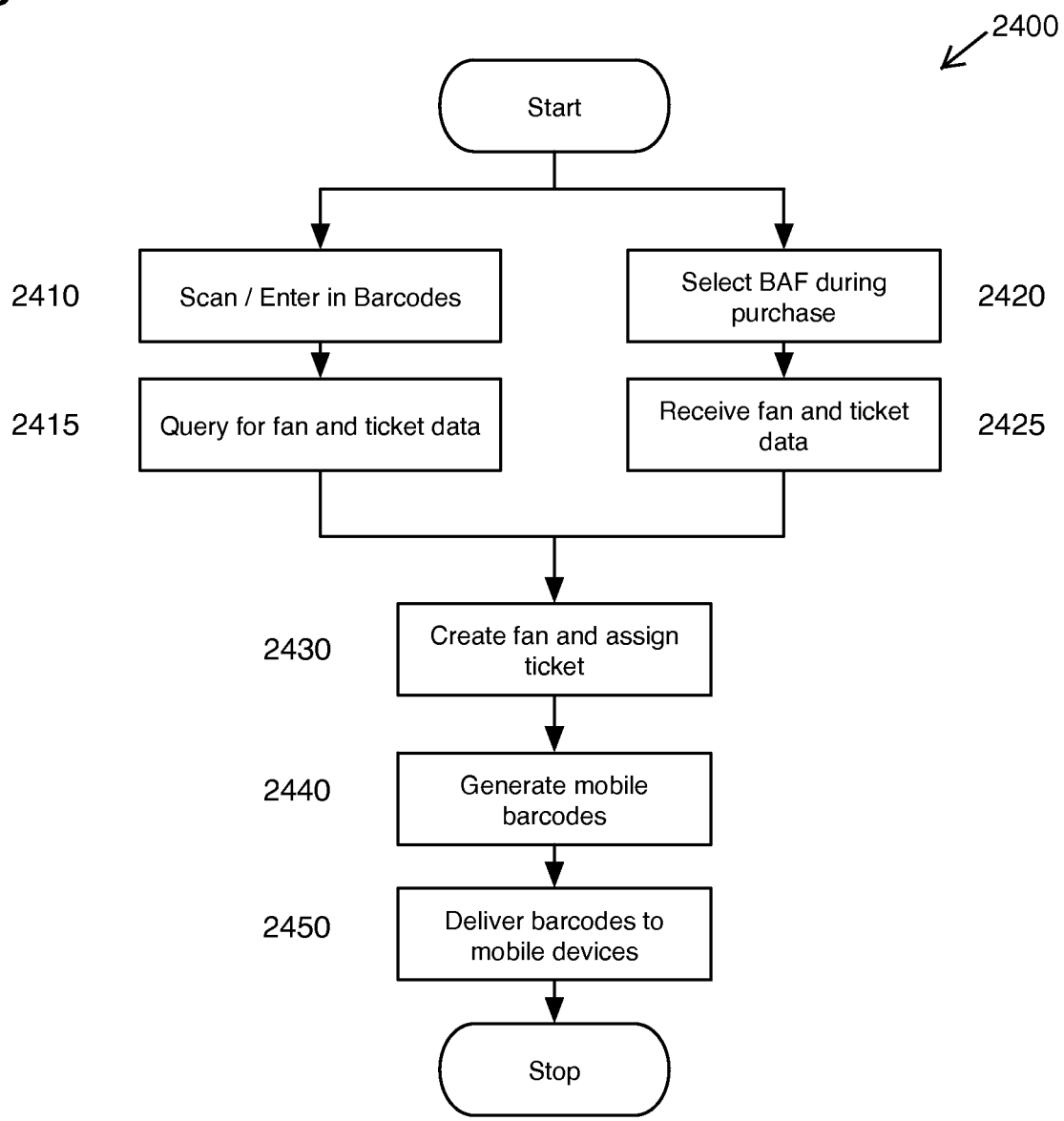
Figure 24 — Turning a paper ticket into a Fluid Ticket

Figure 25     Turning a paper ticket into a Fluid Ticket
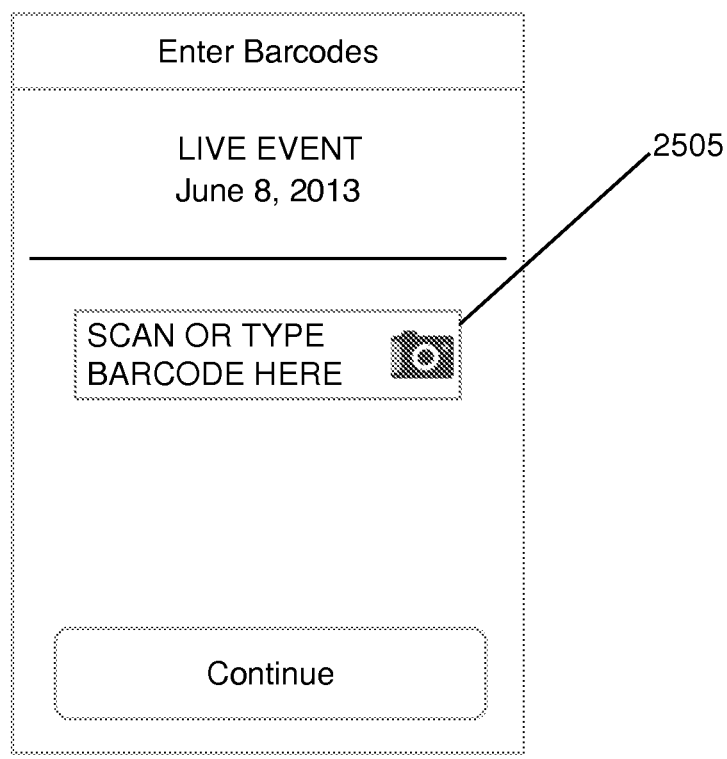

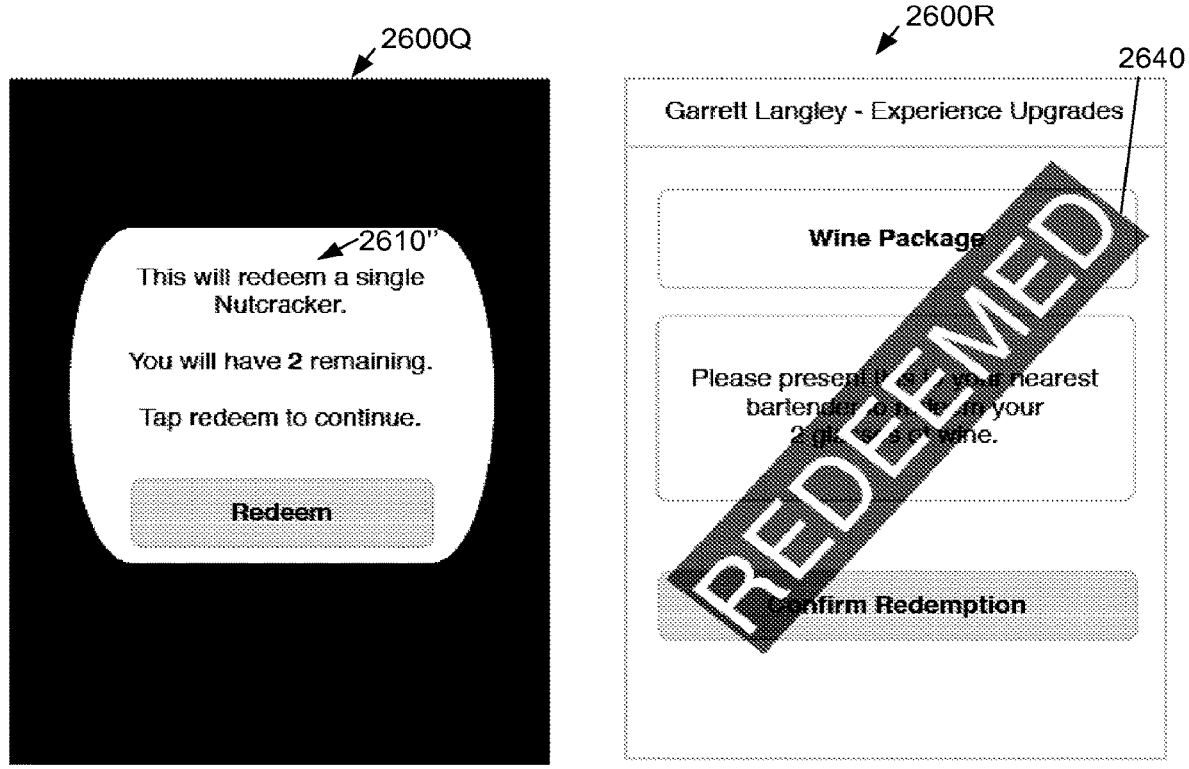
FIGURE 26Q　　FIGURE 26R
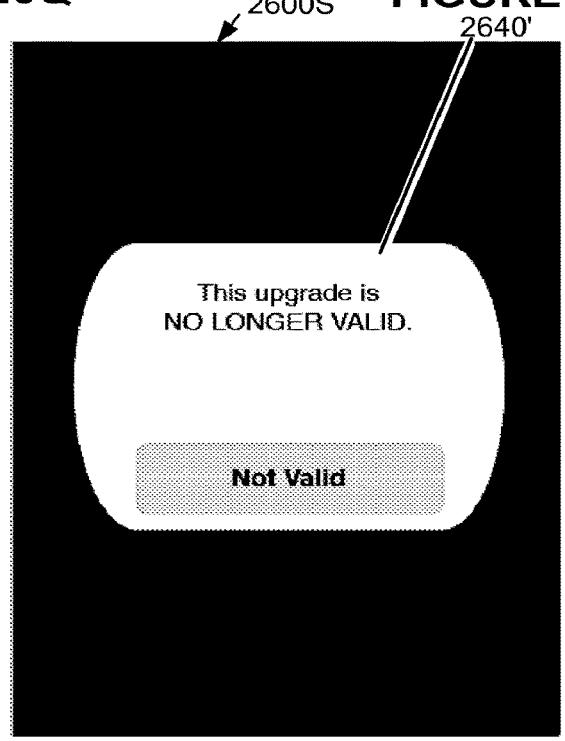
FIGURE 26S

METHOD AND SYSTEM FOR OPTIMIZING EXPERIENCES AND/OR PURCHASES AT LIVE EVENTS THROUGH VIRTUAL ELECTRONIC TICKETS ON A PORTABLE COMPUTING DEVICE (PCD)

BACKGROUND

Live events, like music concerts, stand-up comedy shows, movies, lectures, sporting events such as, but not limited to, professional baseball and football games, have been experiencing declines in ticket sales for years. While there does not appear to exist one single cause for these declines in ticket sales, many surveys of consumers for these live events suggest a myriad of problems/issues that are faced by the consumers of these live events.

One problem faced by consumers is the issue of transportation to these live events. Many consumers enjoy drinking alcoholic beverages at live events. However, drunk driving laws in many jurisdictions, such as those in the United States, have become so strict that a single alcoholic beverage consumed by a person could make that person exceed drinking limits imposed by laws established by state statutes. While such drunk driving laws have helped society in general, they have made it necessary for consumers of live events to assign a designated driver, who does not consume alcoholic beverages, to drive any of the other consumers who desire to consume alcoholic beverages at the live event. The problems many consumers face is finding a person who is willing to be that designated driver for transporting others to a live event.

Another problem connected with transportation to a live event often includes the ability of consumers of live events to travel with friends. There have not been any systems established for helping consumers of live events who live in different geographic places to travel with each other to a live event.

Another problem faced by consumers at live events is the ability to sit with friends who may be present at the live event. There have not been any systems established that help consumers of live events to coordinate seating among friends when all of the friends have arrived at the live event.

Another problem faced by both consumers of live events and sellers of live events are ticket upgrades and/or ticket changes. Often, dozens, if not hundreds of seats at a live event, may be vacant and available for purchase. But here has not been any systems established to help consumers who show up at these live events to upgrade their seats to better venues or to provide incentives to sell these vacant seats to the consumers who show and who may have less desirable seats.

What is needed is a method and system which addresses these numerous and often complex problems faced by consumers of live events.

BRIEF SUMMARY

A computer implemented method and system includes receiving a request to participate in an electronic seating optimization algorithm and retrieving data about an existing electronic ticket, the data including a location of a seat within a venue. A first list of one or more requests to participate in the electronic seating optimization algorithm may be generated where the first list is ranked in accordance with at least a location of each seat associated with an electronic ticket. Subsequently, a seating optimization algorithm is executed to identify optimal and available seats corresponding to one or more seats from each request to participate. A second list of the one or more requests to participate is generated where the second list is ranked in accordance with the results of the electronic seating optimization algorithm. The location of a seat is then transmitted over a communications network in response to at least one request.

According to another exemplary aspect, the method and system for providing an electronic ticket may include receiving a request for at least one of purchasing and redeeming a service or product. Next, a message that comprises data for a mobile validation screen may be generated. Input for validating the purchase or redemption may be received. Subsequently, it may be determined if an account associated with a portable computing device has a sufficient threshold for completing the purchase or redemption. And if the account has a sufficient threshold, then a positive validation is displayed that comprises a unique identifier for completing the purchase or redemption. The unique identifier for completing the purchase or redemption may include at least one of a modal dialog box with alphanumeric text, a modal dialog box with graphics, and a security validation mechanism.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE SEVERAL VIEWS OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all Figures.

FIG. 3C illustrates a graphical user interface of a portable computing device that displays options for events that may use portable computing device tickets according to one exemplary embodiment.

FIG. 3D illustrates a graphical user interface of a portable computing device that displays options for events that have been filtered according to preferences of the operator of the portable computing device according to one exemplary embodiment.

FIG. 3E illustrates a graphical user interface of a portable computing device that displays friends relative to the operator of the portable computing device may be attending events of interest for the operator of the portable computing device according to one exemplary embodiment.

FIG. 3F illustrates a graphical user interface of a portable computing device that displays a listing of friends that may be selected for inviting to one or more events according to one exemplary embodiment.

FIG. 3G illustrates a graphical user interface of a portable computing device that displays events according to options selected from a filtering mechanism according to one exemplary embodiment.

FIG. 5G illustrates a graphical user interface of a portable computing device that displays options for pricing of an upgrade according to one exemplary embodiment.

FIG. 5H illustrates a graphical user interface of a portable computing device that displays an upgraded portable computing device ticket according to one exemplary embodiment.

FIG. 6A illustrates a system for coordinating seating among friends using portable computing device tickets according to one exemplary embodiment.

FIG. 6C illustrates a graphical user interface of a portable computing device that displays a list of options that includes an option for sitting with friends at a live event according to one exemplary embodiment.

FIG. 6D illustrates a graphical user interface of a portable computing device that displays a list of friends who are currently attending a live event and who are not seated next to the operator of the portable computing device according to one exemplary embodiment.

FIG. 6E illustrates a graphical user interface of a portable computing device that displays a seat map of available seats based on a first number of friends selected by the operator of the portable computing device according to one exemplary embodiment.

FIG. 6F illustrates a graphical user interface of a portal computing device that displays a seat map of available seats based on a second number of friends selected by the operator of the portable computing device according to one exemplary embodiment.

FIG. 7C illustrates a graphical user interface of a portable computing device that displays an electronic or portable computing device ticket according to one exemplary embodiment.

FIG. 7D illustrates a graphical user interface of a portable computing device that displays an option for viewing a video that has captured a portion of a live event according to one exemplary embodiment.

FIG. 7E illustrates a graphical user interface of a portable computing device that displays a video in response to the option selected in FIG. 7D according to one exemplary embodiment.

FIG. 7F illustrates a graphical user interface of a portable computing device that displays an option for purchasing an item associated with the video which was just viewed by the operator of the portable computing device according to one exemplary embodiment.

FIG. 7G illustrates a graphical user interface of a portable computing device that displays a confirmation message in response to the option selected in FIG. 7F according to one exemplary embodiment.

FIG. 7H-7I illustrate a graphical user interface of a portable computing device that displays a video of a segment not associated with the live event according to one exemplary embodiment.

FIG. 7J illustrates a graphical user interface of a portal computing device that displays a seat upgrade and prepaid value sponsored by an advertiser according to one exemplary embodiment.

FIG. 7K illustrates a graphical user interface of a portable computing device that displays an option for ordering from a concession stand at a live event according to one exemplary embodiment.

FIG. 7L illustrates a graphical user interface of a portable computing device that displays a confirmation of the concession order placed in response to the option selected in FIG. 7K according to one exemplary embodiment.

FIG. 9E is a diagram that illustrates one step for determining an optimal arrangement of seats for operators of portable computing devices attending a live event according to one exemplary embodiment.

FIG. 9F is a diagram that illustrates a subsequent step relative to FIG. 9E for determining an optimal arrangement of seats for operators of portable computing devices attending a live event according to one exemplary embodiment.

FIG. 9G is a diagram that illustrates a subsequent step relative to FIG. 9F for determining an optimal arrangement of seats for operators of portable computing devices attending a live event according to one exemplary embodiment.

FIG. 9H is a diagram that illustrates a subsequent step relative to FIG. 9G for determining an optimal arrangement of seats for operators of portable computing devices attending a live event according to one exemplary embodiment.

FIG. 9I is a diagram that illustrates a subsequent step relative to FIG. 9H for determining an optimal arrangement of seats for operators of portable computing devices attending a live event according to one exemplary embodiment.

FIG. 9J is a diagram that illustrates a subsequent step relative to FIG. 9I for determining an optimal arrangement of seats for operators of portable computing devices attending a live event according to one exemplary embodiment.

FIGS. 20A-20F are exemplary screen displays of software running on a portable computing device for purchasing a BEST AVAILABLE FOREVER™ optimized ticket.

FIG. 21 is a logic flow diagram illustrating the ranking of fans for access into the system of FIG. 23.

FIG. 22A is an exemplary screen display of software running on a computing device or mobile computing device for selling tickets on a secondary market and enabling a new price point for after the secondary market closes.

FIG. 24 is a logic flow diagram illustrating the importing of a paper or digital ticket into the system of FIG. 23.

FIG. 25 is an exemplary screen display of software running on a portable computing device for importing a paper or digital ticket into the system.

FIGS. 26P-26Q illustrate exemplary graphical user interfaces of an exemplary portable computing device after a redemption mechanism 2605 has been activated.

FIGS. 26R-26S illustrate exemplary graphical user interfaces of an exemplary portable computing device after a redemption mechanism has been activated and after redemption of an upgrade has been made, such as tapping the on-screen button for confirming upgrades as illustrated in FIGS. 26P-Q.

DETAILED DESCRIPTION

Figure 1A:
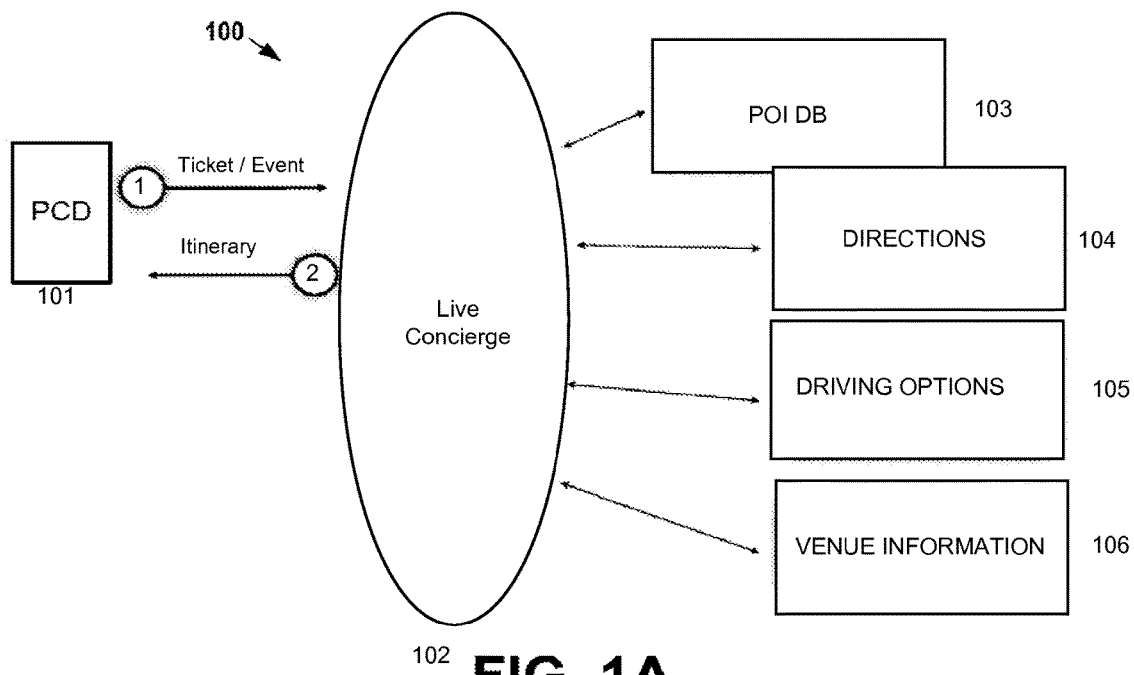
FIG. 1A illustrates a system for improving experiences at one or more venues that use portable computing device tickets according to one exemplary embodiment.

Aspects, features and advantages of several exemplary embodiments of the present invention will become better understood with regard to the following description in connection with the accompanying drawing(s). It should be apparent to those skilled in the art that the described embodiments of the present invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. Hence, use of absolute terms such as, for example, "will," "will not," "shall," "shall not," "must" and "must not" are not meant to limit the scope of the present invention as the embodiments disclosed herein are merely exemplary.

The word "exemplary" is used herein to mean "serving as an example, instance, or illustration." Any aspect described herein as "exemplary" is not necessarily to be construed as exclusive, preferred or advantageous over other aspects.

The word "fan", "operator", and "user" may be used interchangeably in this description. These terms usually refer to a person operating a portable computing device at a live event and who desires to manage seat assignments electronically at the live event with the portable computing device.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

As used in this description, the terms "component," "database," "module," "system," "processing component" and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers.

In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet and/or a telecommunications network with other systems by way of the signal).

FIG. 1A illustrates a system 100 for improving experiences at one or more venues that use portable computing device tickets according to one exemplary embodiment. The system 100 and its corresponding method 111 (See FIG. 1B) are designed to remove the "pain" points of live events and increase attendance. From deciding where to go, whom to go with, how to get there, the experience at the event, and what do after, this system 100 and method 111 enhances experiences at a live event.

The system 100 may comprise a portable computing device 101, a computer server 102 characterized as a "Live Concierge," a point of interest database 103, a directions database 104, a driving options database 105, and a venue information database 106. The computer server 102 and each of the databases 102-106 may comprise hardware and software as described in further detail in FIG. 12A described in detail below.

Figure 12A:
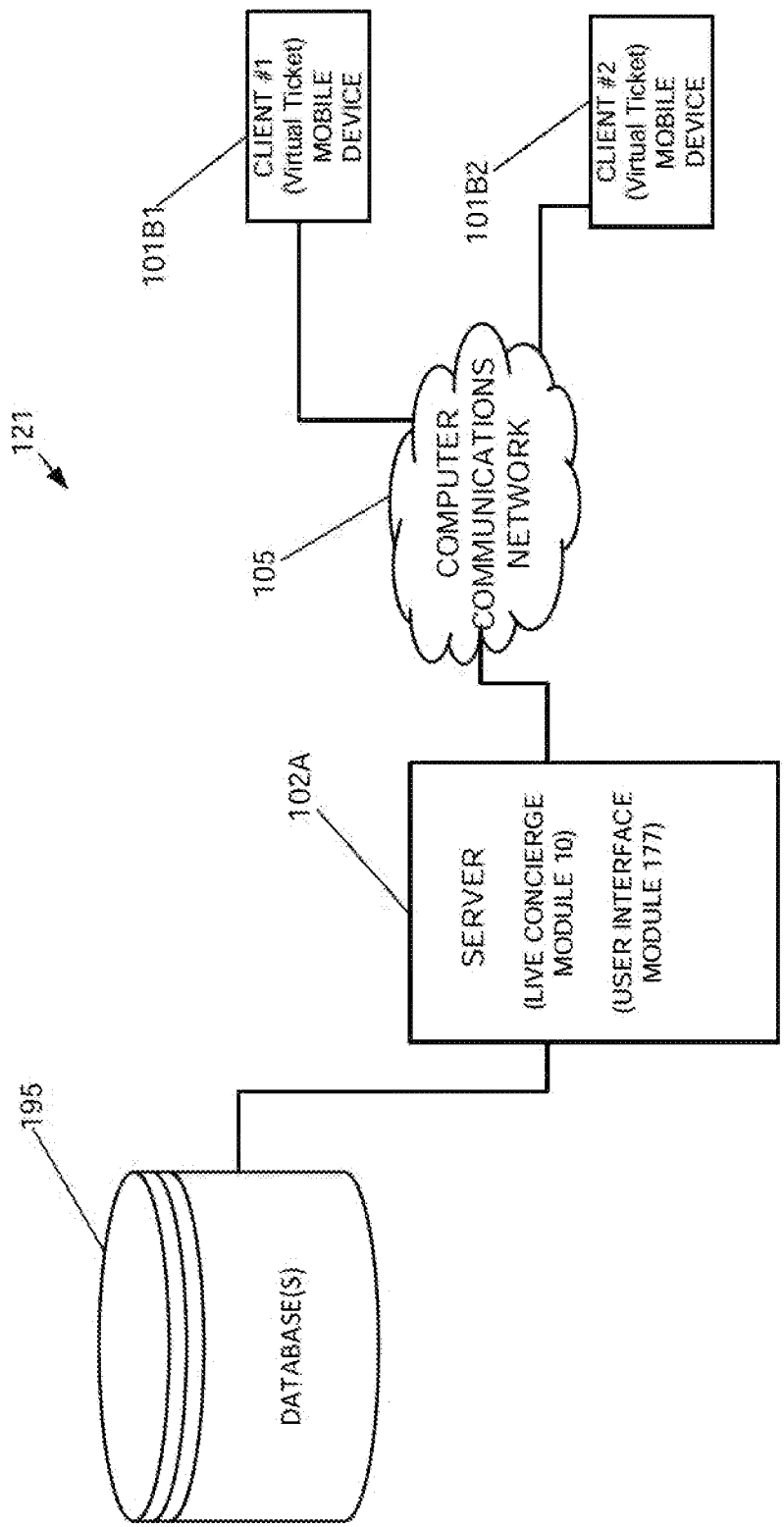
FIG. 12A illustrates an exemplary computer system for improving experiences at one or more venues that use portable computing device tickets according to one exemplary embodiment.

As illustrated in FIG. 1A, a portable computing device 101 may communicate with the server 102 over a wireless communications network 105 (such as WiFi or 3G—not illustrated in FIG. 1A but see FIG. 12A). A portable computing device ("PCD") 101 may comprise any type of hand-held device operating on a limited capacity power supply, such as a battery. Although battery operated PCDs have been in use for decades, technological advances in rechargeable batteries coupled with the advent of third generation ("3G") and fourth generation ("4G") wireless technology, have enabled numerous PCDs with multiple capabilities. Therefore, a PCD may be a cellular telephone, a satellite telephone, a pager, a personal digital assistant ("PDA"), a smartphone, a navigation device, a smartbook or reader, a media player, a combination of the aforementioned devices, a laptop computer with a wireless connection, a tablet Portable Computer ("PC"), among others.

The live concierge server 102 may have the ability to communicate over the Internet with other database servers 103, 104, 105, 106 and aggregate information from those database servers. While the system 100 is designed to manage electronic or portable computing device tickets, the system 100 may also support traditional "physical" tickets by capturing the data which may be contained by a physical ticket. FIG. 1A is illustrates one way a PCD 101 may transmit ticket information by either manual key entry or taking a picture of a physical ticket and the server 102 later performing optical character recognition ("OCR") for the picture and transmitting the information to another server. If the operator of the PCD 101 as an electronic or portable computing device ticket, then he or she may transmit this ticket directly to the server 102. Other ways of transmitting a ticket as understood by one of ordinary skill in the art are included within the scope of the system.

The operator of the portable computing device 101 may decide to transmit his or her ticket to a live event to the live concierge server 102 so that the server 102 may provide the operator with additional information about the live event as well as various options that may be selected by the operator in connection with the live event. The live concierge server 102 may provide additional information, such as, but not limited to: transportation options, additional live events that may be related to the live event listed on the ticket, options for upgrading the ticket, options for coordinating seating among friends at the live event, advertisements associated with goods and/or services associated with the live event, options for selling the ticket, options for optimizing available seating at the live event, and options for selecting unused seats available at the live event.

In addition, the system 100 may retrieve information about other points of interest (POI) from database ("DB") 103, calculate optimal driving directions from the directions database 104 and other driving options from the driving options database 105, described in further detail below in connection with FIG. 2A. In addition, the server 102 using information about the venue acquired from the venue database 106 may recommend what time to arrive to a specific venue. As the server 102 retrieves the vast amount of information from servers/databases 103-106, the server 102 then aggregates the information and sends it down to the PCD 101 over a wireless network. The operator of the PCD 101 is then able to view and save the itinerary from the server 102 in memory within the PCD 101.

Figure 1B:
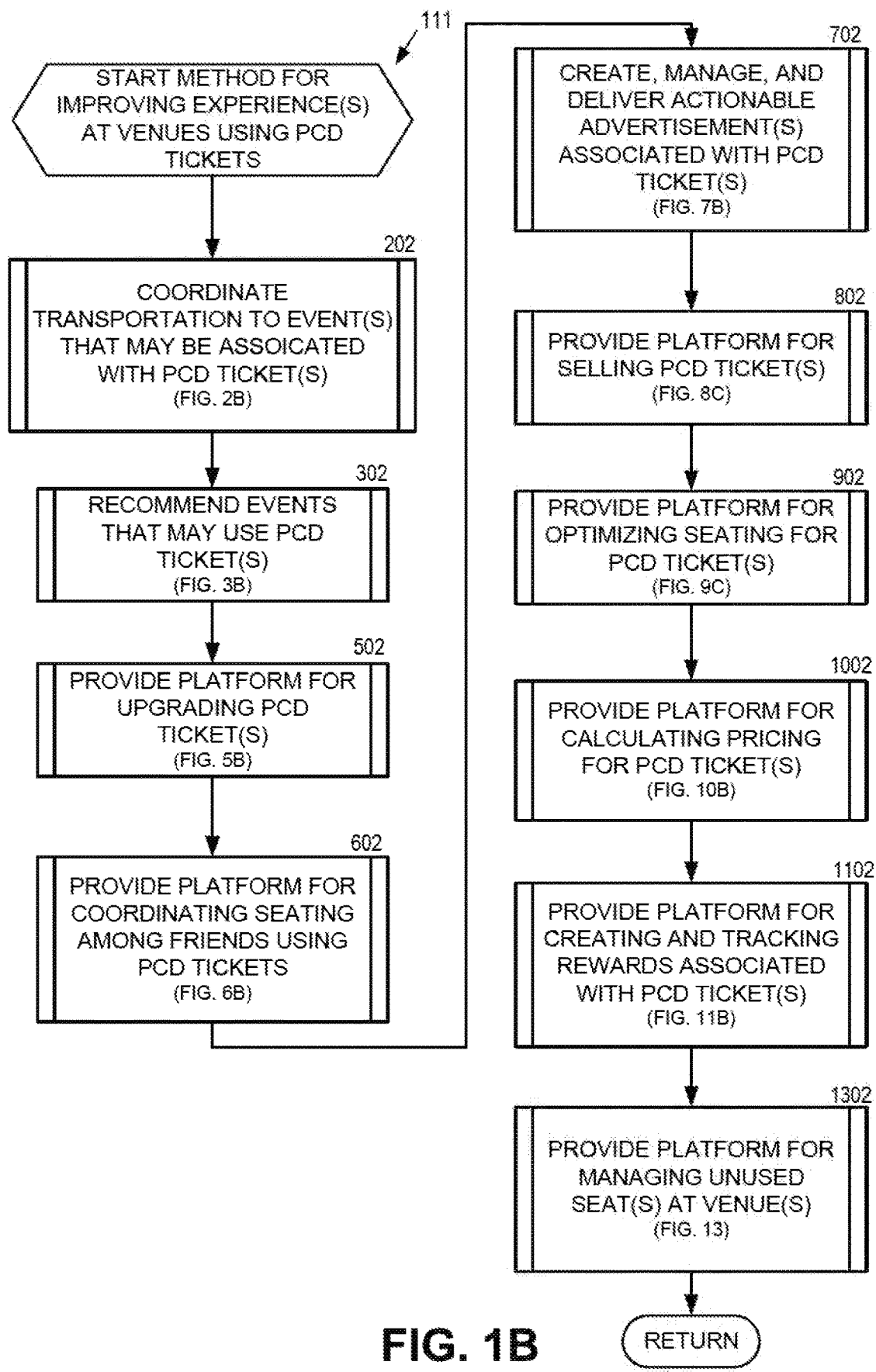
FIG. 1B is a logical flow chart illustrating a method for improving experiences at one or more venues that use portable computing device tickets according to one exemplary embodiment.

FIG. 1B is a logical flow chart illustrating a method 111 for improving experiences at one or more venues that use portable computing device tickets and/or conventional physical tickets according to one exemplary embodiment. The method 111 may comprise various submethods or routines as will be described below. Routine or submethod block 202 is the first step in method 111.

In routine block 202, a server 202 may coordinate transportation to live events that may be associated with one or more portable computing device tickets and/or conventional types of physical tickets. Further details about this routine block 202 will be described below in connection with FIG. 2B.

Next, in routine block 302, the server 102 of FIG. 1A may recommend other live events available for purchase that may be associated with a ticket currently held by the operator of the portable computing device ("PCD") 101. This association with the ticket may be determined by the server 102 based on one or more rules. The rules may relate to preferences of the operator of the PCD 101. The rules may also based on geography and timing corresponding to the live event in which the operator of the PCD 101 as a ticket. Further details of this routine block 302 will be described below in connection with FIG. 3B.

Subsequently, in routine block 502, a server 102 may provide options for upgrading a portable computing device ticket or a conventional physical ticket. Further details about this routine block 502 will be described below in connection with FIG. 5B.

In routine block 602, the server 102 may coordinate seating among friends relative to the operator of the PCD 101. Further details of this routine block 602 will be described below in connection with FIG. 6B.

Next, in routine block 702, the server 102 may create, manage, and deliver actionable advertisements associated with a live event and a portable computing device ticket or a traditional ticket that has been uploaded by the operator of the portable computing device 101. Further details of this routine block 702 will be described below in connection with FIG. 7B.

In routine block 802, the server 102 may provide a platform for selling one or more tickets held by the operator of the PCD 101. Further details of this routine block 802 will be described below in connection with FIG. 8C.

Next, in routine block 902, the server 102 may optimize seating for an operator of a PCD 101 who is holding a portable computing device or a conventional physical ticket to a live event. Further details of this routine block 902 will be described below in connection with FIG. 9C.

In routine block 1002, the server 102 may calculate pricing for available tickets of a live event. Further details of this routine block 1002 will be described below in connection with FIG. 10B.

Subsequently, in block 1102, a server 102 may provide a platform for creating and tracking rewards associated with portable computing device tickets or tickets that have been uploaded by an operator of a PCD 101. Further details of this routine block 1102 will be described below in connection with FIG. 11B.

And in block 1302, the server 102 may provide a platform for managing unused seats of a live event. After this routine block 1302, the method 111 may return to the first routine block 202 and start over again.

Figure 1C:
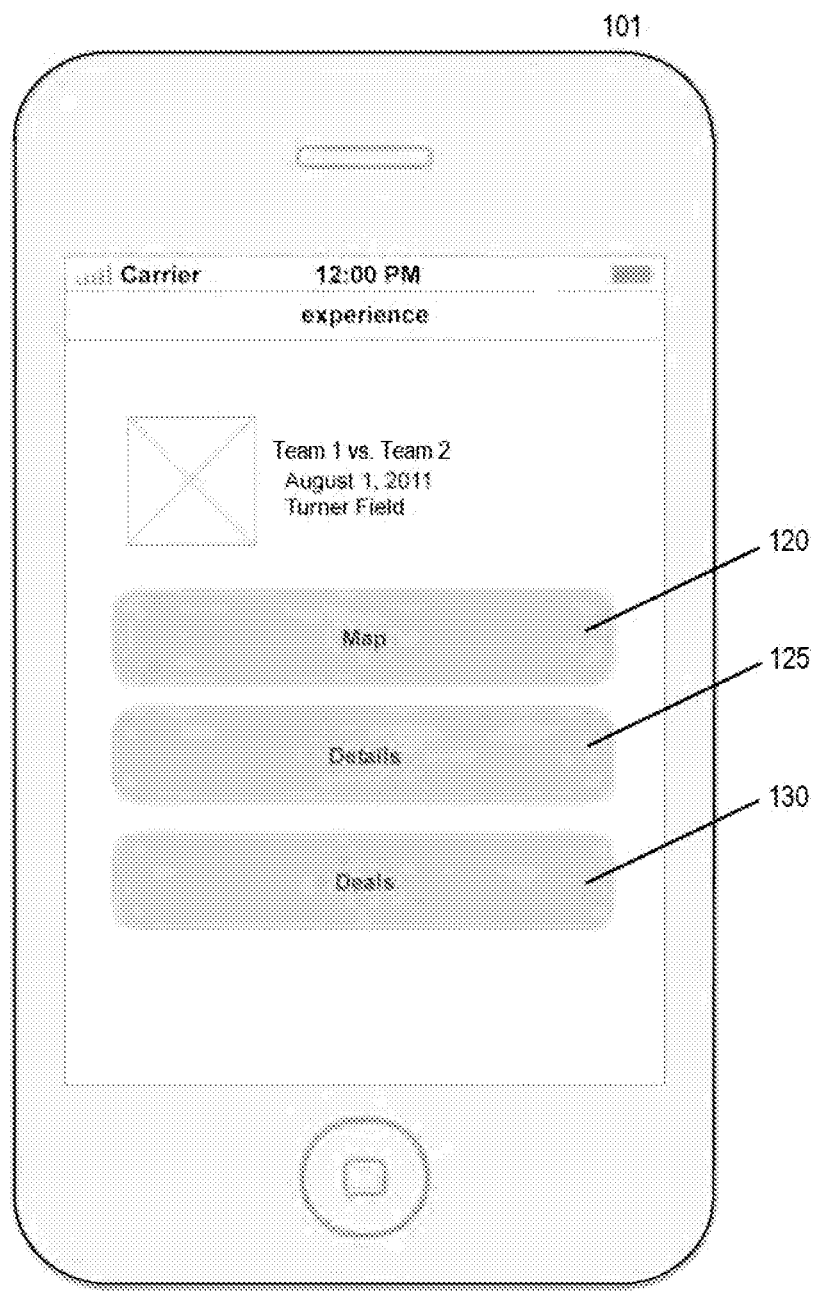
FIG. 1C illustrates a graphical user interface of a portable computing device running software that aggregates a wide variety of data, i.e. maps, local deals, venue details, etc, for a given event according to one exemplary embodiment.

FIG. 1C illustrates a graphical user interface of portable computing device 101 running software that aggregates a wide variety of data, i.e. maps, local deals, venue details, etc, for a given live event according to one exemplary embodiment. The graphical user interface may provide various different types of options that may be selected by the operator of the PCD 101. In the exemplary embodiment illustrated in FIG. 1C, such options may include, but are not limited to, a map option 120, a details option 125, and deals option 130. The map option 120 may provide a display of a map available for viewing by the operator of the PCD 101 that lists a location of the live event on the map.

The details option 125 may provide additional information about a live event such as the exact physical mailing address of the live event, the exact time for the live event, and other information such as potential upgrades for tickets that may be available. The deals option 130 may provide additional information about various services and/or products that may be associated with the live event in which may be purchased by the operator of the PCD 101. This deals option 130 may provide offers for transportation, offers for food and/or drink at restaurants in the vicinity of the live event, offers for food and/or drink available at the live event, offers for products such as team paraphernalia associated with a sports team (i.e. baseball hats, jerseys, t-shirts, sporting goods, etc.). Other information related to these three options 120, 125 and 130 will become more apparent from the exemplary embodiments described below.

As noted previously, transportation to and from a live event is one the most prevalent problems facing living events. Although hundreds and sometimes thousands of people attend a single live event, there doesn't exist both an affordable and comfortable way to attend live events. A solution to this problem is illustrated in FIG. 2A.

Figure 2A:
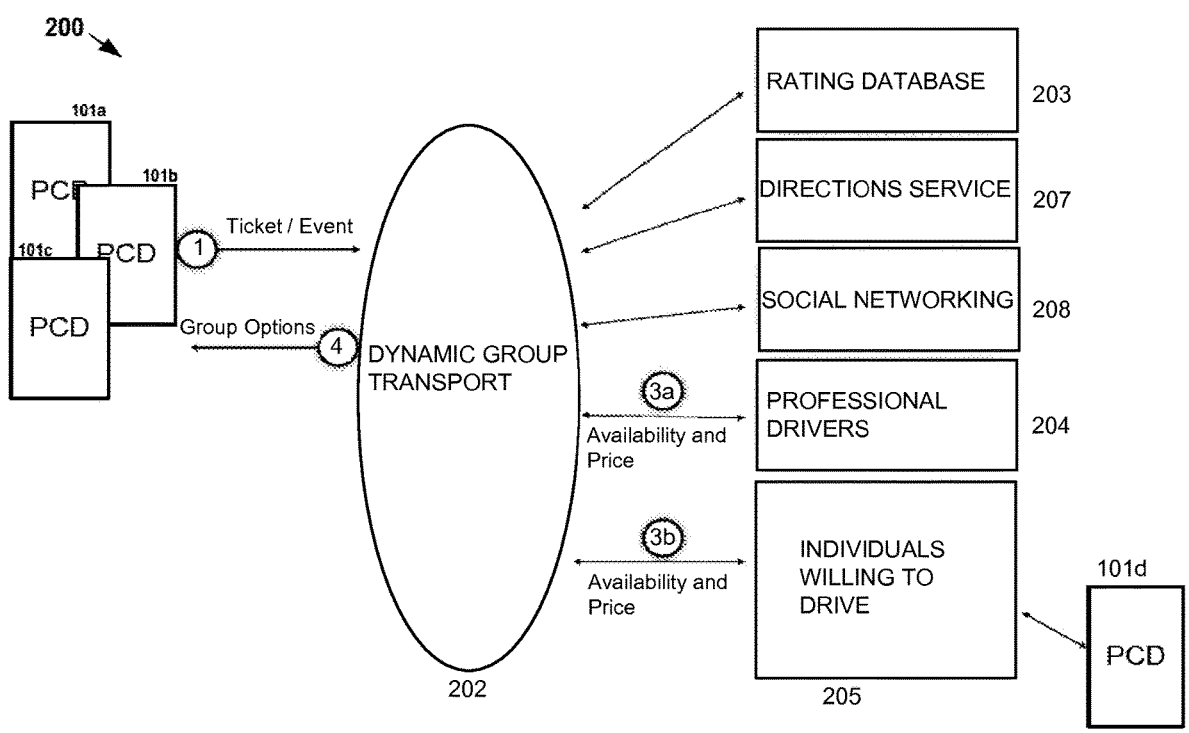
FIG. 2A illustrates a system for coordinating transportation to events that may be associated with portable computing device tickets according to one exemplary embodiment.
Figure 2B:
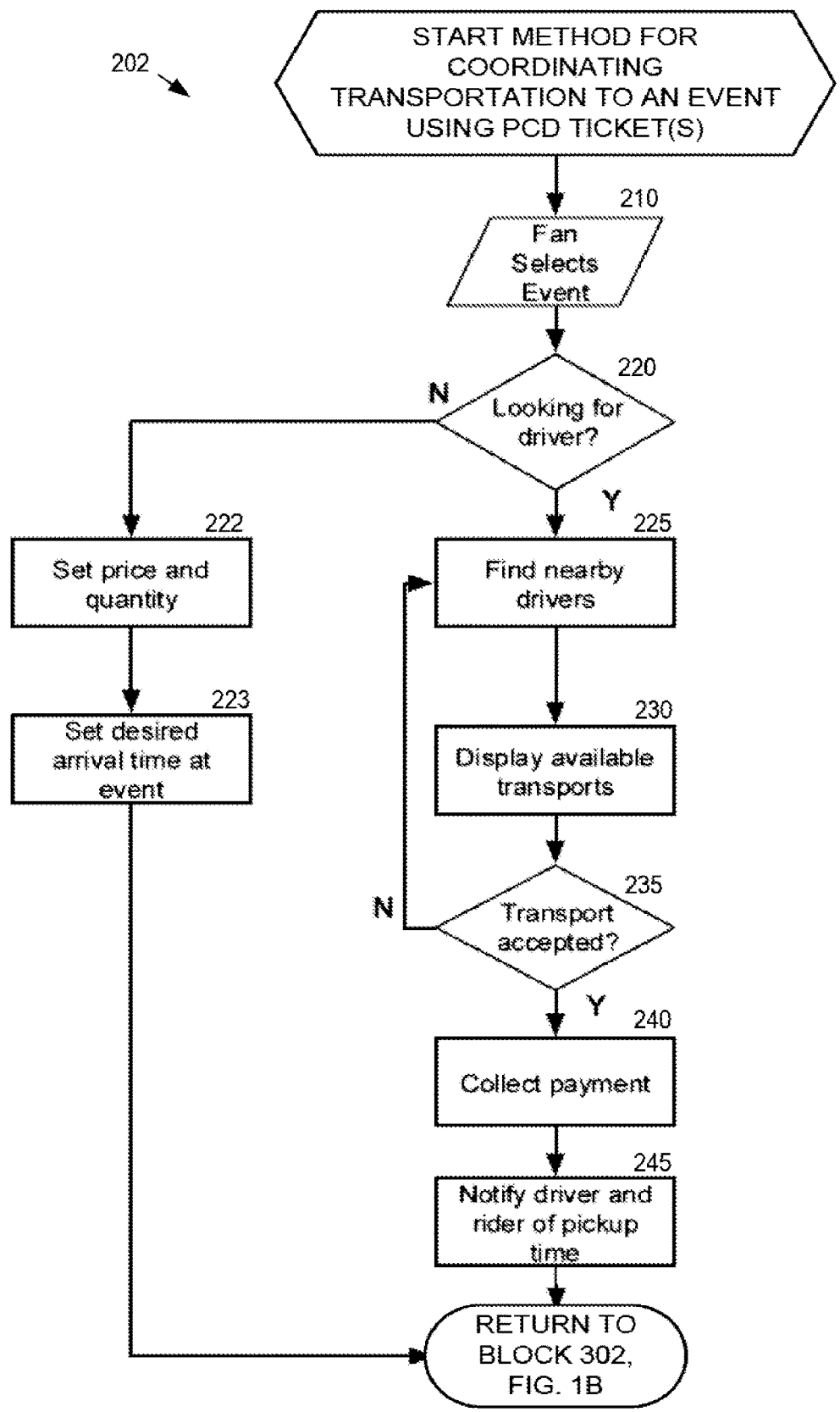
FIG. 2B is a logical flow chart illustrating a method for coordinating transportation to events that may be associated with portable computing device tickets according to one exemplary embodiment.

Specifically, FIG. 2A illustrates a system 200 for coordinating transportation to live events that may be associated with portable computing device tickets and/or tickets that have been uploaded by operators of PCDs 101 according to one exemplary embodiment. Meanwhile, FIG. 2B is a logical flow chart illustrating a method 202 associated with the server 202 for coordinating transportation to events that may be associated with portable computing device tickets according to one exemplary embodiment. Both FIGS. 2A-2B will be described together a set forth below.

The transportation coordinating system 200 may comprise operators of PCDs 101 who may have tickets to live events; a dynamic group transport server 202; a rating database 203; a directions service database 207; a social networking database and/or service 208; a professional drivers database 204; and a database 205 containing individuals willing to drive to live events which may be "nearby" relative to the residence of an individual. The social networking database 208 may comprise any one of social networking databases 208 available as of this writing, such as, but not limited to, FACEBOOK™, LINKED-IN™, MYSPACE™, TWITTER™, and other similar social networking databases.

The dynamic group transport server 202 may comprise a different computer server relative to the live concierge server 102 illustrated in FIG. 1A. However, in other exemplary embodiments, the live concierge server 102 and the group transport server 202 may be one and the same computer server as understood by one of ordinary skill in the art.

Figure 2C:
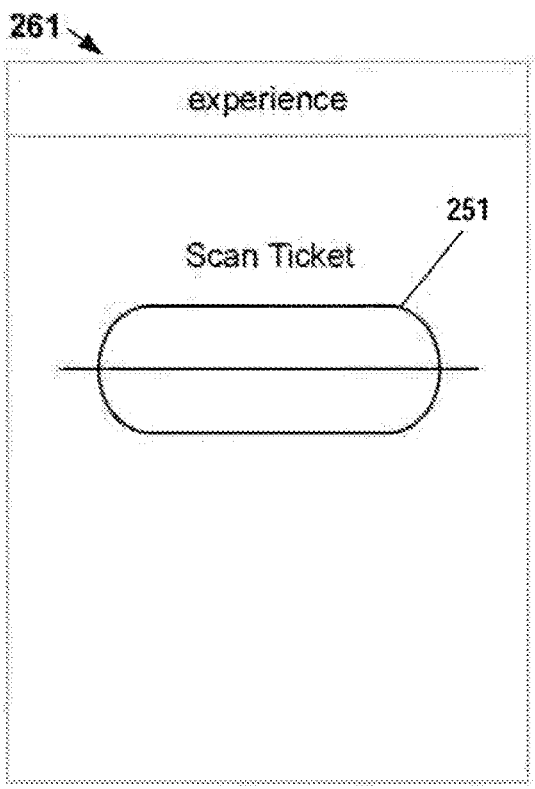
FIG. 2C illustrates a graphical user interface of a portable computing device that facilitates scanning of a physical ticket according to one exemplary embodiment.

Operators of PCDs 101a-c may manually enter or capture their ticket information with their portable computing device 101 via a camera 261 (See scan display of FIG. 2C). This ticket information may be transmitted to a server 202 via a wireless network (Step 210—FIG. 2B). These operators of PCDs 101a-c using group transport system 200 of FIG. 2A may be required to have a valid ticket to a live event and a valid social networking account (such as FACEBOOK™, LINKED-IN™, MYSPACE™, TWITTER™) connected to the server 202. These two items may help reduce criminal activity and increase driver security.

If an operator of a PCD 101 indicates he or she needs a ride to a live event (Step 220—FIG. 2B), the server 202 may query both a database of professional drivers 204 (FIG. 2A) and a database 205 containing a list of individuals willing to drive who are nearby the live event (Step 225—FIG. 2B). The queried result may contain both a rating of each driver from a rating database 203 (FIG. 2A), a price required, a location, and a quantity of seats remaining for transport in a vehicle. This list (See graphical user interface—"GUI"—262 of FIG. 2D) is then displayed to the user 201 on their portable computing device (Step 230—FIG. 2B).

At this stage, the user 201 is able to preview details about a specific driver (See GUI 263 of FIG. 2C) including ratings from previous riders stored in the rating database 203 (FIG. 2A). The details may also include social networking profiles, and certain demographics of each driver provided to the system 200. If the driver was undesirable based on the specifics from GUI 263 (FIG. 2C), the operator of the PCD 101 may return to the list (See GUI 262 of FIG. 2C) and select a different driver (Step 235—FIG. 2B).

Otherwise, the operator of the PCD 101 is able to purchase a ride (Step 240—FIG. 2B) from the selected driver using a payment vehicle such as credit cards, PayPal, or other payment application program purchased from a vendor, like GOOGLE™ or APPLE™. The server 202 (FIG. 2A) then calculates a suggested pickup time based on the driver's location, the PCD operator's location, and other riders' locations. Both operator of the PCD 101 and the driver are notified of the new pickup time via an e-mail, text message, TWITTER™ posting, FACEBOOK™ posting, and or automated voice mail message (Step 245—FIG. 2B).

The system 202 also allows drivers to supply information for being included in the queries for transportation to live events. This means if the inquiry to decision block 220 of FIG. 2B is negative, then the "NO" branch is followed to block 222 of FIG. 2B. In block 222, an operator of a PCD 101 may specify a price and a quantity of seats or passengers that may exist in the driver's vehicle. Next, in block 223, the operator of the PCD 101 may also set an arrival time to the live event which may be accommodated.

Referring again to FIG. 2B alone, if an operator of a PCD 101 would like to drive to a specific event, they first select the event (Step 210) by either manually entering or by photographing their ticket (See GUI 261 of FIG. 2C). As a security measure for riders and to prevent criminal activity, all drivers may be required to connect at least one social networking account 208 (FIG. 2A) to the server 202 (FIG. 2A) (such as, but not limited to, FACEBOOK™, LINKED-IN™, MYSPACE™, TWITTER™).

At this stage (Step 220—FIG. 2B, GUI 262 of FIG. 2C), an operator of PCD 101 may then designate themselves as a driver. A GUI 264 (See FIG. 2D) may be presented that requires them to enter preference data 257 that may include, but is not limited to, their location or leverage their device's global positioning system (GPS) to automatically determine their location, a required price per rider, a maximum distance from their location a rider can be located, a quantity of seats available, and a required arrival time at the event (Steps 222-223, FIG. 2B). This information is exemplary only. Other information may be provided and which may facilitate connections among drivers and live event consumers who do not wish to drive to the live event.

As new riders pay for spots in the driver's vehicle, the server 202 (FIG. 2A) may reduce the number of available spots/seats/passengers in the driver's vehicle. Once no spots remain or the live event is a designated amount of time away, the server 202 may generate a map 257 of GUI 265 (FIG. 2D) for the driver that displays a suggested route to get to the live event. The map 257 may suggest a pickup of all riders in a logical fashion which is generated by a third party directions service database 207. This map 257 may be transmitted to a driver's portable computing device 101. Once a live event has concluded, the funds/fees collected from the riders may be paid out to the driver. These funds may be transferred electronically to an account specified by a driver with his or her portable computing device 101. However, if a ride was offered for no cost, then no funds are transferred to the account.

A summary for the logical flowchart of FIG. 2B is as follows: an operator of a PCD 101 selects a nearby event (Step 210). If the operator is offering to drive (Step 220), the operator with his PCD 101 then sets a price and maximum quantity of riders (Step 222) and the desired time of arrival at the event (Step 223).

If the operator of the PCD 101 is seeking transportation (Step 220), the system 202 may generate a list of nearby drivers (Step 225) by detecting the operator's current location and displays this list to the operator (Step 230). If the operator finds an acceptable driver (Step 235), the operator is required to pay (Step 240) and the driver is notified of the new rider or group of riders (Step 245) and the required pickup time to still guarantee the desired arrival time is met.

FIG. 2C illustrates a graphical user interface 261 of a portable computing device 101 that facilitates scanning of a physical ticket according to one exemplary embodiment. The graphical user interface 261 may comprise a reticule or alignment marker 251 that is displayed in which corresponds to an image being captured by a camera 1348 (See FIG. 12C). This graphical user interface 261 may be used by the operator of the PCD 101 in order to capture information listed on a conventional physical ticket. This information on the conventional physical ticket, once captured by the PCD 101, may be relayed to the computer servers 101 and 102.

Figure 2D:
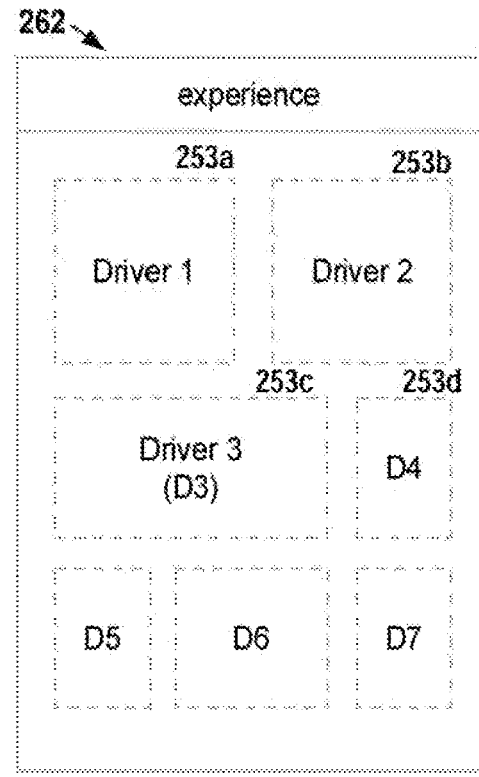
FIG. 2D illustrates a graphical user interface of a portable computing device that provides recommendations of multiple drivers both professional, public, and individual according to one exemplary embodiment.

FIG. 2D illustrates a graphical user interface 262 of a portable computing device 101 that provides recommendations 253 of multiple drivers may include professional, public, and individual types according to one exemplary embodiment. This graphical user interface 262 may be generated as a result of a database inquiry executed by the computer server 202 described above in order to locate drivers for a live event. The recommendations 253 may correspond with driving preferences expressed by the operator of the PCD 101. The operator of the PCD 101 may select each recommendation 253 so that additional information is provided for each recommended driver.

Figure 2E:
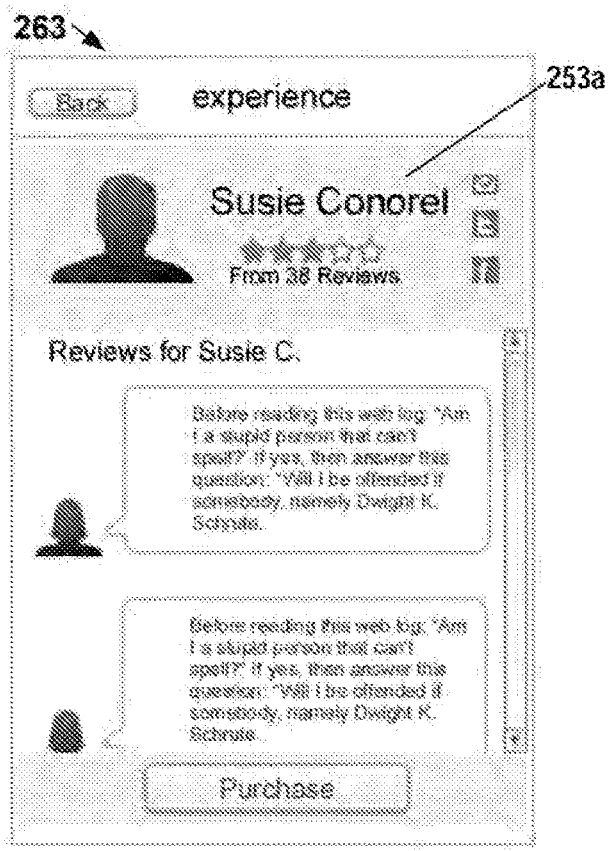
FIG. 2E illustrates a graphical user interface of a portable computing device that displays one or more reviews of drivers available for selection through the system according to one exemplary embodiment.

FIG. 2E illustrates a graphical user interface 263 of a portable computing device 101 that displays one or more reviews of drivers available for selection through the system 200 according to one exemplary embodiment. This graphical user interface 263 may be generated in response to a selection of one of the recommendations 253 as illustrated in FIG. 2D described above. These reviews for each driver may comprise paragraphs of text that were generated by other operators of PCDs 101 may have used the transport system 200 for prior live events. An operator of a PCD 101 may scroll through the text of these reviews in order to facilitate a decision on a driver for a live event.

Figure 2F:
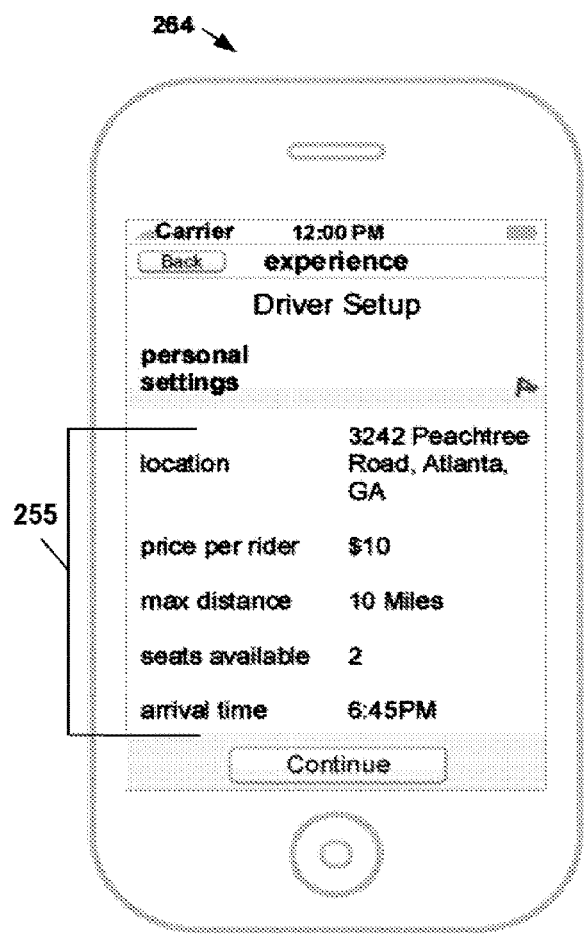
FIG. 2F illustrates a graphical user interface of a portable computing device that displays a driver preference settings profile according to one exemplary embodiment.

FIG. 2F illustrates a graphical user interface 264 of a portable computing device 101 that displays a driver preference settings profile 255 according to one exemplary embodiment. The driver preference settings profile 255 may include information such as, but not limited to, the street address of a starting point or origin for a driver; a price that a driver will charge per seat for transport to a live event; the number of passengers or seats available in the vehicle being driven by the driver; and the arrival time that the driver may provide to a ticketholder for a live event.

Figure 2G:
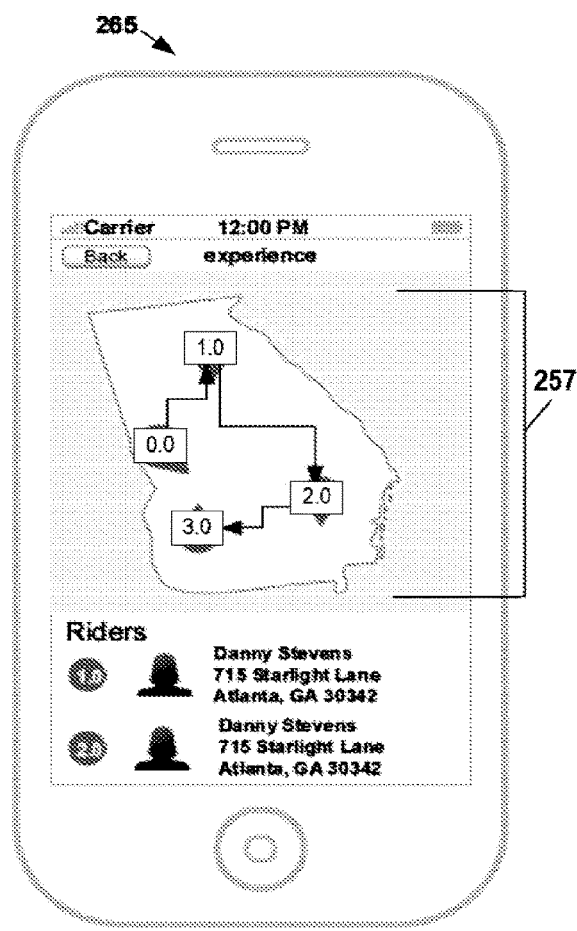
FIG. 2G illustrates a graphical user interface of a portable computing device that displays a map of a driving route for picking up various consumers of a particular live event according to one exemplary embodiment.

FIG. 2G illustrates a graphical user interface 255 of a portable computing device 101 that displays a map 257 of a driving route for picking up of various consumers of a particular live event according to one exemplary embodiment. This map 257 may be displayed to operators of a PCD 101 who have selected a particular driver. This map 257 may list the sequence in which the driver may pick up particular passengers. These passengers may include other operators of PCDs 101 and who subscribe to the transport system 200. The passengers being displayed on this map 257 may or may not know each other and may have booked a particular driver not knowing the identities of the other passengers who may be picked up by the driver. The system 202 may also provide a detailed listing of names and addresses of the other passengers below the map 257.

Figure 3A:
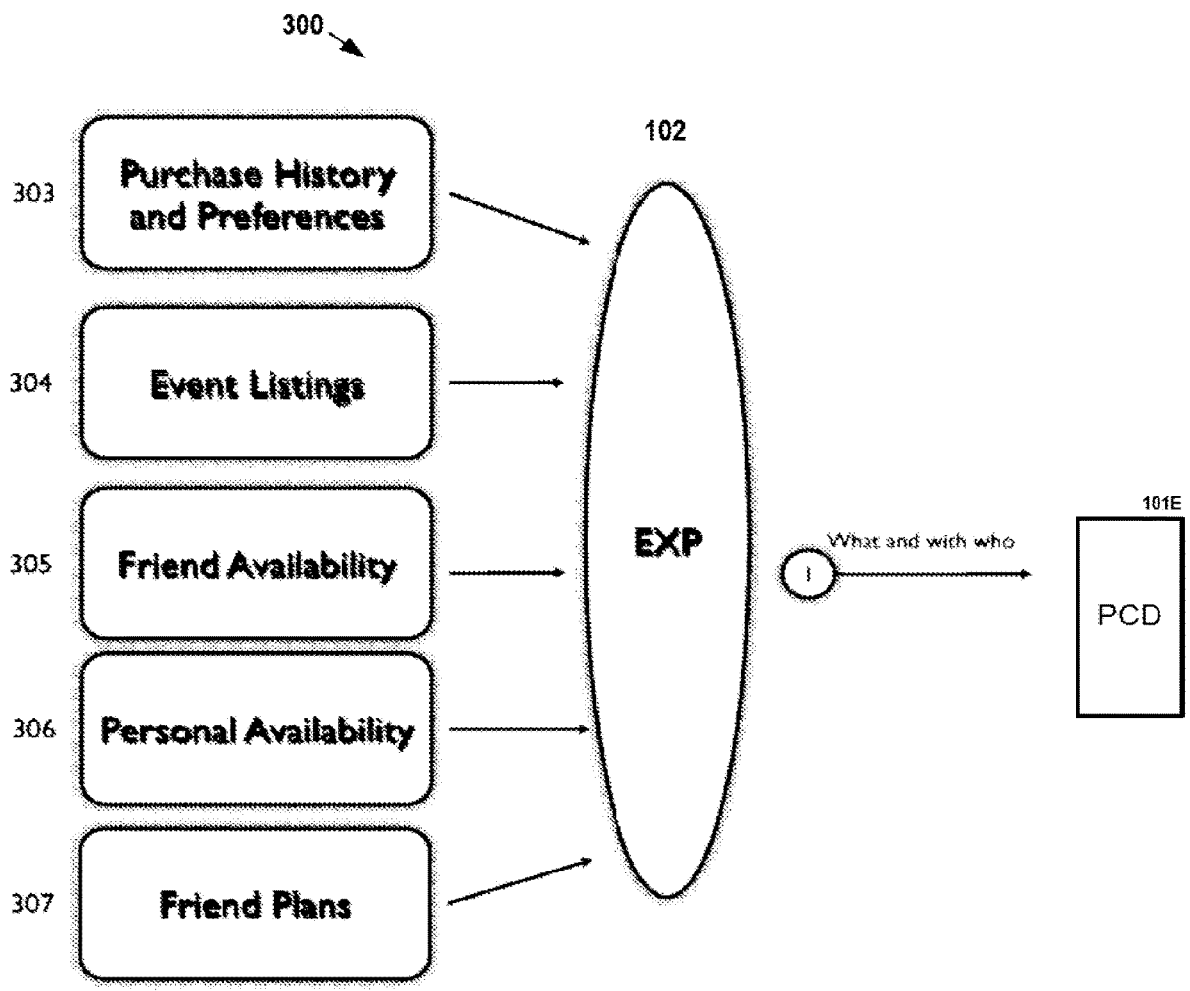
FIG. 3A illustrates a system for recommending events that may use portable computing device tickets according to one exemplary embodiment.

FIG. 3A illustrates a system 300 for recommending events that may use portable computing device tickets according to one exemplary embodiment. The system 300 may comprise a database 303 that contains a purchase history and preferences of an operator of a PCD 101E. The system 300 may also comprise a database 304 that contains event listings and a database 305 that contains availability data/calendar data of friends associated with the operator of the PCD 101E. The system 300 may further comprise a database 306 that may include calendar data which indicates personal availability for the operator of the PCD 101E. The system 300 may also comprise a database 307 that lists unscheduled or wish lists for plans of friends associated with the operator of the PCD 101E.

In simplistic terms, FIG. 3A illustrates a system 300 that not only solves what to do for an operator of a PCD 101 but also whom to do it with. To accomplish this goal, operator of a PCD 101, upon first use of the system 300, may select preferred personal categories (See GUI 351 of FIG. 3C) and may select friends already in the system 300. An operator of a PCD 101 may also invite other friends who do not subscribe to system 300 but in which the system 300 was able to determine their contact information by ways such as, but not limited to, a portable computing device address book associated with the operator, or social networking accounts like FACEBOOK™, LINKED-IN™, MYSPACE™, TWITTER™. The operator of the PCD 101 usually is required by the system 300 to connect a calendaring source (not shown) such as GOOGLE™ Calendar or an OUTLOOK™ Calendar which corresponds to the database 306 of FIG. 3A.

As a registered member of the service, an operator of the PCD 101 then receives an organized list of things to do (See GUI 352 of FIG. 3D). To achieve this, the system/server 302 (FIG. 3A) may first download a list of available events (Step 310—FIG. 3B) from a publicly available list of nearby events from the event listings database 304. The event listings database 304 may comprise third-party databases available as of this writing such as TICKETMASTER™ or LAST.FM.™.

Friends already in the system 300 usually have already connected their respective calendaring sources (such as GOOGLE™ Calendar or OUTLOOK™ Calendar) corresponding to the friend availability database 305 of FIG. 3A. This list may then be filtered (Step 320—FIG. 3B) based on one of three potential primary filters (established by operator with GUI 352A of FIG. 3D).

These filters may include, but are not limited to: personal preferences and purchase history corresponding to the purchase history in preference database 303 of FIG. 3A; data from the friends plans database 307 which is derived from connected calendar services corresponding to the friend availability database 305; and, internally relative to system 300, for the events which friends have purchased tickets using the system 300; and/or personal location which is determined by leveraging the GPS technology each portable computing device 101. Additionally, any event that occurs when the operator of a PCD 101 is unavailable based on their availability as listed in the personal availability database 306 which is from their connected calendar service such as GOOGLE™ Calendar or OUTLOOK™ Calendar will be filtered from the list.

The filtered list of available events to the operator of the PCD 101 may be ranked (Step 330—FIG. 3B) primarily by filters described above. For example, if the operator of the PCD 101 has selected friends plans from the friends plans database 307 as the primary filter (See GUI 353A of FIG. 3E), the live event with the largest number of friends attending, such as a sporting event like baseball as illustrated in FIG. 3E, will appear at the top of the list with most significant visual weight (area relative to area of the display), such as being presented as the largest option on the screen as illustrated in GUI 353 of FIG. 3E.

The operator of the PCD 101 will be able to preview which friends are attending each event that is listed by the system 300. Once completely ranked, the list is displayed to the user (Step 340—FIG. 3B). Additionally, the operator of the PCD 101 may modify existing filters such as time and category (See GUI 354 of FIG. 3G) which may cause the system 300 to remove certain events and re-rank the events once certain events have been removed.

Figure 3B:
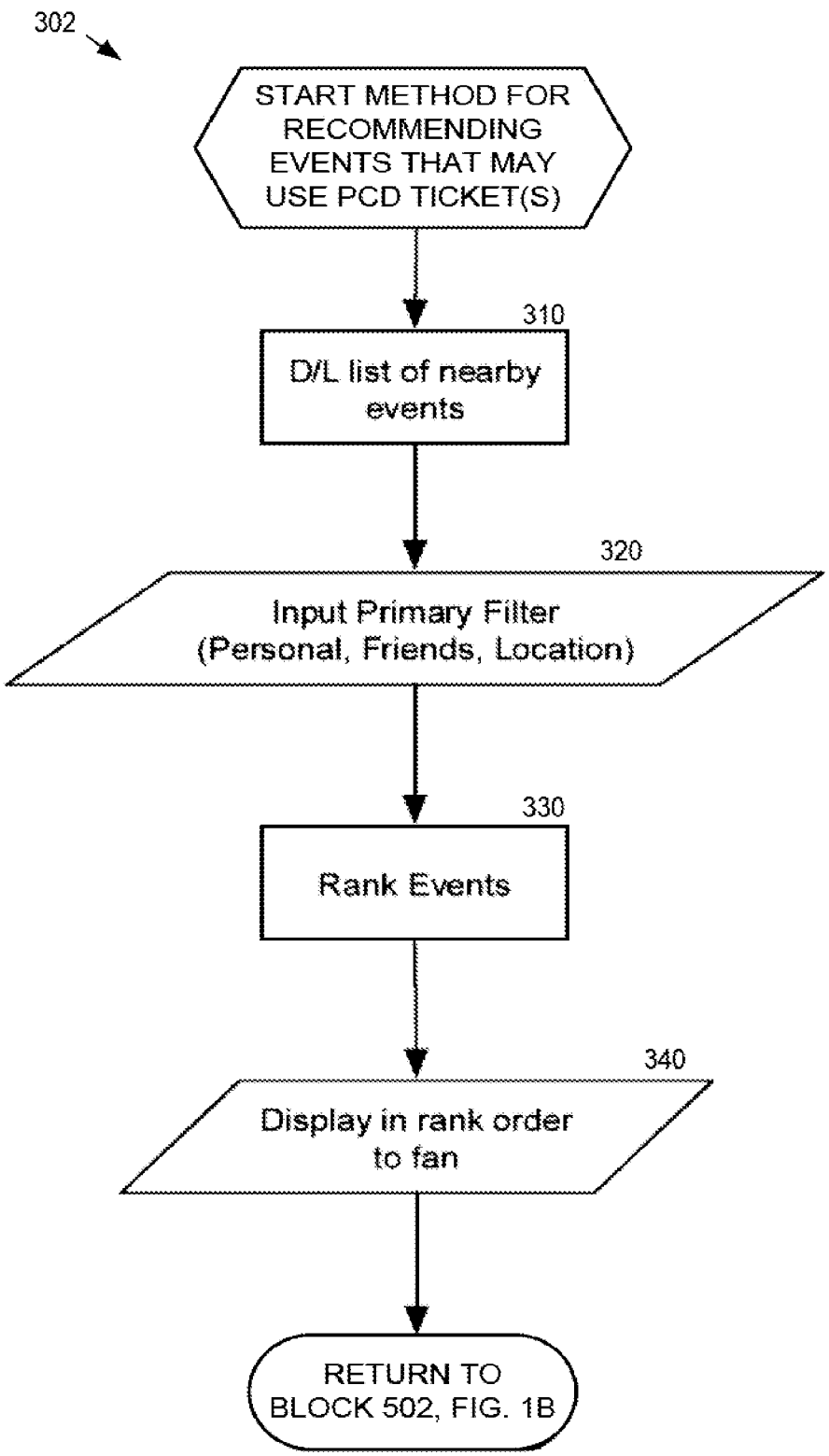
FIG. 3B is a logical flow chart illustrating a method for recommending events that may use portable computing device tickets according to one exemplary embodiment.

FIG. 3B is a logical flow chart illustrating a method 302 for recommending events that may use portable computing device tickets according to one exemplary embodiment. A summary of the flow chart of FIG. 3B is as follows: The system 300 filters a list of events for the operator's location (Step 310). The operator may select a primary filter which to remove and rank events (Step 320). The system 300 may calculate a rank for each event for that operator of a PCD 101 (Step 330). The system 300 displays the events in a ranked order (Step 340).

FIG. 3C illustrates a graphical user interface ("GUI") 351 of a portable computing device 101 that displays options for events that may use portable computing device tickets according to one exemplary embodiment. The live events listed in GUI 351 have been arranged by various categories 343, such as, but not limited to, basketball 343a, football 343b, arts 343c, music 343d, and food 343e. This listing of live events may be random and/or it may be based on purchase history associated with the operator of the PCD 101.

FIG. 3D illustrates a graphical user interface 352 of a portable computing device 101 that displays options for events that have been filtered according to preferences of the operator of the portable computing device 101 according to one exemplary embodiment. The filtering options 355 are displayed in this GUI 352. The filtering options listed in this exemplary embodiment included a "ME" filtering option 355a, a friends filtering option 355b, and a "nearby" filtering option 355c. The GUI 352 may further display other options 357 to the operator the PCD 101 so that the operator may navigate to other features of the system 100, such as live event lineup, tickets, times for the live events, and settings for a profile of the operator of the PCD 101.

The "ME" filtering option 355a of GUI 352 may correspond with the preferences established by the operator of the PCD 101. The friends filtering option 355b may correspond with the friend availability database 305 and the friends plans database 307 of FIG. 3A. The "nearby" filtering option 355c may correspond with those events in close proximity relative to the geographic location of the PCD 101.

FIG. 3E illustrates a graphical user interface 353 of a portable computing device 100 that displays friends relative to the operator of the portable computing device 101 who may be attending events of interest for the operator of the portable computing device 101 according to one exemplary embodiment. This GUI 353 lists live events according to the friends filtering option 355b that has been selected by an operator of the PCD 101. Each live event displayed may also include a listing of friends who may be attending the live event. For example, in the baseball live event 343b listed in GUI 353, three friends are listed as attending the event: Billy, Pat, and 1 other.

FIG. 3F illustrates a graphical user interface 350 of a portable computing device 101 that displays a listing of friends 359, 361 that may be selected for inviting to one or more live events according to one exemplary embodiment. A first listing of friends 359 may include those who subscribe to the system 300. A second listing of friends 361 may include those people who do not subscribe to the system 300 and in which the system may need to rely on third-party communications, like e-mails, text messages, or voicemails to contact these individuals.

FIG. 3G illustrates a graphical user interface 354 of a portable computing device 101 that displays events according to options selected from additional filters 355d according to one exemplary embodiment. As noted above, the operator of the PCD 101 may modify existing filters 355 such as time and category filters 355d which may cause the system 300 to remove certain events and re-rank the events once certain events have been removed. In the exemplary embodiment illustrated in FIG. 3G, the specific time filter of "month" was selected in addition to the category filter of "ALL" live events available.

Figure 4A:
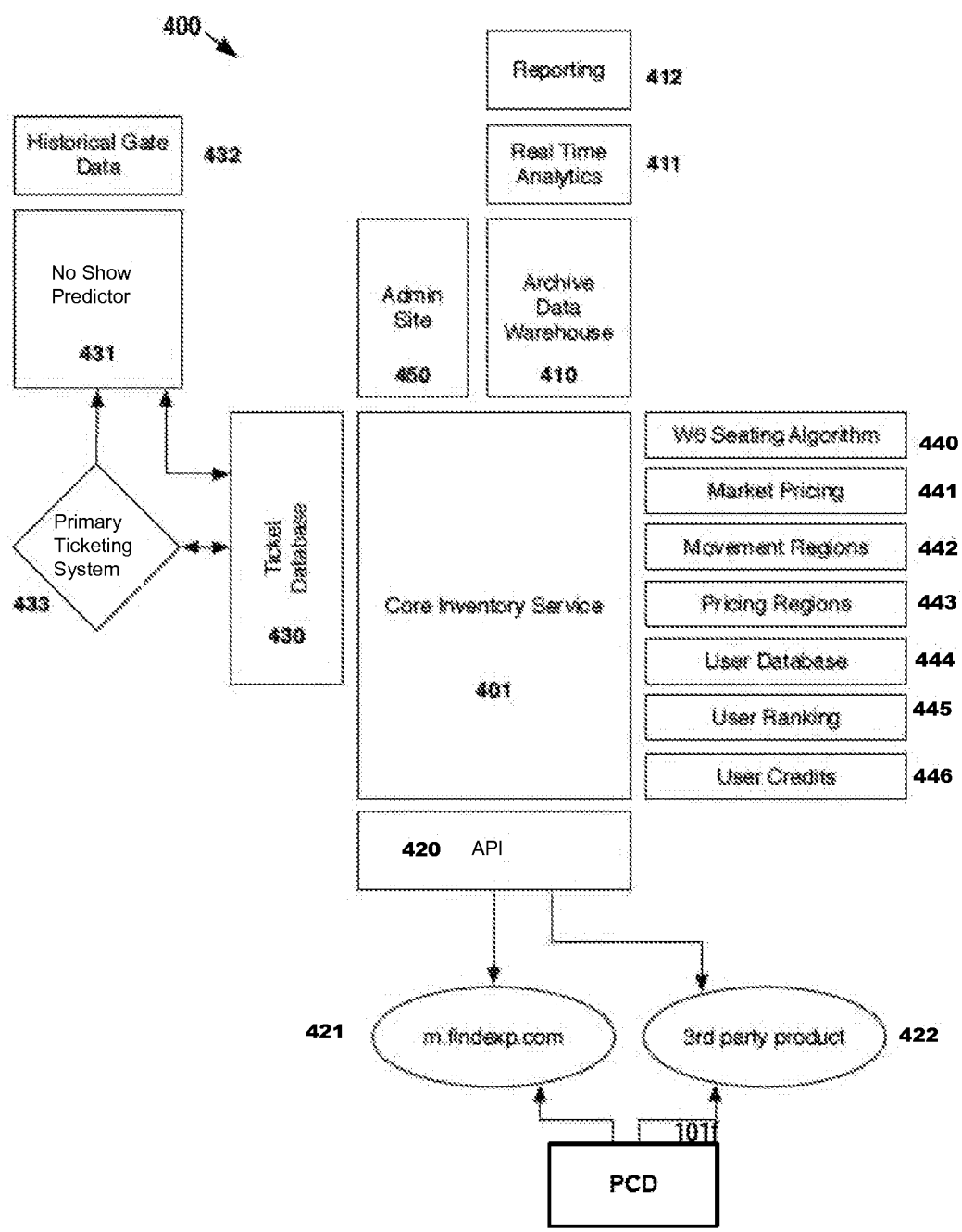
FIG. 4A illustrates a system for generating optimal seating assignments for a ticketed event that addresses pricing, existing inventory of tickets, and other variables to maximize revenue and fan experience according to one exemplary embodiment.

FIG. 4A illustrates a system 400 for generating optimal seating assignments for a ticketed event that addresses pricing, existing inventory of tickets, and other variables to maximize revenue and fan experience according to one exemplary embodiment. Specifically, FIG. 4A illustrates an overall system 400 designed to reinvent the ticket for live events. While the traditional ticket is usually static and comprises a physical ticket that is based on a single seat at a stadium or field, the system 400 illustrated in FIG. 4A supports a fluid or virtual, electronic ticket that is based on an individual and acts as a reservation request for a live event. The electronic ticket may also support more than just an assigned seat but could also include additional services.

The system 400 may comprise a core inventory service 401 that is coupled to a ticket database 430. The core inventory service 401 may be coupled to a computer server supporting a seating algorithm 440. The core inventory service 401 may also be coupled to a market pricing database 441, a movement regions database 442, a pricing regions database 443, a user database 444, a user ranking system 445, and an user credits system 446.

The core inventory service 401 may also be coupled to a server that supports administrative web site 450, and an archive data warehouse 410. The archive data warehouse 410 may include a real-time analytics module 411 and a reporting module 412.

The core inventory service 401 may also be coupled to an application programming interface ("API") 420. The API 420 may be coupled to a mobile commerce server 421 and a third party product server 422. The mobile commerce server 421 and the third party product server four-point to may be coupled to a portable computing device 101F.

The ticket database 430 mentioned above may be coupled to a primary ticketing system 433 and a no-show predictor server 431. The no-show predictor server 431 may also be coupled to a historical gate data database 432.

The virtual, electronic tickets or also referred to as portable computing device tickets managed by the system 400 may track associations between operators who are assigned to these portable computing device tickets. In other words, unlike conventional physical tickets, the portable computing device tickets may track information such as friends associated with the holder of the portable computing device ticket (See GUI 449 of FIG. 4B which displays this association information about friends of the portable computing device ticket holder). The portable computing device tickets also track locations of where each portable computing device ticket holder is sitting (See GUI 449 of FIG. 4B), and what they are doing at the live event (not shown).

This new ticket type may leverage a unique market pricing system 441 (described in further detail in connection with FIG. 10A) and a unique seating optimization algorithm 440 (described in further detail in connection with FIGS. 9A-9D). The pricing system 441 and the seating algorithm 440 are connected to the core inventory service 401.

Under the fluid or virtual, electronic ticket or portable computing device ticket concept, operators of PCD 101 may constantly change their seat via upgrades (See FIG. 5B described below for the brief logic flow of a seat upgrade request) that may be purchased. In other exemplary embodiments, such upgrades for portable computing device tickets may be received for free, or issued after payment. Upgrades may also be provided to an operator of a PCD 101 who requests to sit with friends (See FIG. 6B for a brief logic flow that manages a "sit with friends" request), or by receiving and engaging with an ad (See Ads in FIG. 7B).

These upgrades could fall into three different ticket types: unsold, unused, and vacated. To acquire unsold tickets, the core inventory service 401 communicates with the Primary Ticketing System 433 to determine what tickets remain unsold and are available for sale. When a user 423 completes an upgrade, their original ticket is released back to the core inventory service 401 and propagated back to the Ticket Database 430 and the Primary Ticketing System for potential resell at the box office. Alternatively, the core inventory service 401 can request unused tickets from the No Show Predictor 431 which is able to acquire both Historical Gate Data 432 stored internally and a real time view of gate scans from the Primary Ticketing System 433 to determine what tickets can confidently be marked and sold as unused tickets (See FIG. 13A).

Figure 4B:
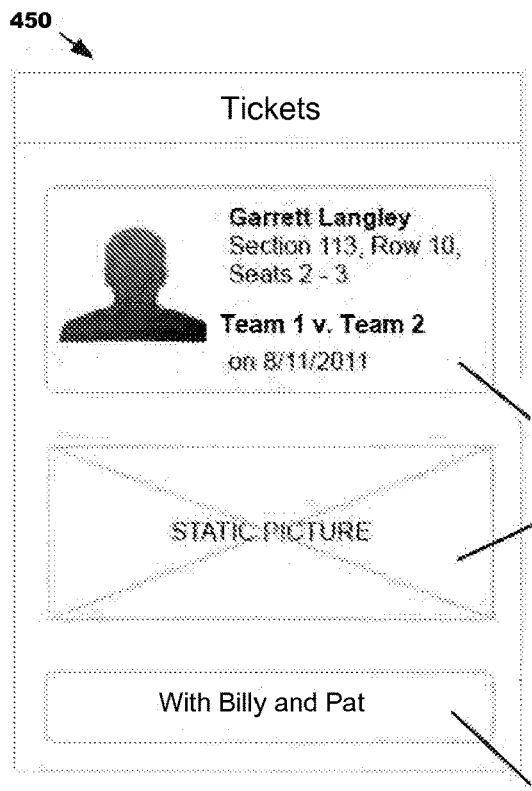
FIG. 4B illustrates a graphical user interface of a portable computing device that displays a virtual, electronic, or portable computing device ticket according to one exemplary embodiment.
Figure 4C:
FIG. 4C illustrates a graphical user interface of a portable computing device that displays a video which may assist the operator in locating his or her seat at a live event according to one exam for embodiment.
Figure 4D:
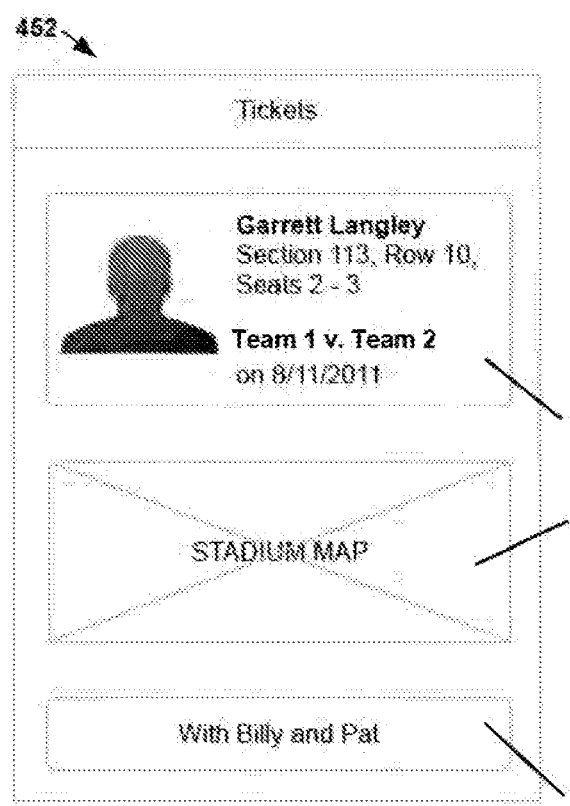
FIG. 4D illustrates a graphical user interface of a portable computing device that displays a map option that may be selected by the operator of the portable computing device to assist with locating a seat according to one exemplary embodiment.
Figure 4E:
FIG. 4E illustrates a graphical user interface of a portable computing device that displays a machine-readable code in order for the operator of the portable computing device to gain entry/access to a live event according to one exemplary embodiment.
Figure 18A:
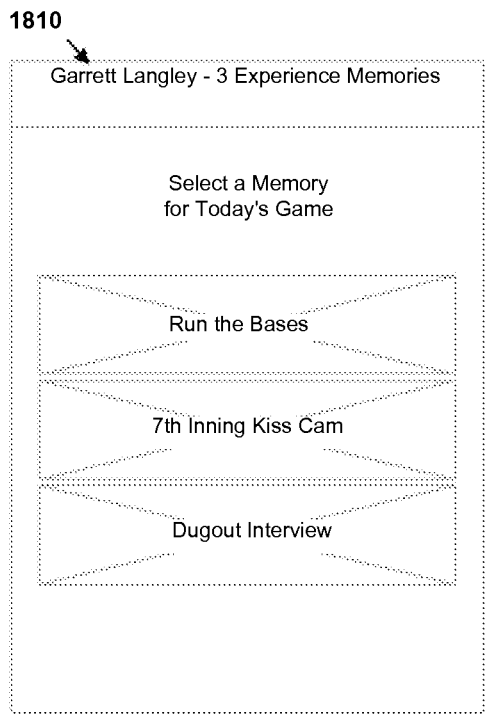
FIGS. 18A-C illustrate graphical user interfaces (GUIs) for an exemplary portable computing device for viewing, purchasing, and redeeming additional types of inventory.
Figure 18B:
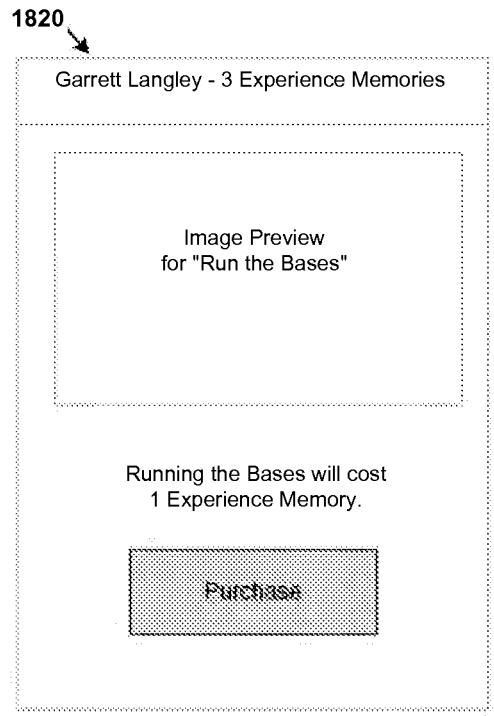
Figure 18C:
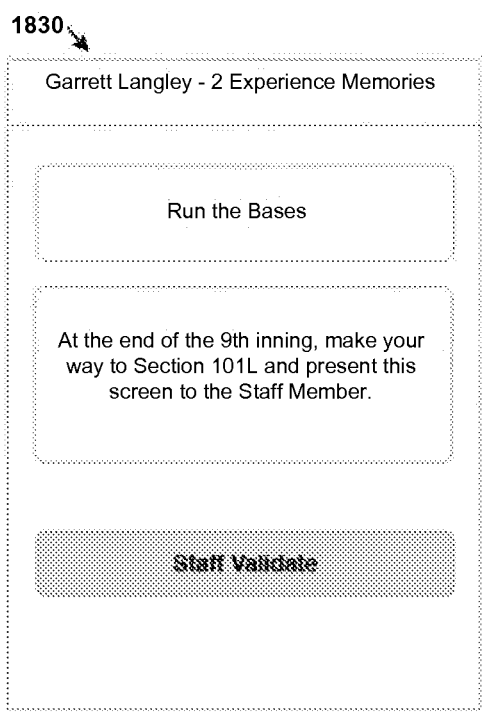

Other features and/or functions of a portable computing device ticket may include the ability to attach a video to the ticket (See GUI 451 of FIG. 4C), a digital and user-friendly map for the live event (See GUI 452 of FIG. 4D and Map 469 of FIG. 4F), and to allow for mobile redemption using a portable computing device 101 leveraging technology such as machine-readable codes, such as, but not limited to, two-dimensional bar codes, interactive on-screen elements, or NFC (Near Field Communication) (See GUI 453 of FIG. 4E). In addition, the operator could have access to other types of inventory beyond tickets such as special experiences, for instance watching batting practice at a baseball game or going back stage at a musical performance, parking, or a visit from a mascot at a sporting event (FIG. 18).

The core inventory service 401 of FIG. 4A usually must be coupled to the primary ticketing system 433 (FIG. 4A). The primary ticketing system 433 may include existing systems such as, but not limited to, TICKETMASTER™ ticket servers or TICKETS.COM™ servers which are coupled to the Internet for tracking current inventory (as not all tickets will be "fluid tickets") and to remove specific tickets from the available inventory (as illustrated in FIG. 5B and FIG. 6B).

The primary ticketing system 433 may also be housed inside the core inventory service 401. The core inventory service 401 may leverage an intermediate agent, such as a ticket database 430, to interface with the primary ticketing system 433, as understood by one of ordinary skill in the art.

The core inventory service 401 may also have a connection to an existing static pricing regions server 443 which may include an external or internal system and which represents the original face value of a ticket. The core inventory service 401 is also connected to a movement regions database 442. The movement regions database 442 may track willingness of operators of PCDs 101 to move within a live event venue based on preferences that may be selectable by an operator. For instance, at a baseball game, operators of PCDs 101 are generally willing to move as close to home plate as possible, such as a few rows back, and a few sections laterally without any complaints.

However, if an operator of a PCD 101 using a portable computing device ticket is requested to move an entire section away from home plate, the operator will most likely not accept the seat change request. This willingness to move by an operator of a PCD 101 will likely be unique to every live event venue as viewing experience is unique to each venue and each section of the venue. Such data about willingness to move by an operator of a PCD 101 will be stored in the movement regions database.

The core inventory service 401 may also be connected to a user database 444. This user database 444 may contain records of season ticket holders, premium accounts, past users and any pertinent data belonging to operators of PCDs 101 who subscribe to the system 400. Some operators of PCDs 101, such as partners or company employees, may have the ability to create, read, update, and delete data from the core inventory service 401 via the Admin Site server 450.

The core inventory service 401 may also be connected to a user ranking system 445. This user ranking system 445 may be responsible for determining access to certain inventory such as tickets or special experiences or may be responsible for determining at what point in time a certain operator is granted access to certain inventory. This user ranking system 445 could be based on certain data from the user database 444 such as quality of seat, tenure with a certain sporting team, or activity with the system 400.

The core inventory service 401 may also be connected to a user credits system 446. This user credits system 446 holds redeemable value for certain operators to use to acquire inventory from the core inventory service 401. The credit for a certain operator could be based on certain data from the user database 444 such as quality of seat or tenure with a sporting team or a $3^{rd}$ party. Additionally, operators could be able to purchase additional credits on the user credit system 446 or earn them by performing certain tasks.

Lastly, the system 400 may have access to an archive data warehouse 410 (FIG. 4A) that is internally connected to the core inventory service 401 which houses the user data including history of ticket purchases, connected social networking accounts such as FACEBOOK™ or TWITTER™ social network accounts, relationships such as friendships, demographic data, team allegiances, and typical behavior at live events such as light or heavy drinker, or attending with family.

This archive data warehouse 410 may include two additional systems: a real time analytics service 411 and a reporting service 412. The real time analytics service 411 may have the ability to conduct surveys or tests that include mode will choice questions about preferences of PCD operators. The real time analytics service 411 may report this data back to the core inventory service 401 to determine what tickets to present to a particular operator of a PCD 101 and back to the market pricing database 441 in order to calculate/determine price. The reporting service 412 may conduct batched analysis of live event (like game) data such as user behavior, pricing trends, unused returns, and revenue.

As the average live event, as of this writing, generally and roughly sells 60% of the available inventory, there remains a large number of premium unsold seats at most live events. The system 400 illustrated in FIG. 4A may be used to sell those unsold seats once a live event has started in the form of a seat upgrade as illustrated method 502 of FIG. 5B.

The gate data database 432 may contain multiple years of scan data per live event, such as on per team basis if the live event being tracked is sporting event like baseball. Scan may include the relevant information associated with an individual's attendance at a live event, such as, but not limited to, account type, price paid, section, row, day of week, month, opponent, quality of game, arrival time, departure time, and number of seats used.

The No Show Predictor 431 may comprise an algorithm/model/or rule(s) that assess historical gate data and current event data for a live event. This no show predictor 431 may then generate a likelihood of every unscanned ticket/unclaimed seat remaining unscanned (i.e., going unused) for the remainder of an event, such as a sporting event/game. So at certain time intervals, such as on the order of ten minutes after a start of a live event, the no show predictor 431 may determine a likelihood of a particular ticket/seat not being used. The no show predictor 432 may provide a prediction listed in term of a percentage (YY %, where YY is an integer) of particular seat having a likelihood of being unused by a patron/fan for the live event.

FIG. 4B illustrates a graphical user interface 449 of a portable computing device 101 that displays a virtual, electronic, or portable computing device ticket according to one exemplary embodiment. The electronic ticket may display venue information 477 such as the name of the operator of the PCD 101, the location of the seat within the live event, and a name or title associated with the live event as well as the calendar date of the live event. Electronic ticket may present a photograph or static picture 466 associated with the live event. The electronic ticket may also display friends of the operator who are attending the live event with the operator in a friend's field 472.

FIG. 4C illustrates a graphical user interface 451 of a portable computing device 101 that displays a video 463 which may assist the operator in locating his or her seat at a live event according to one exemplary embodiment. A video 463 is not limited to only helping the operator of the PCD 101 locating his or her seat. The video 463 may provide advertising that may be associated with the live event. Other types of video 463 not specifically described are well within the scope of this disclosure. Similar to the GUI 449 of FIG.

4B, the GUI 451 may also comprise a friend's field 472 which lists the current friends attending the live event with the operator of the PCD 101.

FIG. 4D illustrates a graphical user interface 452 of a portable computing device 101 that displays a map option 469 that may be selected by the operator of the portable computing device 101 to assist with locating a seat according to one exemplary embodiment. The map option 469 in GUI 452 may comprise a reduced sized map relative to the map 469 illustrated in FIG. 4F. If the map option 469 is selected in GUI 452, then the enlarged map 469 of FIG. 4F may be presented to the operator of the PCD 101.

FIG. 4E illustrates a graphical user interface 453 of a portable computing device 101 that displays a machine-readable code 471 in order for the operator of the portable computing device 101 to gain entry/access to a live event according to one exemplary embodiment. The machine-readable code 471 may comprise a two-dimensional barcode. However, other types of machine-readable codes 471 are well within the scope of this disclosure as understood by one of ordinary skill the art. Other machine-readable codes 471 include, but are not limited to, one-dimensional barcodes, wireless conveyed machine-readable codes, such as near field communication ("NFC") and radio frequency-identification ("RF-ID") codes, acoustical codes, infra-red ("IR") codes, and other similar machine-readable codes.

Figure 4F:
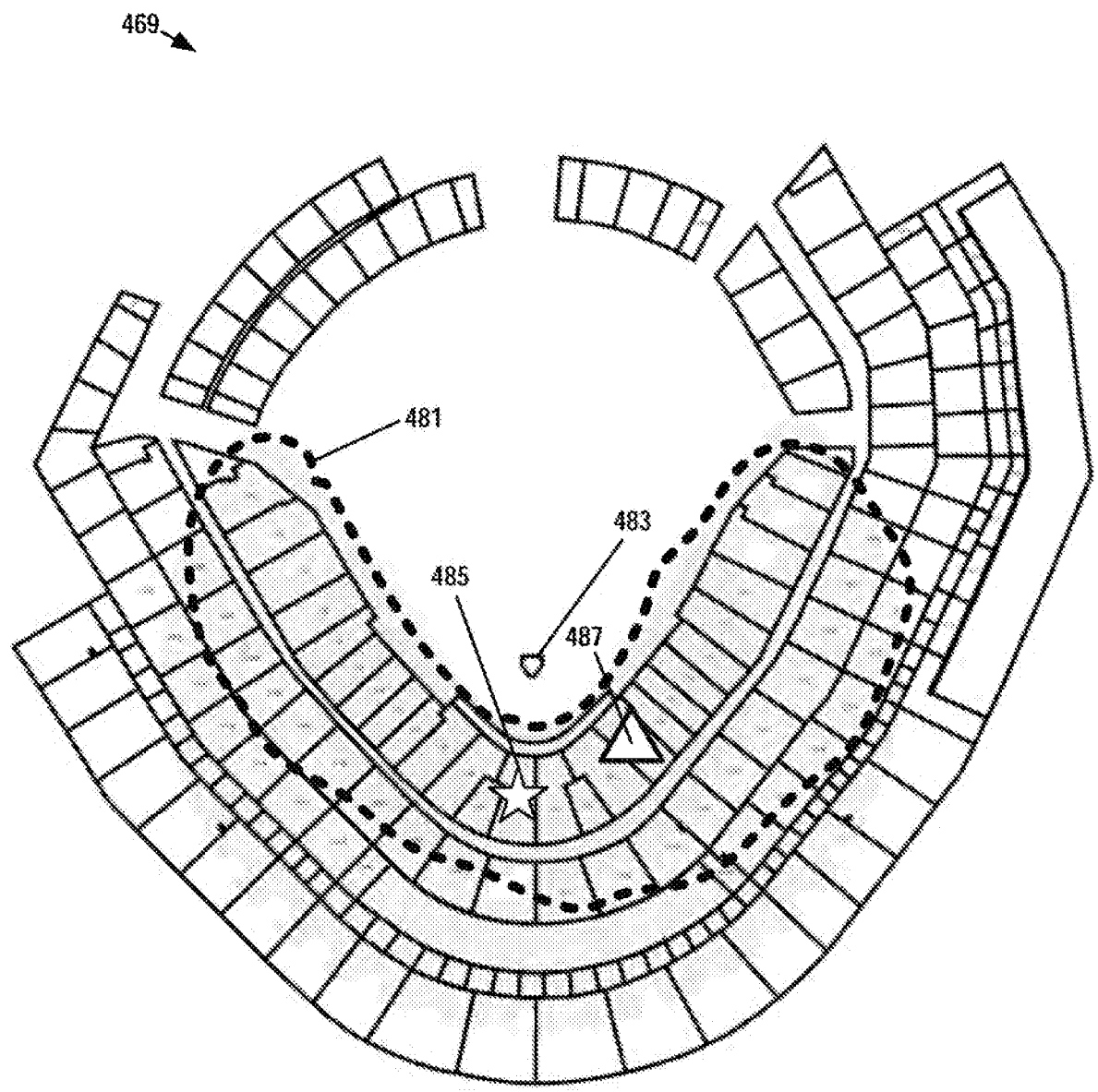
FIG. 4F illustrates a map that may be displayed on a portable computing device when a map option is selected from the list of options illustrated in FIG. 4D according to one exemplary embodiment.

FIG. 4F illustrates a map 469 that may be displayed on a portable computing device 101 when a map option 469 is selected from the list of options illustrated in FIG. 4D according to one exemplary embodiment. The map 469 may highlight regions of a live event venue with special characters such as dashed lines 481 in order to highlight seating preferences of the operator of the PCD 101. The map for 69 may further comprise other characters such as a star shaped character 485 to indicate the current location of the operator the PCD 101.

Similarly, another special shaped character such as a triangle shaped character 487 may be used to highlight a seat upgrade or a downgrade, as the case may be, within the live event venue. In the exemplary embodiment illustrated in FIG. 4F, a baseball field stadium as illustrated and highlighted with a pentagon shaped character 483 to illustrate the location of the home plate for the baseball field. The system 400 is not limited to the graphical techniques illustrate. Other graphical techniques for highlighting options available and selected by the operator the PCD 101 are within the scope of this disclosure as understood by one of ordinary skill in the art.

An exemplary scenario in which an operator of a PCD 101 desires to find another seat is as follows: After expressing an interest to find a different seat (See GUI 580 of FIG. 5C), an operator of a PCD 101 may enter his or her current ticket information (Step 510—FIG. 5B) which could include their current seating location (not shown) or simply their group size (See GUI 581 of FIG. 5D) on either a PCD server 421 which communicates directly with the PCD 101 or a third party server 422 which may also communicate directly with the PCD 101. Either the PCD server 421 or the third party server 422 may relay options selected by the operator the PCD 101 to the core inventory service 401 via the API 420.

The core inventory service 401 (FIG. 4A) or server 102 (FIG. 5A) may then query the ticket database 430 (FIG. 4A) or 582 (FIG. 5A) to determine the current event (Step 515—FIG. 5B) either from the entered ticket or by using the timestamp and location of the operator's portable computing device 101.

The server 401 (FIG. 5A) or server 102 (FIG. 5A) may then query the pricing regions database 443 (FIG. 4A) to determine the face value of the user's current tickets. The server 401 may then query the ticket database 430 to determine if there are any available seats (Step 520—FIG. 5B).

Figure 5A:
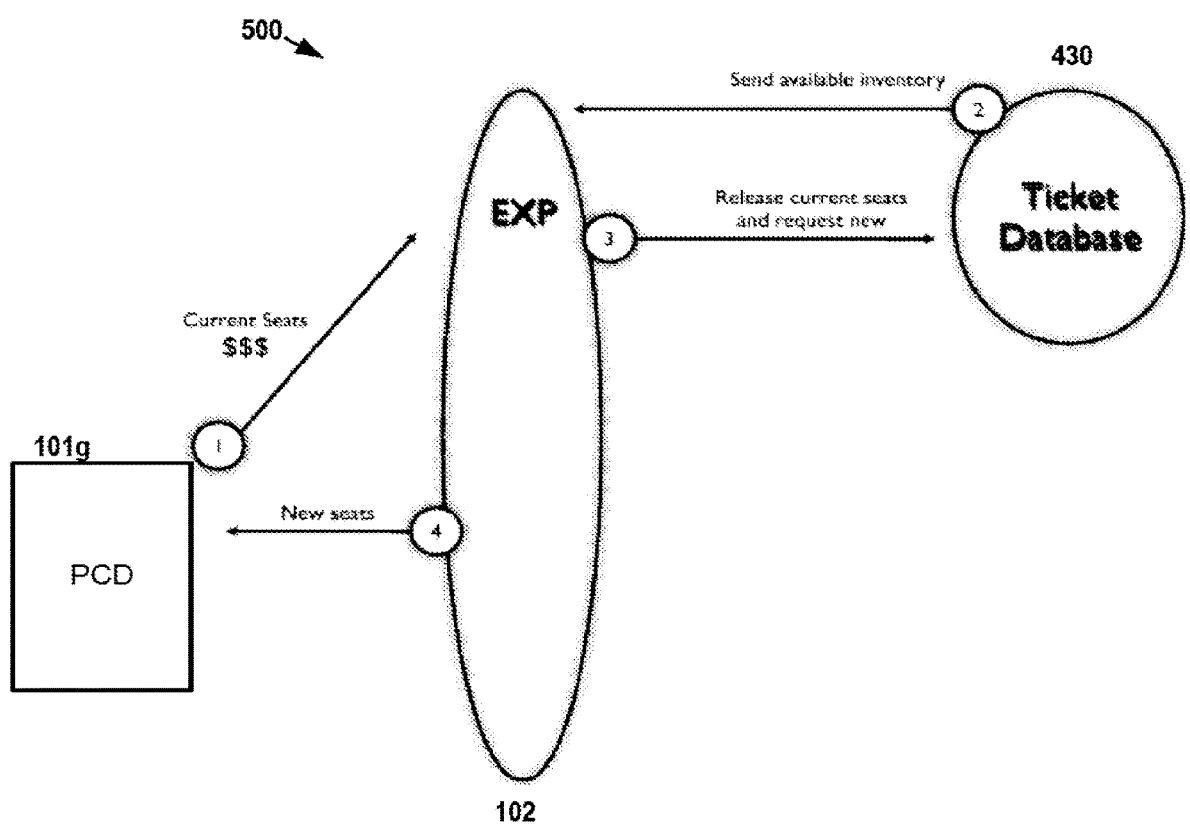
FIG. 5A illustrates a system for upgrading a portable computing device ticket according to one exemplary embodiment.
Figure 5B:
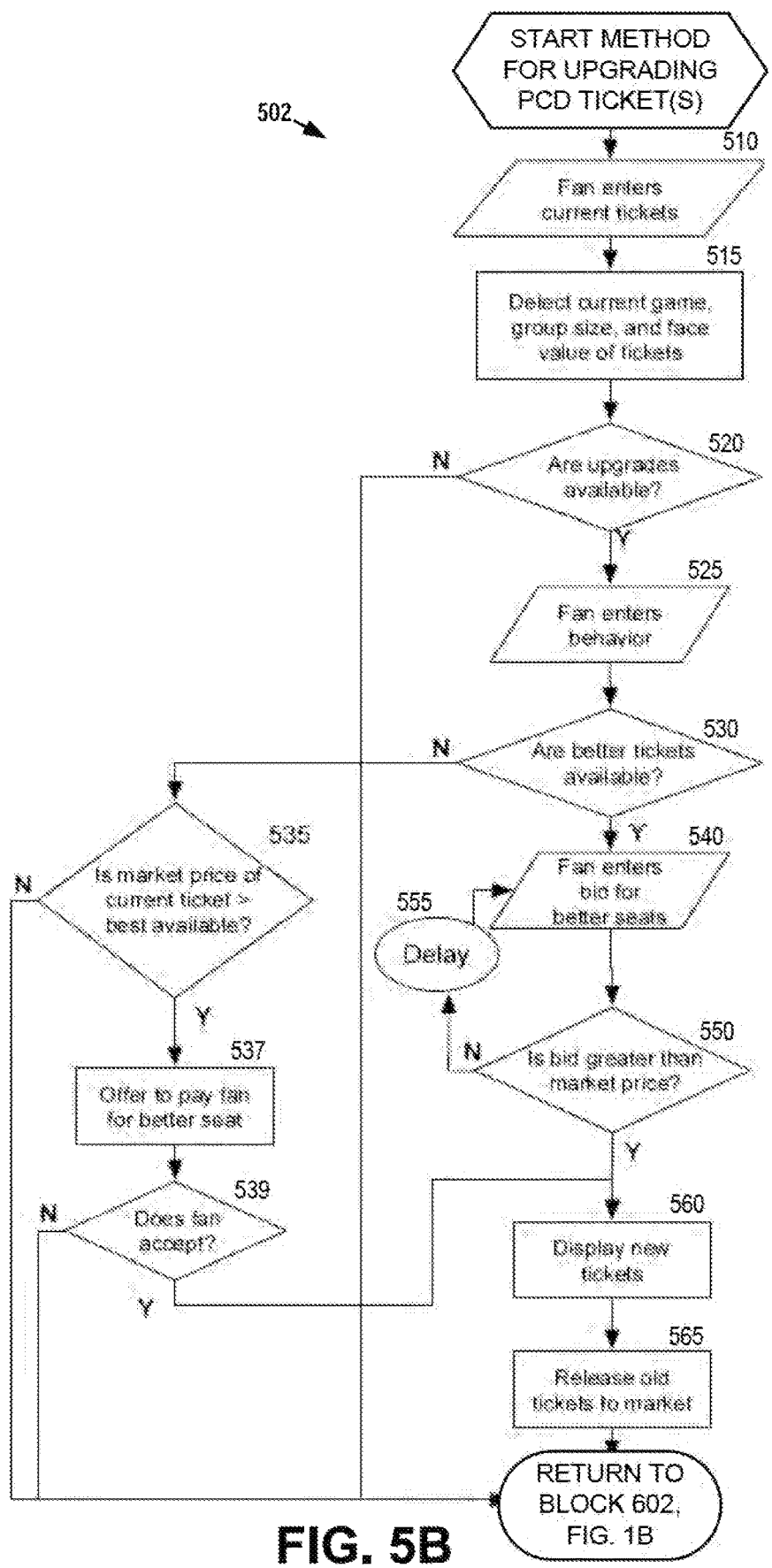
FIG. 5B is a logical flowchart illustrating a method for upgrading a portable computing device ticket according to one exemplary embodiment.
Figure 5C:
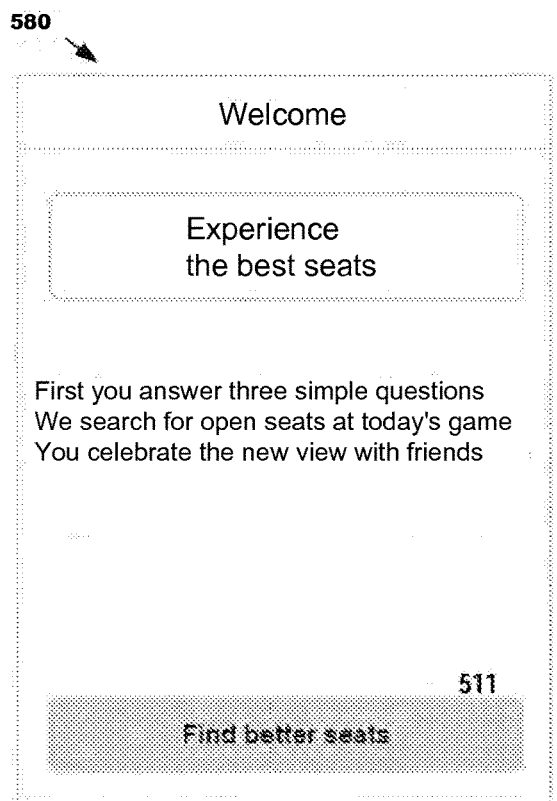
FIG. 5C illustrates a graphical user interface of a portable computing device that displays an introduction for questions used for filtering options available to the operator of a portable computing device when upgrading portable computing device tickets according to one exemplary embodiment.
Figure 5D:
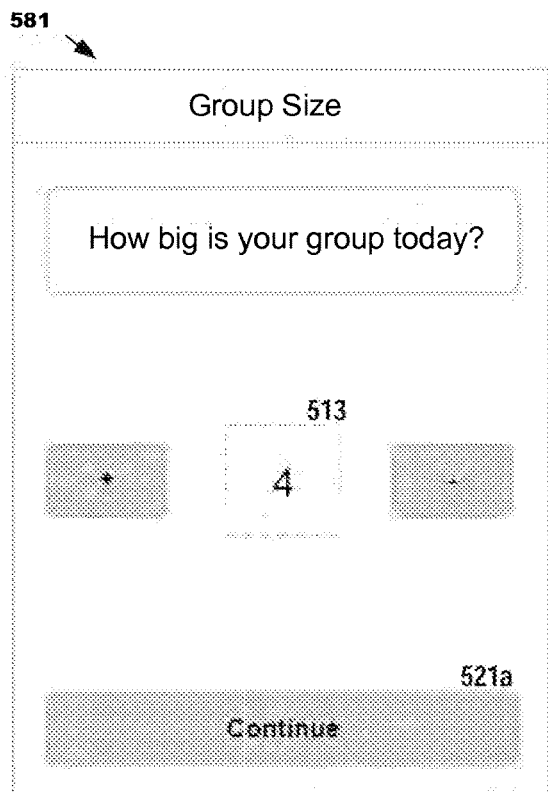
FIG. 5D illustrates a graphical user interface of a portable computing device that displays a question about the size of a group of consumers who may be seated together at a live event according to one exemplary embodiment.
Figure 5E:
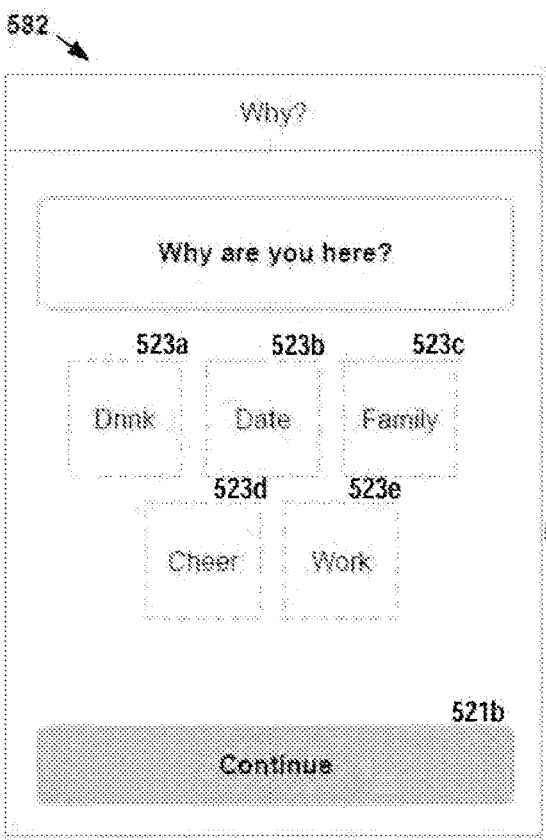
FIG. 5E illustrates a graphical user interface of a portable computing device that displays a question which asks the operator of the portable computing device the reason for attending the live event according to one exemplary embodiment.
Figure 6B:
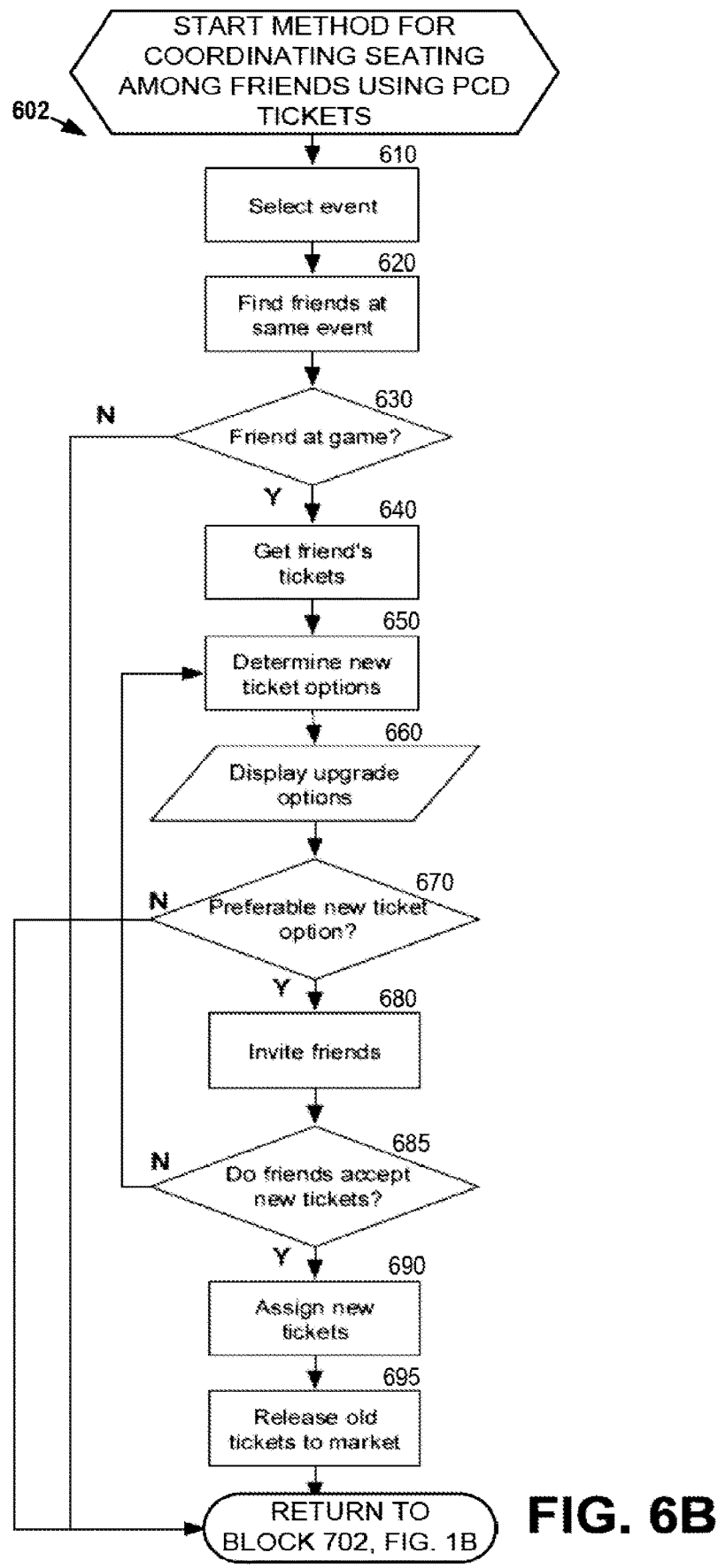
FIG. 6B is a logical flowchart illustrating a method for coordinating seating among friends using portable computing device tickets according to one exemplary embodiment.

If there are available seats, the operator of the PCD 101 then enters their reason for attending the event (Step 525—FIG. 5B, GUI 582—FIG. 5E). The server 401 (FIG. 4A) or 102 (FIG. 5A) may then determine if there are better seats available based on the market price of their current ticket and all available seats using the market price system 441 (FIG. 4A).

If there are better seats (Step 530—FIG. 5B), the user may be required to provide a price they are willing to pay (Step 540—FIG. 5B, GUI 584—FIG. 5G) or alternatively the user is displayed the market price via a list of predefined categorical buckets based on physical location (i.e. seats on the Court, behind the glass, etc.), demographics (Family Friendly, Adults Only), or other relevant attributes (in the shade, club access, Free, etc.) (See GUI 583—FIG. 5F).

If the bid submitted by the operator of the PCD 101 is below market price (Step 550—FIG. 5B), the operator may be required to wait (Step 555—FIG. 5B) before they are allowed to rebid. This time delay (Step 555) may be provided to prevent an operator of a PCD 101 from slowly increasing their bid over time in order to determine the hidden market price of the upgrade.

Additionally, the system 400 could prompt the operator the PCD 101 during the delay (Step 555) an offering of a certain price for an instant upgrade thus bypassing the bid process. Once a bid is accepted ("Yes" branch of Step 550—FIG. 5A), the operator of the PCD 101 may be shown the new PCD tickets (Step 560—FIG. 5A, See GUI 585 of FIG. 5H). The old tickets of the PCD operator are released back into to the primary ticketing database 430 to be resold into the market as a vacated ticket (Step 565—FIG. 5B).

If before an upgrade, an operator of a PCD 101 has a ticket better than any other ticket in the market (Step 530—FIG. 5A—negative answer), and the market price of the operator's current ticket exceeds that of the best available open seat (Step 535—FIG. 5B—positive answer), then the system 400 may offer the user a value in a currency, such as in U.S. dollars, prepaid value at the venue, or loyalty points to downgrade to lesser grade seats (Step 537—FIG. 5B). If the operator of the PCD 101 accepts this offer (Decision Step 539—FIG. 5B), then the old tickets are released back into the market (Step 565—FIG. 5B) and the user is presented with new tickets (Step 560—FIG. 5B).

FIG. 5A illustrates a system 500 for upgrading a portable computing device ticket according to one exemplary embodiment. The system 500 may comprise a server 102 and a ticket database 582. The server 102 and ticket database 582 may include several of the system elements described above in connection with FIG. 4A. That is, the server 102 and/or ticket database 582 may comprise the core inventory service 401, the API 420, the ticket database 430, and anyone of the databases 440-444 which were described in detail above. FIG. 5A offers a very high-level view of potential hardware architecture for the elements described above in connection with FIG. 4A.

FIG. 5B is a logical flowchart illustrating a method 502 for upgrading a portable computing device ticket according to one exemplary embodiment. A summary for the logical flow of FIG. 5B is as follows: To request a seat upgrade, the operator of the PCD 101 first enters his or her current tickets (Step 510) at which time the system 400 collects relevant information from that ticket (Step 515), including the event, group size, and face value of the ticket. The system 400 then determines if there are available upgrades for the given event (Step 520). If upgrades are available, the operator is then required to confirm behavioral characteristics (Step 525) and then system checks to see if better tickets are available for upgrade (Step 530). If no better tickets are available, the system checks if the market value of the individual's ticket is greater than the best available upgrade (Step 535).

If yes, the system 400 may then offer to purchase the ticket from the individual (Step 537). If the individual accepts (Step 539), new tickets are delivered (Step 560) and the previous tickets are released back into the market (Step 565). If there are better tickets available (Step 530), the individual is required to place a bid on the upgrade (Step 540). If the bid exceeds market value (Step 550), then new upgrade is delivered (Step 560) and the old tickets are released into the market (Step 565). If the bid is below market price (Step 550), the individual is required to wait a certain period of time (Step 555) and is then offered to place a new bid (Step 540).

A fundamental value of a fluid electronic ticket or a portable computing device ticket is the ability to move seats in real time. Imagine waiting in line for concessions and running into a friend who is also attending the live event. Wanting to sit together for the remainder of the event, the operator of a PCD 101 leverages the system 400 of FIG. 4A to change his seats.

FIG. 5C illustrates a graphical user interface 580 of a portable computing device 101 that displays an introduction for questions used for filtering options available to the operator of a portable computing device 101 when upgrading portable computing device tickets according to one exemplary embodiment. In this exemplary embodiment, the introduction explains to the operator the PCD 101 that he or she will answer at least three questions in order to help the system 400 in order find an appropriate seat upgrade and/or downgrade for the operator. The GUI 580 may include a start button 511 that allows the operator to begin the process of finding a different seat at a live event.

FIG. 5D illustrates a graphical user interface 581 of a portable computing device 101 that displays a question about the size 513 of a group of consumers who may be seated together at a live event according to one exemplary embodiment. In this exemplary embodiment, the operator of the PCD 101 may select buttons on either side of the size value 513 in order to increase or decrease the value of the size value 513. This GUI 581 further includes a continue button 521 that may be depressed in order to continue with the filtering process.

FIG. 5E illustrates a graphical user interface 582 of a portable computing device 101 that displays a question which asks the operator of the portable computing device the reason for attending the live event according to one exemplary embodiment. According to this embodiment, answers 523 to this question may be provided so that the operator of the PCD 101 may select from these answers 523. This GUI 582 also includes a continue button 521b.

Figure 5F:
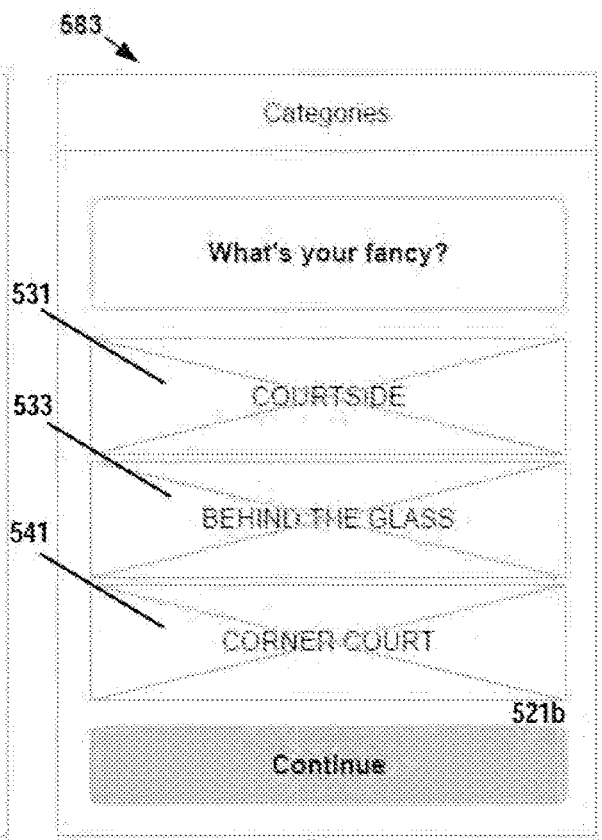
FIG. 5F illustrates a graphical user interface of a portable computing device that displays a question which asks the operator of the portable computing device to express a preference with respect to locations within a venue of a live event according to one exemplary embodiment.

FIG. 5F illustrates a graphical user interface 583 of a portable computing device 101 that displays a question which asks the operator of the portable computing device to express a preference with respect to locations within a venue of a live event according to one exemplary embodiment. In this exemplary embodiment, answers 531, 533, and 541 may be provided so that the operator of the PCD 101 may select from these answers. In this particular embodiment, the first answer 531 is courtside; the second answer 533 is behind the glass; and the third answer is corner court. These answers correspond with a venue for a basketball sporting event as understood by one of ordinary skill the art. The answers may change for other types of live events such as music concerts and other sporting events, like football and baseball.

FIG. 5G illustrates a graphical user interface 584 of a portable computing device 101 that displays options 543 for pricing of an upgrade according to one exemplary embodiment. The options 543 may start with a face value of the current ticket being held by the operator of the PCD 101. The operator of the PCD 101 may be able to enter values higher or lower than this start value. In the exemplary embodiment illustrated, the operator may depress a plus or minus sign to increase or decrease the starting value for which the operator is willing to pay for an upgrade and/or downgrade of a seat at a live event. In other exemplary embodiments, the operator of the PCD 101 may be able to key-in directly the value that he or she is willing to pay for the upgrade and/or downgrade.

FIG. 5H illustrates a graphical user interface 585 of a portable computing device 101 that displays an upgraded portable computing device ticket 553 according to one exemplary embodiment. The upgraded ticket displayed by this GUI 585 may be similar to prior displays of portable computing device tickets 553. The portable computing device ticket 553 may list the details of the location for the upgraded or downgraded seat as understood by one of ordinary skill in the art. In the exemplary embodiment illustrated in FIG. 5H, the section, row, and seat number are displayed for the PCD ticket 553.

FIG. 6A illustrates a system 600 for coordinating seating among friends using portable computing device tickets according to one exemplary embodiment. The system 600 may comprise the server 102 of FIG. 1A, the ticket database 430 of FIG. 4A, and one or more portable computing devices 101 that correspond to a plurality of operators who wish or desire to sit together at a live event. The system 600 may work as follows according to one exemplary embodiment: operators of PCDs 101 at a first and second stage offer up their current seats and make an offer of money for upgraded seats to the server 102.

Next, at a third stage, the ticket database 430 indicates what seats are available based on the criteria provided by the operators of the PCDs 101. If the operators of the PCD's 101 accept the available seats, then a fourth stage, the old seats are released and put back into the ticket database 430. Next, at the fifth stage, the new upgraded and/or downgraded seats are provided to the operators of the PCDs 101.

FIG. 6B is a logical flowchart illustrating a method 602 for coordinating seating among friends using portable computing device tickets according to one exemplary embodiment. This method 602 is supported by the system 600 illustrated in FIG. 6A.

First, an operator of a PCD 101a selects the event (Step 610) at which he is attending by either manually selecting 601 or the system 600 determining the event automatically using a combination of the user's portable computing device timestamp and GPS location. In step 620, the server 102 queries the user database 444 to acquire a list of user's friends and filtering (See decision Step 630, FIG. 6B) the database using the friends also at this current event.

If friends are at the event (Yes answer—decision Step 630), then the server 102 queries the ticketing database 430 (FIG. 4A) to acquire the ticket locations (Step 640, FIG. 6B) for each friend. The server 102 (or 401 of FIG. 4) sends this list and ticket locations of the friends to the user's portable computing device 101 for display (See GUI 602 of FIG. 6C). The list may be displayed in either a list format (not shown) or a map with each friend placed as a marker on the map (See GUI 603 of FIG. 6D).

If the operator of the PCD 101 has already purchased a ticket and is already at the event, the operator's current ticket location will already be on the display. However, if the operator has not purchased a ticket, the best available ticket location will be displayed (Step 650, FIG. 6B) which is pulled from the ticketing database 430. The user 423 is then able to select and deselect different friends (See GUIs 605 and 607 of FIGS. 6E and 6F).

Figure 6G:
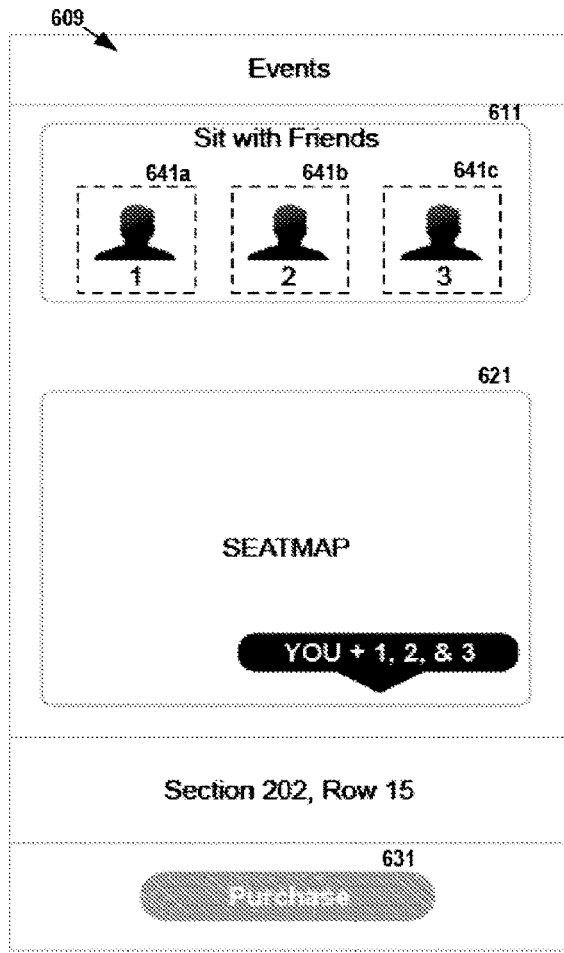
FIG. 6G illustrates a graphical user interface of a portable computing device that displays a seat map of available seats based on a third number of friends selected by the operator of the portable computing device according to one exemplary embodiment.

As different friends are selected, the server 102 may query (Steps 640-650) the seating optimization system 440 of FIG. 4A and returns the new best available ticket location (See GUIs 609 of FIG. 6G, Step 660, FIG. 6B). If the new ticket location is considered beyond the range of generally acceptable movements (from movement regions database 442 of FIG. 4A) the user will be notified with a message. For instance, the message or notice may include changing the color of a seat marker on a map.

Figure 6H:
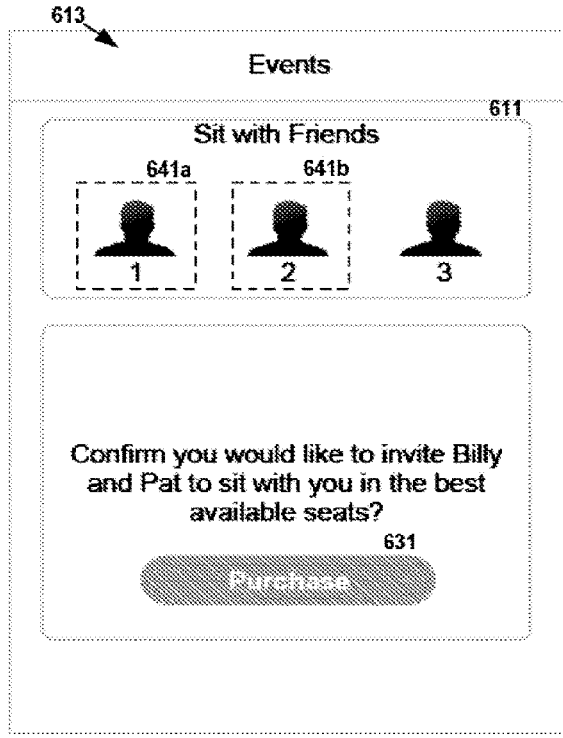
FIG. 6H illustrates a graphical user interface of a portable computing device that displays a confirmation command that the operator of the portable computing device desires to switch seats so that he or she may be seated together with friends according to one exemplary embodiment.

Regardless, the operator of the PCD 101 must decide if sitting with friends is worth the change of seat location (Step 670 of FIG. 6B, GUI 613 of FIG. 6H). If the operator is satisfied, the server 102 may send a message to each individual friend's portable computing device 101 over a wireless network requesting a confirmation of the seat change request (Step 680 of FIG. 6B, GUI 613 of FIG. 6H). This seat change request may or may not require a monetary value in exchange for the new seats.

If all friends accept (Positive answer to Step 685 of FIG. 6B), the new tickets are assigned to the group (Step 690, FIG. 6B) and the server 102 or 401 (of FIG. 4A) sends down the new ticket information to the operator where it is displayed on the portable computing device (See GUI 615 of FIG. 6I) and the old tickets are released back into the ticket database 430 and potentially the primary ticketing system 433 of FIG. 4A (Step 695 of FIG. 6B). If the friends do not accept (Negative answer to Decision Step 685 of FIG. 6B), then the operator of the PCD 101 is required to select a new group of friends to sit with (See GUI 603 of FIG. 6D).

A summary of the flow chart of FIG. 6B is as follows: To upgrade tickets or buy new tickets to sit with friends, an operator of a PCD 101 must first select the event at which they are attending (Step 610). The system 600 searches for friends of the individual who have already purchased tickets (Step 620). If friends are attending (Step 630), the system 600 analyzes their tickets (Step 640) and generates the possible permutations and associated ticket location options (Step 650). The permutations are displayed to the individual (Step 660). If a permutation is found acceptable by the operator of the PCD 101 (Step 670), then the friends are sent a request to change tickets (Step 680).

Upon all friends accepting the invitation (Step 685), the new tickets are assigned to the operator of the PCD 101 and friends (Step 690) also operating there PCDs 101. The old tickets are then released back into the market (Step 695). If one or all friends decline the invitation (Step 685), the operator of the PCD 101 is presented with a new set of permutations.

FIG. 6C illustrates a graphical user interface 602 of a portable computing device 101 that displays a list of options 355 that includes an option 355b for sitting with friends at a live event according to one exemplary embodiment. If the friend's option 355b is selected, then the GUI 603 of FIG. 6D may be generated as described below.

FIG. 6D illustrates a graphical user interface 603 of a portable computing device 101 that displays a list 611 of friends who are currently attending a live event and who are not seated next to the operator of the portable computing device 101 according to one exemplary embodiment. The GUI 603 may further include a seat map 621 to convey the locations of friends relative to the operator of the PCD 101. The operator of the PCD 101 may purchase a seat highlighted on the seat map 621 by selecting the purchase button 631.

FIG. 6E illustrates a graphical user interface 605 of a portable computing device 101 that displays a seat map 621 of available seats based on a first number of friends selected by the operator of the portable computing device according to one exemplary embodiment. According to this exemplary embodiment, the operator of the PCD 101 has selected a first friend 641a highlighted with a dashed box. The seat map 621 may convey the relative location of the two new seats corresponding to the operator the PCD 101 and the first friend 641a who was selected.

FIG. 6F illustrates a graphical user interface 607 of a portal computing device 101 that displays a seat map 621 of available seats based on a second number of friends selected by the operator of the portable computing device according to one exemplary embodiment. According to this exemplary embodiment, the operator of the PCD 101 has selected two friends 641A, 641B in which corresponding icons have been highlighted with two dashed boxes.

The seat map 621 displays a relative location of the three new seats corresponding to the seat occupied by the operator of the PCD 101, the seat occupied by the first friend 641a, and the seat occupied by the second friend 641b. Compared to the GUI 605 of FIG. 6E, one of ordinary skill the art will recognize that the three seats illustrated in the map 621 of FIG. 6F are at a different location within map 621 relative to the two seats highlighted in map 621 of FIG. 6E.

FIG. 6G illustrates a graphical user interface 609 of a portable computing device 101 that displays a seat map 621 of available seats based on a third number of friends selected by the operator of the portable computing device according to one exemplary embodiment. According to this exemplary embodiment, the operator of the PCD 101 has selected at least three friends 641a, 641b, 641c to sit with at a live event as indicated by the three dashed boxes. The seat map 621 also highlights a relative location of the four seats occupied by the operator of the PCD 101, the first friend 641a, the second friend 641b, and the third friend 641c.

FIG. 6H illustrates a graphical user interface 613 of a portable computing device 101 that displays a confirmation command prompt 631 that the operator of the portable computing device 101 desires to switch seats so that he or she may be seated together with friends according to one exemplary embodiment. This command prompt 631 is displayed when the operator of the PCD 101 selects one of the friends seating options illustrated in GUIs 605, 607, and 609 of FIGS. 6E-6G.

Figure 6I:
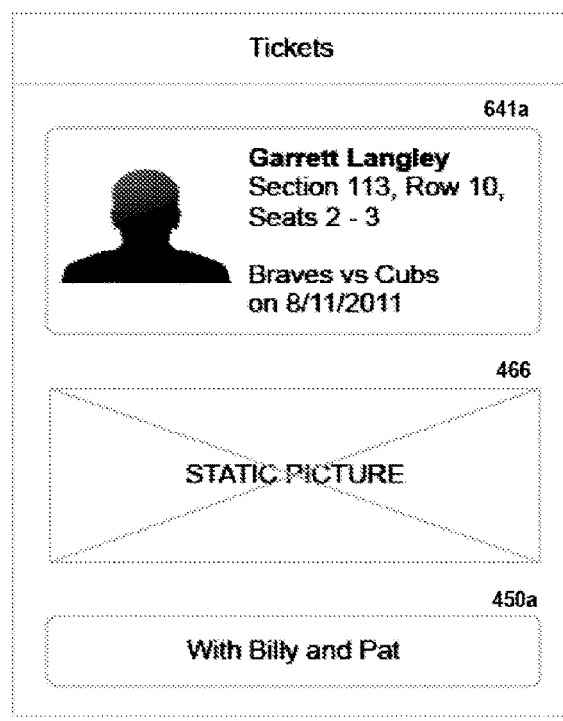
FIG. 6I illustrates a graphical user interface of a portable computing device that displays an electronic ticket corresponds to the ticket with friends option selected by the operator of the portable computing device according to one exemplary embodiment.

FIG. 6I illustrates a graphical user interface 615 of a portable computing device 101 that displays an electronic ticket that corresponds to the ticket with friends option selected by the operator of the portable computing device 101 according to one exemplary embodiment. The GUI 615 displays the friends sitting with the operator of the PCD 101 in the field labeled 450a. This GUI 615 direct which corresponds with the GUI 452 of FIG. 4D.

Figure 7A:
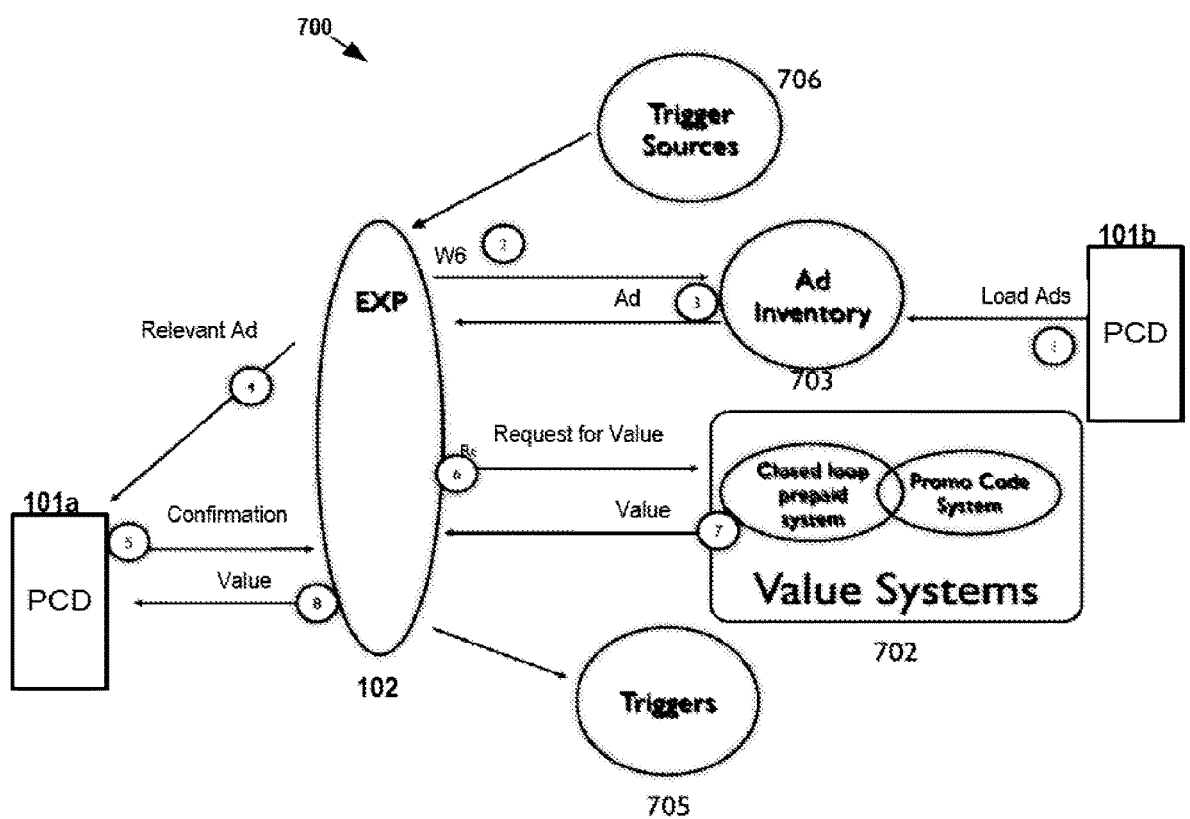
FIG. 7A illustrates a system for creating, managing, and delivering actionable advertisements associated with portable computing device tickets according to one exemplary embodiment.

FIG. 7A illustrates a system 700 for creating, managing, and delivering actionable advertisements associated with portable computing device tickets according to one exemplary embodiment. The system 700 may comprise the server 102, triggering sources 706, an ad inventory database 703, a value systems database 702, a triggers module 705, and one or more portable computing devices 101. The fluid/electronic ticket system 700 may create a unique advertising opportunity allowing advertisers to reach operators of PCDs 101 who may be in an emotional state during a live event, like a baseball game.

During a live event, the fluid/electronic ticket system may captures the who, whom with, what, where, and when of each operator of a PCD 101 once they have received a fluid, electronic ticket (See GUI 780 of FIG. 7C) on their portable computing device 101. Throughout a live event, like a baseball game, the fluid electronic ticket system may capture data via the Internet from the trigger sources (706, FIG. 7A) such as scoreboard data at a baseball game that includes inning, hits, strikeouts, and runs (Step 710, FIG. 7B).

As the server 102 (FIG. 7A) captures information from the trigger source 706 (FIG. 7A), it checks with the internal database of triggers 705 (FIG. 7A, Step 710, FIG. 7B) to determine if an actionable event (i.e. trigger) has occurred (Step 720, FIG. 7B) such as a particular player hitting a home run (See GUI 781 of FIG. 7D) or a certain inning being reached in a baseball game.

Once a trigger occurs (Yes answer to decision Step 720, FIG. 7B), the server 102 queries an internal database 703 (Step 730, FIG. 7B) of ads 703 to determine if a trigger ad exists (Step 740, FIG. 7B) for that operator of a PCD 101. If an ad exists for that operator and trigger, the server 102 sends the ad to the portable computing device 101 (Step 750, FIG. 7B) via a wireless network such as Wifi or 3G.

Most ads will include some form of required engagement such as watching a video to receive the value of the ad. If the user engages with the ad (Step 760, FIG. 7B), value such as a prepaid account will be sent to the operator of the PCD 101 (FIG. 7A) from the server 102 (FIG. 7A, Step 770, FIG. 7B) which queries the value system 702 (FIG. 7A) such as a 3rd party prepaid system or a 3rd party promo code system.

The value system 702 may generate a barcode/promo code that could be used during a live event, such as a sporting event, for concessions. Alternatively, the value system 702 may comprise a database containing a series of promotional codes that were redeemable in-venue or on-line. Upon watching an ad on a portable computing device 101 that may be generated by the a client application running on the PCD 101 and communicating with the ad server 102, the operator of the PCD 101 may receive one of the promotional codes generated by value system 702. Specifically, if an operator of a PCD 101 watches an advertisement from a first merchant, and first merchant may facilitate the operator of the PCD 101 receiving a $5 dollar value in pre-paid concessions at a sporting event such as a baseball game. The value system 702 may comprise an existing prepaid network running at a sporting venue, such as at a baseball stadium.

Advertisers may be required to insert ads into the Ad inventory 703 (FIG. 7A). Ads may be required to include at least three components: the content of the advertisement, the type of group targeted (based on who, what, whom with, when, and where) and some value such as a prepaid account for concessions. An example Ad entry may comprise a buy-one-get-one deal on beer for groups of three men or greater at a baseball game when a home run is hit. Therefore, the family of four would not receive this offer, but the group of four male friends from college would receive a nice deal on beer after the home run. This ad could also include an instant replay of the home run (See GUI 782 of FIG. 7E) or some other interactive media available on the portable computing device 101.

One example ad may be designed for fanatics/fans of a particular team or player. When this player hits a home run, the user operator of the PCD 101 is notified on their portable computing device 101 of the ad (See GUI 781 of FIG. 7D), if the user chooses to engage, an instant replay of the home run (See GUI 782 of FIG. 7E) is streamed to the user's portable computing device 101.

The sponsor of this advertisement (See GUI 782 of FIG. 7E) is also displayed to the operator of the PCD 101. At the conclusion or during the instant replay, a call to action (See GUI 783 of FIG. 7F)(Step 770, FIG. 7B) to order/purchase a particular piece of merchandise such as a jersey of the home run hitter is displayed (See GUI 783 of FIG. 7F). The operator of the PCD 101 is able to order the merchandise without leaving his or her seat (See Confirmation of order GUI 784 of FIG. 7G).

Another example is designed for those operators of PCDs 101 grown easily tired of long events such as professional baseball. During the 7th inning stretch, an operator of a PCD 101 is notified of an upcoming season premiere of a popular television show (See GUI 785 of FIG. 7H). If the operator of the PCD 101 chooses to engage the offer, a preview of the television show and the sponsor's logo is streamed to the user's portable computing device 101 (See GUI 786 of FIG. 7I). The operator of the PCD 101 also the ability to easily share this ad across social networks, such as FACEBOOK™ or LINKED-IN™ brand networks.

A third example is designed for advertisers to sponsor free seat upgrades (See GUI 787 of FIG. 7J) using the seat upgrade process illustrated in FIG. 5B described above. After arriving at a game, a group of four people who match the advertisers defined who, what, when, whom with, and where such as a double date on a Friday night at a professional basketball game are offered free upgrades (See GUI 787 of FIG. 7J) and a prepaid value redeemable at the basketball game. This ad would also include the sponsor's logo, such as a beverage merchant, restaurant merchant, etc.

A fourth example would include delivery by the owner of the life event venue such as the stadium owner of a sports team who wants to promote additional concessions sales. For example, in a baseball game at the beginning of the 5th inning, the server 102 may deliver an advertisement that offers a special on a combination of concessions such as a hot dog and a beer (See GUI 788 of FIG. 7K). The operator of the PCD 101 would be able to order these concessions without leaving his or her seat at the live event (See GUI 789 of FIG. 7L).

A fifth example of an actionable advertisement may be delivered by the owner of a nearby establishment such as a bar or restaurant. At the conclusion of an exciting live event, such as the home team winning the game causing emotions of fans to run high, the server 102 (FIG. 7A) would deliver a congratulations ad for the winning team's fans (See GUI 790 of FIG. 7M). If the operator of the PCD 101 engages the advertisement, he is offered 50% off of his meal that night at the nearby restaurant such as at a Tavern (See GUI 791 of FIG. 7N) and is able to redeem this deal without leaving the game or his/her seat (See GUI 792 of FIG. 7O).

Figure 7B:
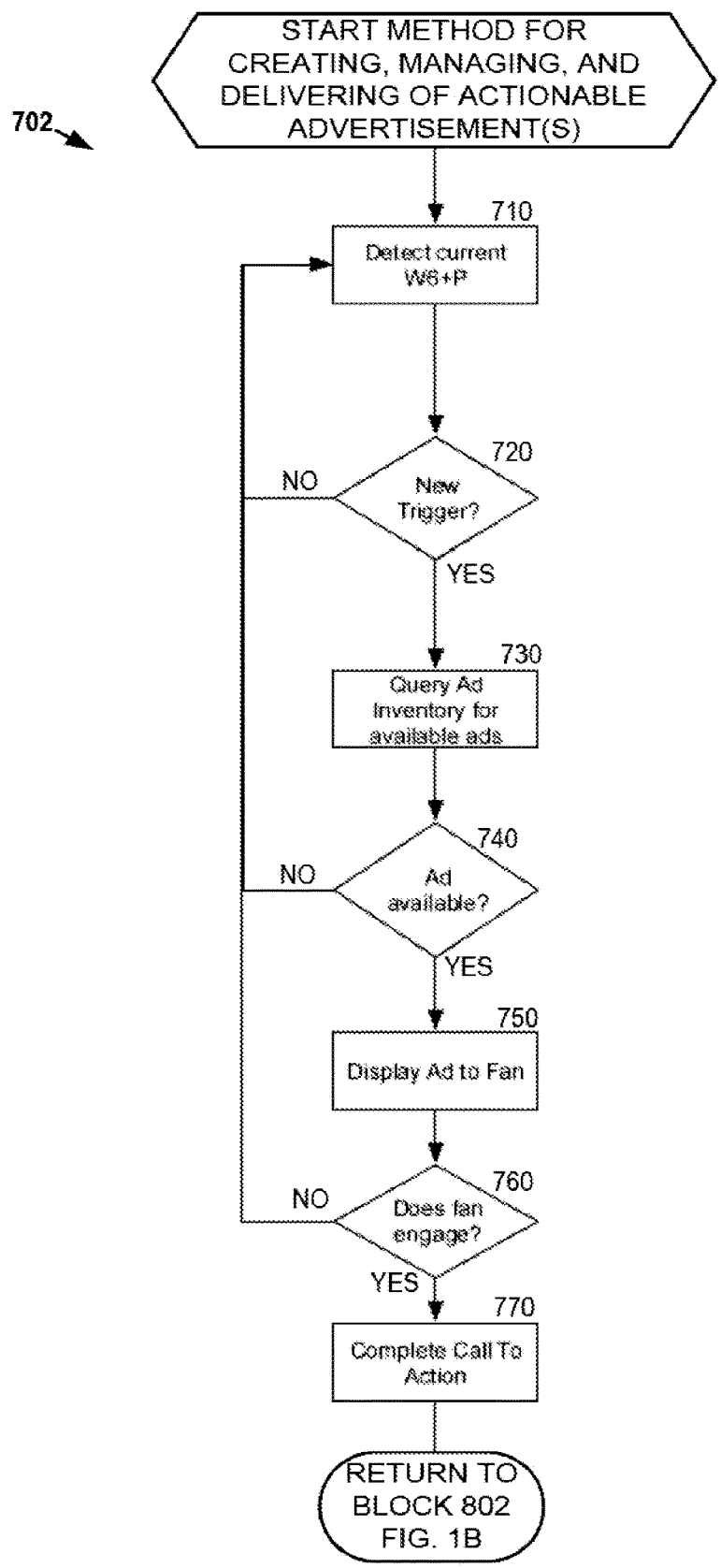
FIG. 7B is a logical flowchart illustrating a method for creating, managing, and delivering actionable advertisements associated with portable computing device tickets according to one exemplary embodiment.

FIG. 7B is a logical flowchart illustrating a method 702 for creating, managing, and delivering actionable advertisements associated with portable computing device tickets according to one exemplary embodiment. A summary of the flow chart of FIG. 7B is as follows: When an operator of a PCD 101 opens a connection with the system 700, that individual's characteristics are stored in the system (Step 710) which includes his/her demographics, seat location, price paid, whom they sit with, and why they are at the event. At this point, the system 700 constantly monitors the live event for a trigger (Step 720) such as a home run, specific inning, or end of game.

The system 700 then queries the ad inventory (Step 730) to determine if there is a specific ad for the given individual and the given trigger (Step 740). If so, an ad is displayed on the individual's portable computing device 101 (Step 750). If the individual then chooses to engage the ad (Step 760) with his portable computing device 101, the specific call to action (promo code, prepaid value, etc) is sent down to the individual's portable computing device 101 (Step 770).

FIG. 7C illustrates a graphical user interface 780 of a portable computing device 101 that displays an electronic or portable computing device ticket according to one exemplary embodiment. This exemplary embodiment is very similar to the GUI 452 of FIG. 4D.

FIG. 7D illustrates a graphical user interface 781 of a portable computing device 101 that displays an option 771 for viewing a video that has captured a portion of a live event according to one exemplary embodiment. FIG. 7E illustrates a graphical user interface 782 of a portable computing device 101 that displays a video 466 in response to the option 771 selected in FIG. 7D according to one exemplary embodiment.

FIG. 7F illustrates a graphical user interface 783 of a portable computing device that displays an option 775 for purchasing an item associated with the video 466b which was just viewed by the operator of the portable computing device 101 according to one exemplary embodiment. FIG. 7G illustrates a graphical user interface 784 of a portable computing device 101 that displays a confirmation message 773 in response to the option 775 selected in FIG. 7F according to one exemplary embodiment.

FIGS. 7H and 7I illustrate graphical user interfaces 785 and 786 of a portable computing device 101 that display a video 466 of a segment that may not be associated with the live event according to one exemplary embodiment. FIG. 7J illustrates a graphical user interface 787 of a portal computing device 101 that displays a seat upgrade 711 and a machine-readable code 713A.

FIG. 7K illustrates a graphical user interface 788 of a portable computing device 101 that displays an option 715 for ordering from a concession stand at a live event according to one exemplary embodiment. The GUI 788 may further include an "order here" button 717 which may complete a transaction for purchasing goods and/or services from the concession stand at a live event.

Figures 7M, 7N:
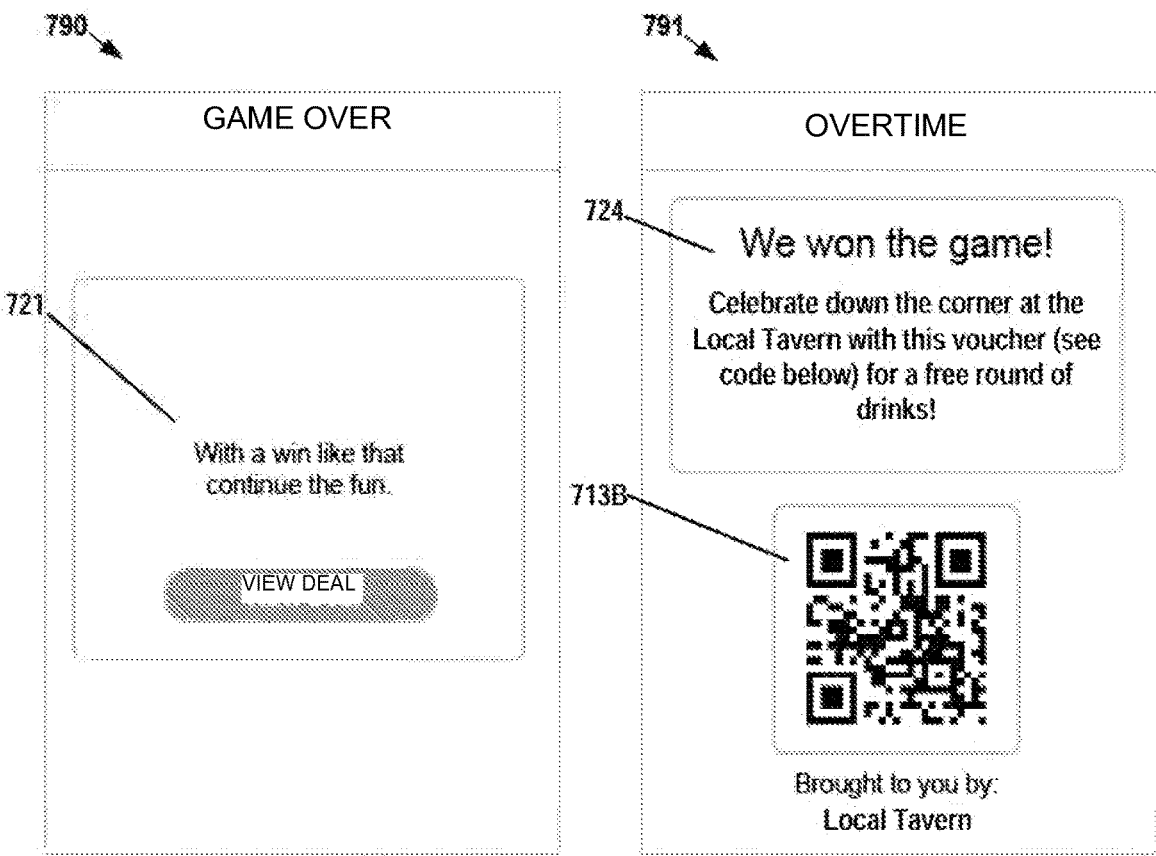
FIG. 7M illustrates a graphical user interface of a portable computing device that displays an offer to the operator of the portable computing device that is associated with the live event according to one exemplary embodiment.
FIG. 7N illustrates a graphical user interface of a portable computing device that displays a machine readable code redeemable for value according to one exemplary embodiment.

FIG. 7L illustrates a graphical user interface 789 of a portable computing device 101 that displays a confirmation 719 of the concession order placed in response to the option 717 selected in FIG. 7K according to one exemplary embodiment. FIG. 7M illustrates a graphical user interface 790 of a portable computing device 101 that displays an offer 721 to the operator of the portable computing device 101 that is associated with the live event according to one exemplary embodiment.

Figure 7O:
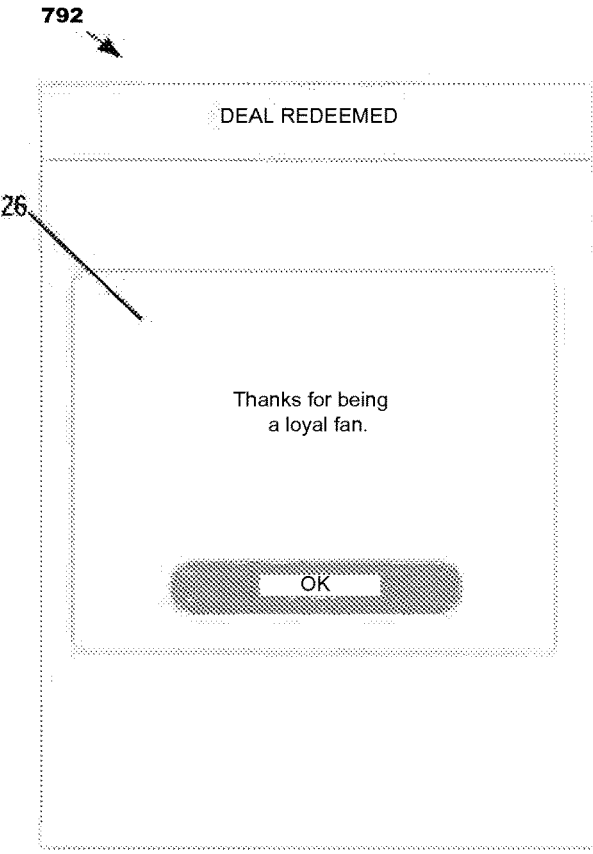
FIG. 7O illustrates a graphical user interface of a portal computing device that displays a message in response to redemption of a prior offer associated with the live event according to one exemplary embodiment.

FIG. 7N illustrates a graphical user interface 791 of a portable computing device 101 that displays a machine readable code 713b redeemable for value according to one exemplary embodiment. This machine readable code 713b is displayed along with a congratulatory message 724. FIG. 7O illustrates a graphical user interface 792 of a portal computing device 101 that displays a message 726 in response to redemption of a prior offer (such as in GUI 791 of FIG. 7N) associated with the live event according to one exemplary embodiment.

Figure 8A:
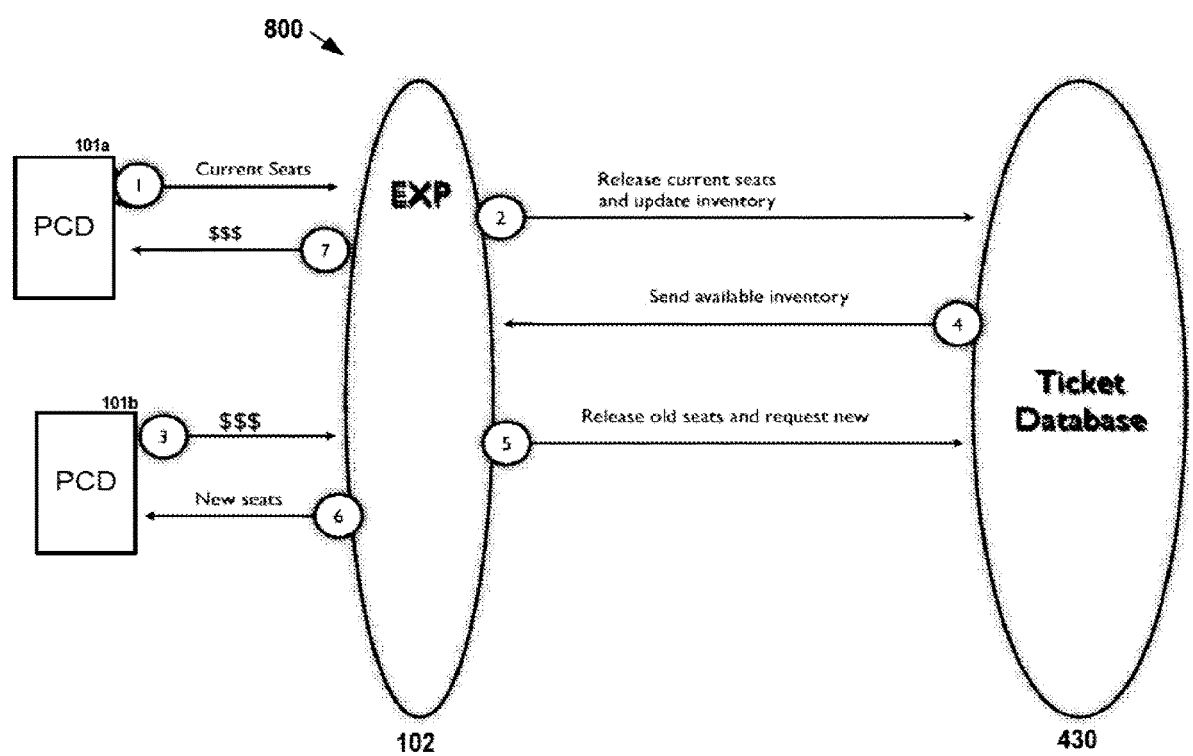
FIG. 8A illustrates a system for selling portable computing device tickets according to one exemplary embodiment.

FIG. 8A illustrates a system 800 for selling portable computing device tickets according to one exemplary embodiment. The system 800 may comprise the server 102 from FIG. 1A, the ticket database 430 from FIG. 4A, and PCDs 101. When selling tickets, it is often desired to know more about the buyer to ensure a pleasant viewing experience for both the buyer and the surrounding ticket holders. A system designed to solve this problem is illustrated in FIG. 8A and logical flow diagram for a method 802 supported by the system 800 is illustrated in FIG. 8C. Specifically, FIG. 8C is a logical flowchart illustrating a method 802 for selling portable computing device tickets according to one exemplary embodiment.

Figure 8B:
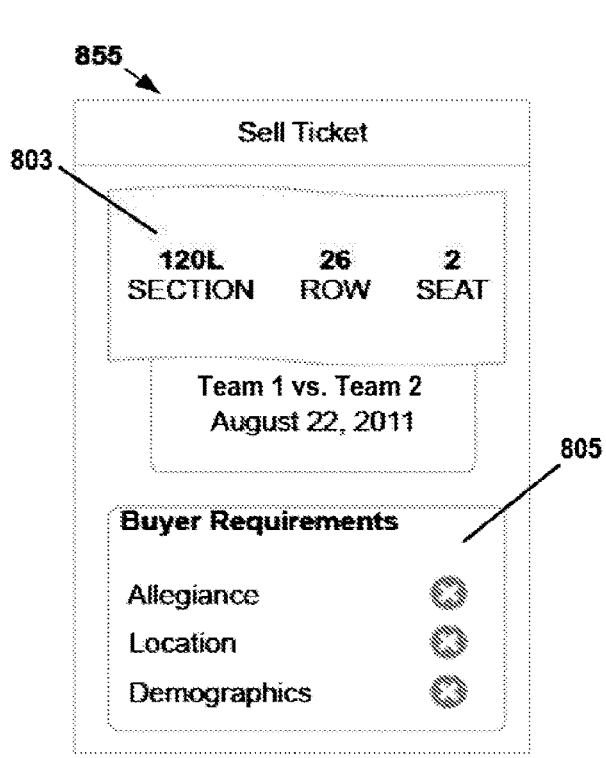
FIG. 8B illustrates a graphical user interface of a portable computing device that displays options for selling a portable computing device ticket according to one exemplary embodiment.
Figure 8C:
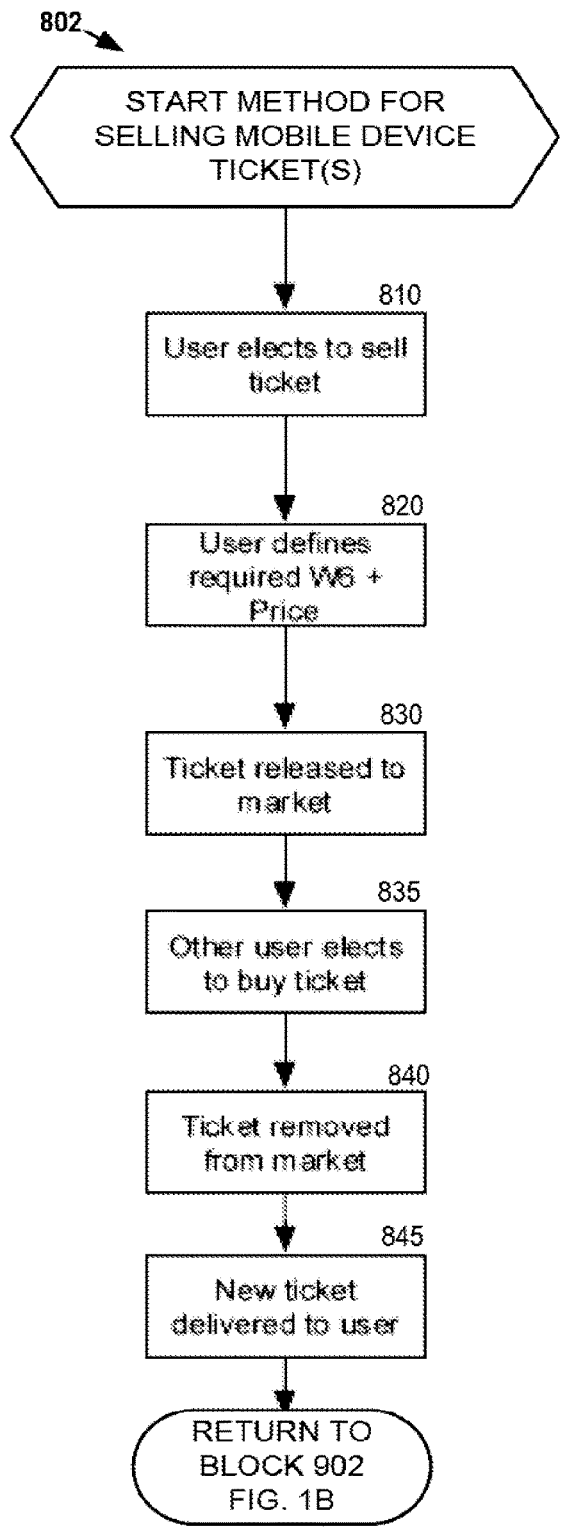
FIG. 8C is a logical flowchart illustrating a method for selling portable computing device tickets according to one exemplary embodiment.

When an operator of a PCD 101 elects to sell a ticket (Step 810, FIG. 8C), he must first decide on the asking price and any required who, whom with, what, where, and when of the purchaser (See GUI 855 of FIG. 8B). For instance, this could be accomplished by requiring the user to select Match/Don't Match/Don't Care switches on their characteristics such as team allegiance, age, or reason for attending to ensure that the buyer closely resembles the seller.

Once the operator of the PCD 101 has defined these requirements (Step 820, FIG. 8C) the tickets are released into the electronic market (Step 830, FIG. 8C) and made available for purchase at the primary ticketing system 405. These tickets could be purchased when a user requests to sit with friends (See FIG. 6B), a seat upgrade (See FIG. 5B), or simply elects to buy a ticket (not shown). Once a transaction does occur with a new operator of a PCD 101 who meets the defined requirements (Step 835, FIG. 8C), the ticket is removed (Step 840, FIG. 8C) from the market 405 and the ticket is delivered the new user's portable computing device 101 (Step 845, FIG. 8C).

FIG. 8B illustrates a graphical user interface 855 of a portable computing device 101 that displays options 805 for selling a portable computing device ticket according to one exemplary embodiment. As noted previously, these options 805 may comprise requirements of the buyer as set forth by the seller of the ticket. Similar to prior embodiments, the ticket may include relevant information 803 such as section, row and seat number assignment information.

Figure 9A:
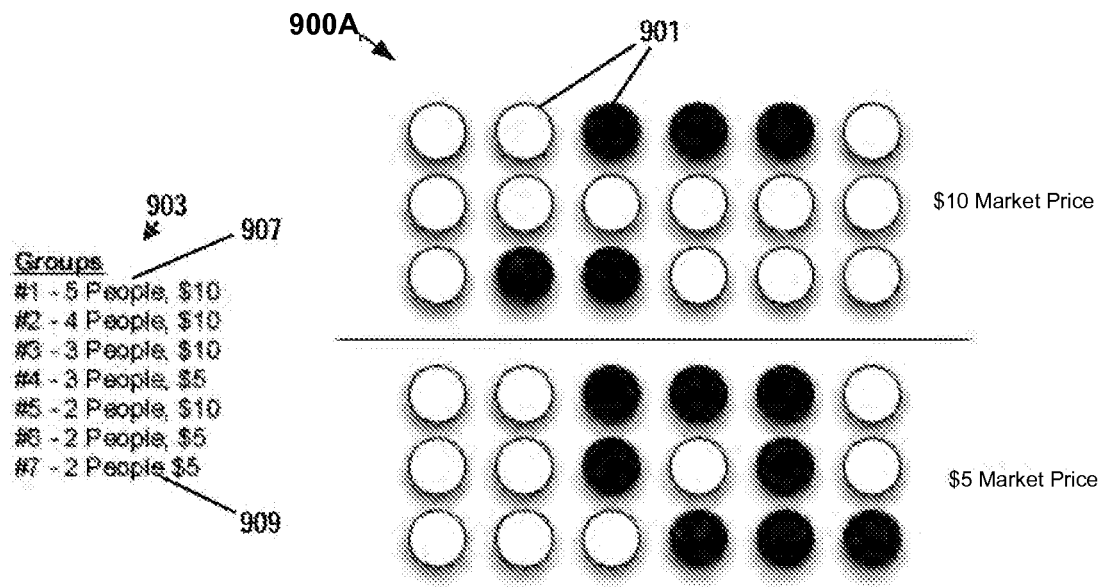
FIG. 9A is a seating chart that illustrates how individuals and groups of individuals may be optimally placed in a confined set of seats using the seat optimization algorithm.

FIG. 9A is a seating chart 900A that illustrates how individuals and groups of individuals who occupy seats 901 may be optimally placed in a confined set of seats using a seat optimization algorithm. Likewise, FIG. 9B is a seating chart that illustrates how individuals and groups of individuals who occupy seats 901 may be optimally placed in a confined set of seats using the seat optimization algorithm.

Optimally rearranging groups of individuals occupying seats 901 may be one important component to the success of the fluid electronic ticket system 100, 400. The seat optimization algorithm is outlined in FIGS. 9A-9B and the flow chart of FIGS. 9C-9D. The exemplary diagram in FIG. 9A illustrates seven groups 903 of people making seat upgrade requests, an exemplary starting seating layout, and the resulting seating layout created by the seating optimization algorithm. White circles in FIG. 9A designate unsold seats, and black circles in FIG. 9A designate sold and/or unavailable seats.

The top portion of FIG. 9A represents the starting layout and the bottom portion represents the resulting layout. First, the seven seat requests 903 numbered one through seven are ordered by group size and then by bid price, the group of five people 907 being the largest at the top with bids of $10 per seat and the group of two people 909 at the bottom who bid only $5 per seat. The white circles of FIG. 9A represent open seats, while dark colored circles represent occupied, unavailable seats.

Figure 9B:
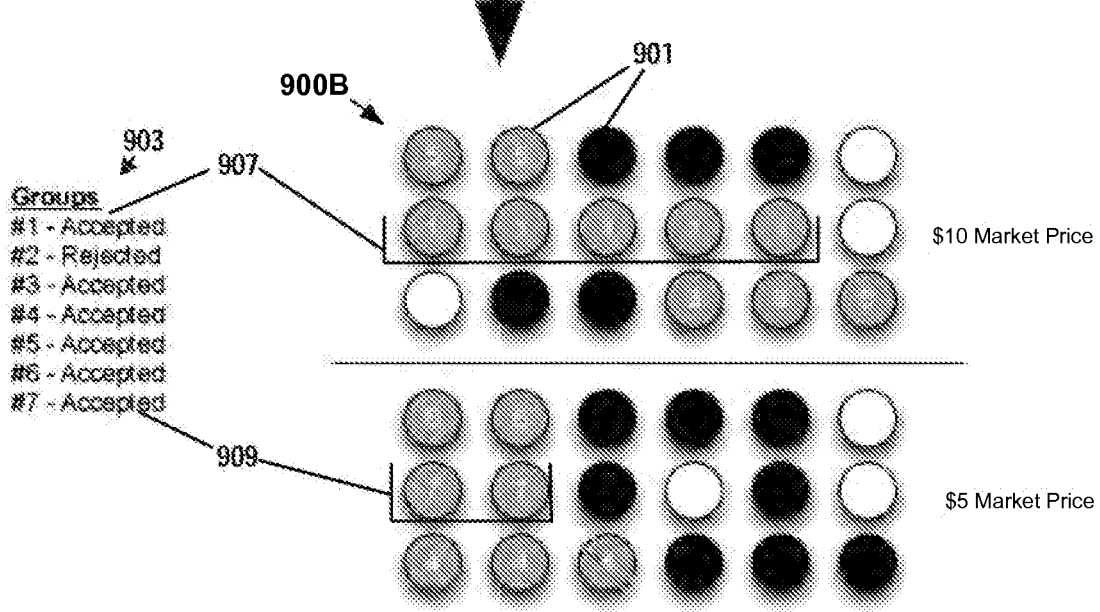
FIG. 9B is a seating chart that illustrates how individuals and groups of individuals may be optimally placed in a confined set of seats using the seat optimization algorithm.
Figure 9C:
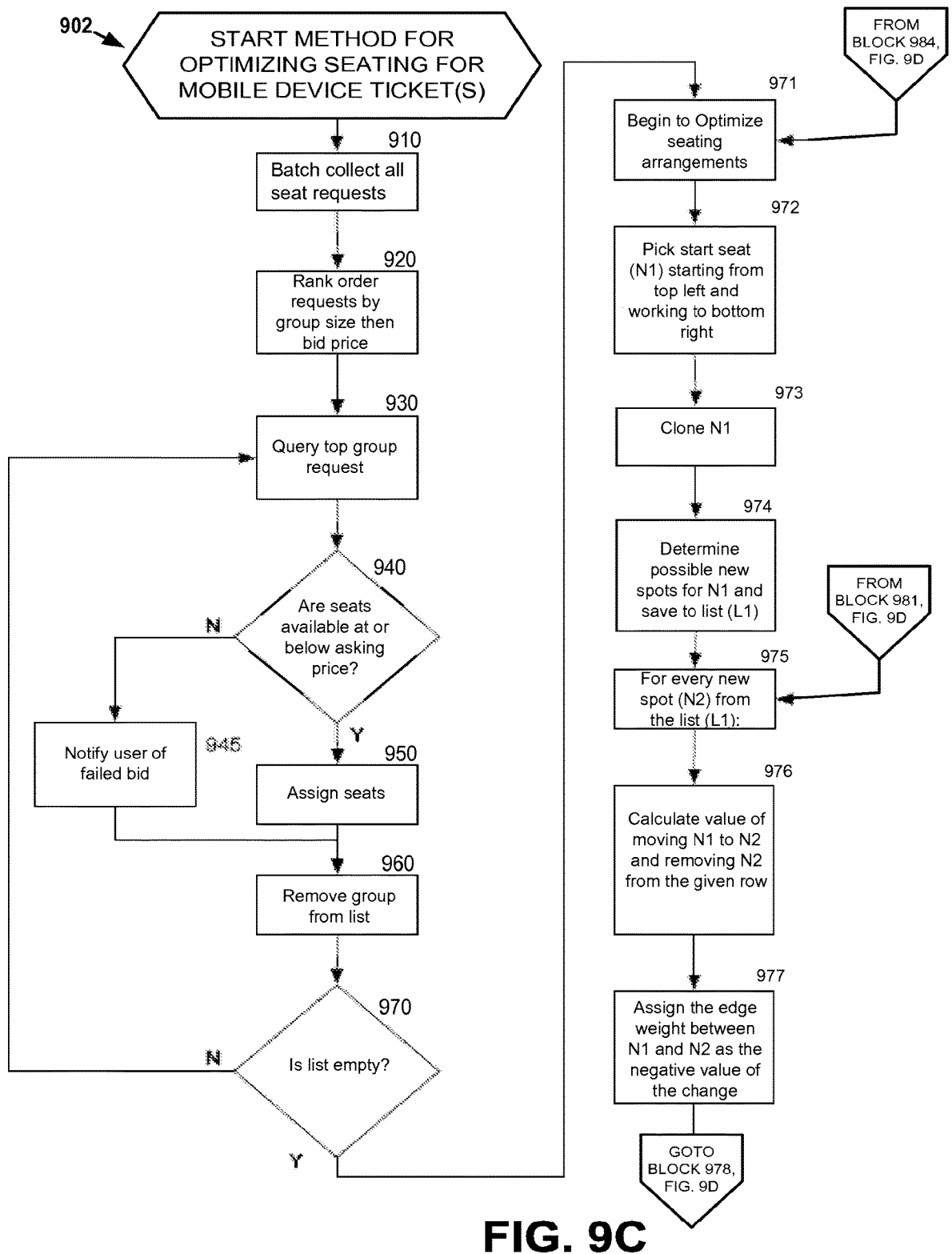
FIG. 9C is a logic flow diagram illustrating a method for optimizing seating for mobile device tickets according to one exemplary embodiment.
Figure 9D:
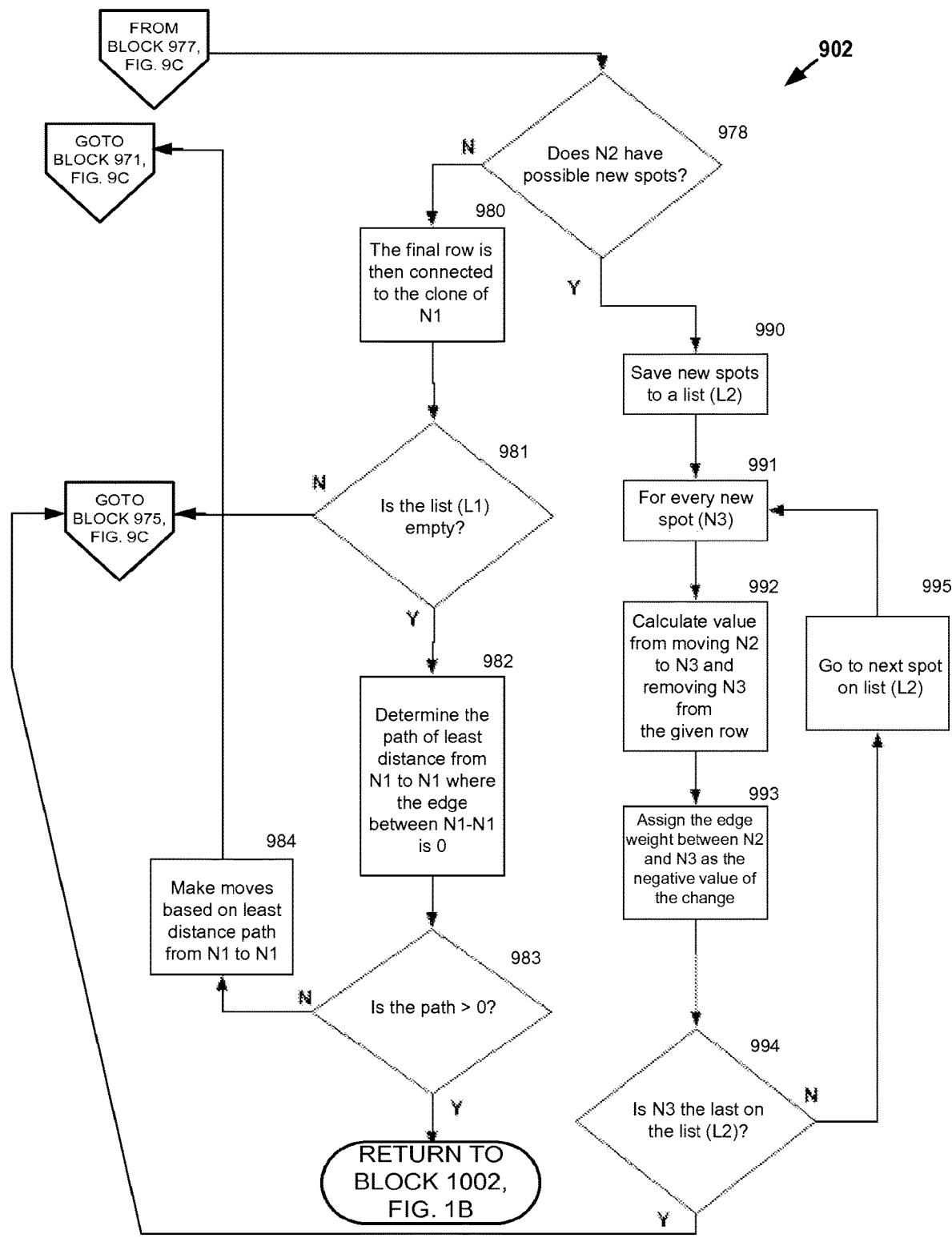
FIG. 9D is a continuation of the logic flow diagram of FIG. 9C that illustrates a method for optimizing seating for mobile device tickets according to one exemplary embodiment.

The five person group, group #1, is placed in the first available set of five open seats as they had the largest group size and highest bid and are highlighted with the grey circles having the number one in FIG. 9B. The second group, group #2, with four people each having a bid of $10 per seat are rejected as there does not exist a group of four open seats in either the $10 market price section or the $5 market price section. The third group, group #3, is placed in the available seats in the section marked as $10 Market Price (and highlighted with grey circles having the number three) leaving only singles and one pair of contagious seats in the $10 Market Price section (colored white) in FIG. 9B.

Group #4, which is only willing to pay $5, is placed in the section marked $5 Market Price and highlighted with grey circles having the number 4. Group #5 is placed in the $10 Market Price section having grey circles with the number five while Group #6 and Group #7 are placed in the $5 Market Price section, each having grey circles with the respective numbers of six and seven. By batching the ticket requests, a system represented in FIG. 9A and FIG. 9B is able to maximize the available inventory by starting with the most likely to fill an empty seat (large group and high bid price).

The server 102 may collect all ticket change requests in batches which could be a predetermined time, such as every five minutes or be based on time elements from the live event, such as every inning in a baseball game or at the beginning of the live event (Step 910, FIG. 9B).

The algorithm or method 902 then orders this batched list of requests such that the largest group is at the top of the list and the smallest group is at the bottom of the list (Step 920, FIG. 9B). If there are groups of same size, they are then ordered by bid price (Step 920, FIG. 9B) where the highest bid is on top and the lowest bid is on the bottom of the list. The algorithm 820 then gathers details of the top group (Step 930, FIG. 9B) such as group size and bid price.

The server 102 then queries the ticket database 430 and the market pricing system 441 to determine if there is a group of tickets that is available for this group size with a market price below or equal to the group's bid price (Step 940, FIG. 9B). If there are not tickets available, the server 102 notifies the operator via their portable computing device 101 that the bid was not accepted (Step 945, FIG. 9B).

However, if there were available tickets, the seats are removed from the market 430 and assigned to the operator of the PCD 101. The server 102 may notify the operator of the PCD 101 of the newly assigned tickets on their portable computing device 101 (Step 950, FIG. 9B).

Regardless of a successful bid, the group is then removed from the list waiting for new tickets (Step 960, FIG. 9B). If the list of groups is empty (Step 970, FIG. 9B), then the algorithm stops otherwise it continues to the new group awaiting new tickets (Step 930, FIG. 9B).

A summary of the flow chart of FIG. 9B is as follows: The system 900 collects all ticket requests in batch (Step 910) and rank orders the list by group size and then bid price (Step 920). The first group is picked from the list (Step 930) and the algorithm searches for open seats that have the required size and market price (Step 940). If tickets are not found, the operator of the PCD 101 is notified that the bid has failed (Step 945) and is removed from the list (Step 960).

If tickets are found, the tickets are assigned to the operator of the PCD 101 (Step 950), and the group is removed from the list (Step 960). Until the list is empty (Step 970), the algorithm continues to run on the next group on the list (Step 930). Once the list is empty and all seat upgrades have been applied, the system 900 then begins to optimize the seat arrangements (Step 971, FIG. 9B). Seats can be visualized in a common graph format. First, a starting node (Node #1) is selected (Step 972, FIG. 9E—directed graph 905A) and duplicated as both the start and the finish of the directed graph 905B in FIG. 9F (Steps 972, 973).

The system 900 then determines other spots that the starting node could be replaced for (Step 974, FIG. 9F). In FIG. 9F, Node #1 has been selected as the start and finish and could potentially be moved to Nodes #4-#8 or simply not moved (directly connected to itself via edge 1-1). Visually, seven edges have been created in the graph 905B to represent the seven potential movements for Node #1. One by one, the impact of moving Node #1 is calculated (Step 976) and the negative value is assigned as the weight of that respective edge (Step 977).

Next, the system 900 determines the possible movements for the second node whose spot Node #1 would be replacing (i.e., Nodes #4-#9 in this example) (Step 978). If the second node has new spots (Step 978), then those respective movements are designated as edges in the graph (Step 992) with a weight designated as the negative value of the movement (Step 993). At the end of this looping over all of the possible second nodes, visually, FIG. 9G shows the resulting graph which illustrates as example that Node #4 could be moved to Node #7, Node #8, Node #9, or Node #1. If the second node does not have new spots, and is therefore the last row (i.e., Nodes #7, #8 and #9) then it is only connected to the virtual clone of Node #1 (Step 980) and assigned the respectful weighted edge as previously described.

Once this process has been completed for all the possible second nodes (Step 981, "No"), a shortest distance algorithm such as Dijkstra or Bellman-Ford is applied to the graph to determine the optimal series of movements to maximize the seating arrangements and thus minimize the distance between the starting and ending node (Step 982, FIGS. 9H and 9I). The series of movements must always begin and end with the starting node, Node #1. If the calculated distance is less than zero (Step 983) and therefore a positive impact on the seating arrangement, the swaps are made (Step 984, illustrated in FIG. 9J) where Node #1 has moved to Node #7's original position, Node #7 has moved to Node #5's original position, and Node #5 has moved to Node #1's position. At this point, the system starts the process again (Step 971) and selects a new starting node (Step 972) as either Nodes 7, 2, 3, 4, 1, or 6. This process runs until it is unable to find movements that increase the overvalue valuing of the seating arrangements or the improvements do not meet a certain incremental threshold such as 0.1% improvement on a given iteration (Step 983, "Y").

Figure 10A:
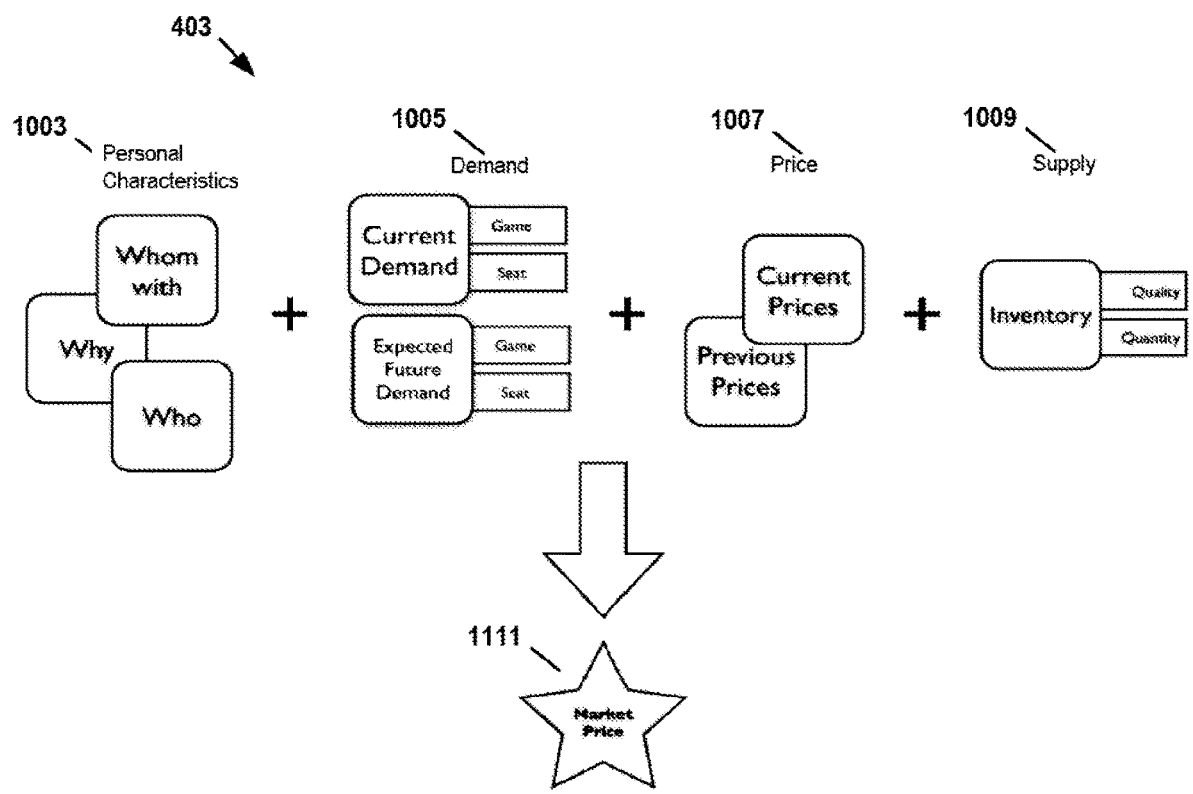
FIG. 10A illustrates a system for calculating pricing for portable computing device tickets according to one exemplary embodiment.

FIG. 10A illustrates the system 403 of FIG. 4A for calculating pricing for portable computing device tickets according to one exemplary embodiment. Meanwhile, FIG. 10B is a logic flow diagram illustrating a method 1002 for calculating pricing for portable computing device tickets according to one exemplary embodiment that is supported by system 1000.

Figure 10B:
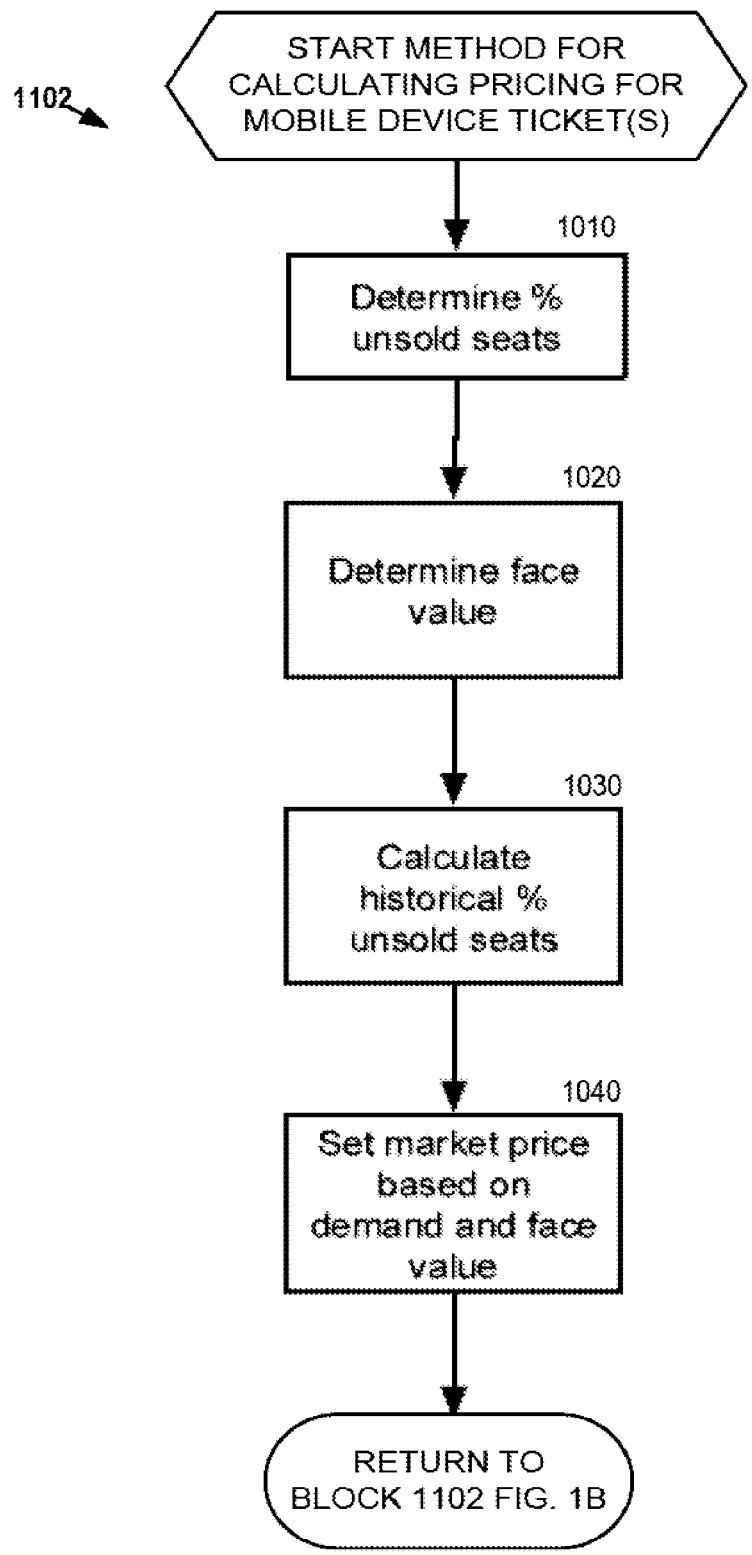
FIG. 10B is a logic flow diagram illustrating a method for calculating pricing for portable computing device tickets according to one exemplary embodiment.

First, the server 102 queries the primary ticket system 405 (FIG. 4A) and calculates the percentage of unsold seats in relation to the capacity of the venue (Step 1010, FIG. 10B). The server 102 then queries the pricing regions 406 (FIG. 4A) to determine the original face value of the ticket (Step 1020, FIG. 10B). The server 102 then queries the primary ticket system 405 and calculates the historical average of percentage of unsold seats (Step 1030, FIG. 10B).

This percentage of unsold seats acts as a baseline for ticket demand and sets the starting price for an estimated market price. The server 102 then sets the new market price based on the live event's demand and each individual ticket's original face value (Step 1040, FIG. 10B). To constantly maximize per game revenue, the market price could be modified on a per transaction per operator basis. To this extent, a fair market price could be determined by understanding the personal characteristics of the operator (FIG. 10A, 1003) such as the group size of the operator and why they are attending the event such as to drink or to be with family. In some situations, a larger group may merit a lower price as only one individual operator is purchasing for the entire group and is accustomed as is industry standard to provide a discount for larger groups.

Additionally, the system may measure current demand, in the form of purchase conversion, in comparison to estimated future demand from previous games (FIG. 10A, 1005) and can accordingly adjust the market price. For each and every decrease in demand, measured as a lower purchase conversion than expected, the system may elect to lower the price on the next request based on the current prices offered in comparison to the previous prices and respective demand (FIG. 10A, 1007).

Figure 11A:
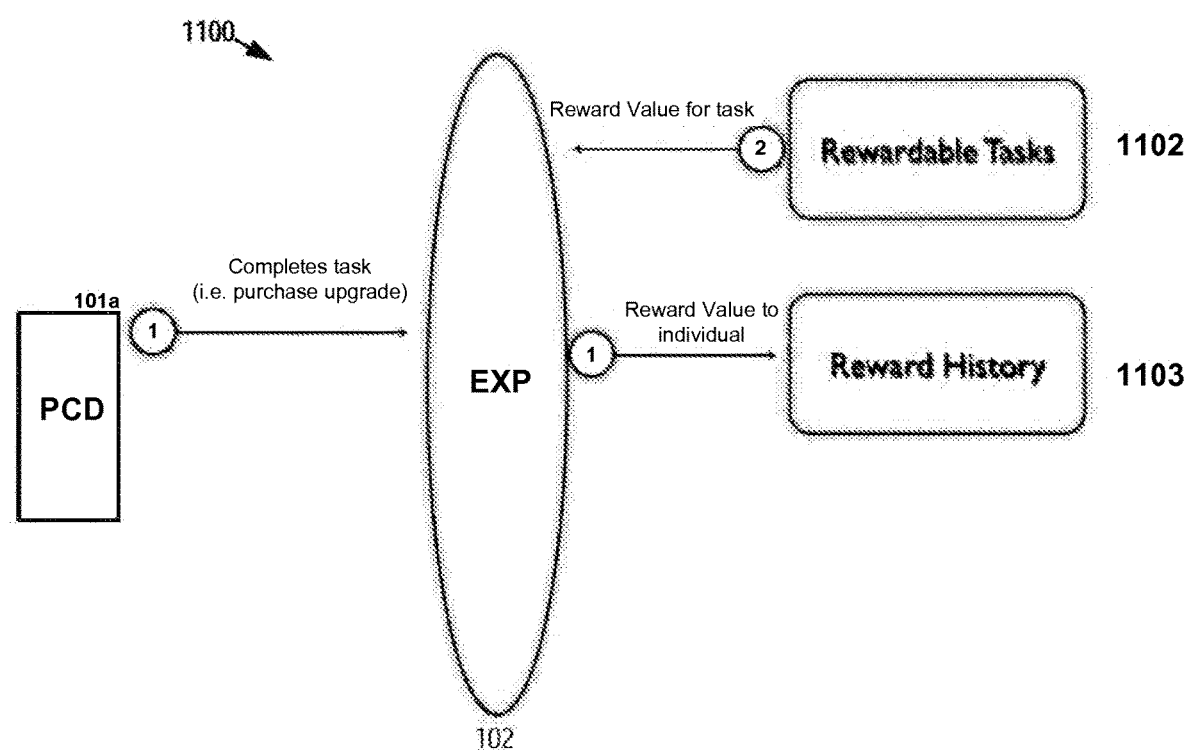
FIG. 11A illustrates a system for creating and tracking rewards associated with portable computing device tickets according to one exemplary embodiment.

Lastly, the market price may be impacted with the measure of the remaining inventory as respect to both the quality and quantity of the inventory. For example, as the quantity decreases the price may increase regardless of quality. However, as quality of the remaining inventory decreases the price may as well decrease at a respective rate (FIG. 10A, 1009). In all, market price can be seen as a function of who is purchasing, who has purchased previously, at what price purchases have or have not occurred, and the quantity and quality of the remaining inventory FIG. 11A illustrates a system 1100 for creating and tracking rewards associated with portable computing device tickets according to one exemplary embodiment. Meanwhile, FIG. 11B is a logical flow diagram illustrating a method 1102 for creating and tracking rewards associated with portable computing device tickets according to one exemplary embodiment that is supported by the system 1100.

To act as an incentive for certain behavior, a loyalty platform for live events is supported by system 1100. The system 1100 extends the fluid, electronic ticket system of FIGS. 1A and 4A with the addition of an internal database comprising rewardable tasks 1102 (FIG. 11A) and an internal database of reward history for users 1103 (FIG. 11A). When the operator of the PCD 101 completes a task (Step 1110, FIG. 11B) such as buying tickets with friends (See GUIs 1103, 1105 of FIGS. 11C-11D) the server 102 queries the database of rewardable tasks 1102 (FIG. 11A) to confirm if the task has a reward value (Step 1120, FIG. 11B).

If that task carries reward value, the server 102 acquires the value (Step 1130, FIG. 11B) from the reward task database 1102 (FIG. 11A) and adds the value (Step 1140, FIG. 11B) to the reward history database 1103 for that operator of the PCD 101. The server 102 then transmits the value to the operator on their portable computing device 101 (See GUI 1152 of FIG. 11E).

Figure 11B:
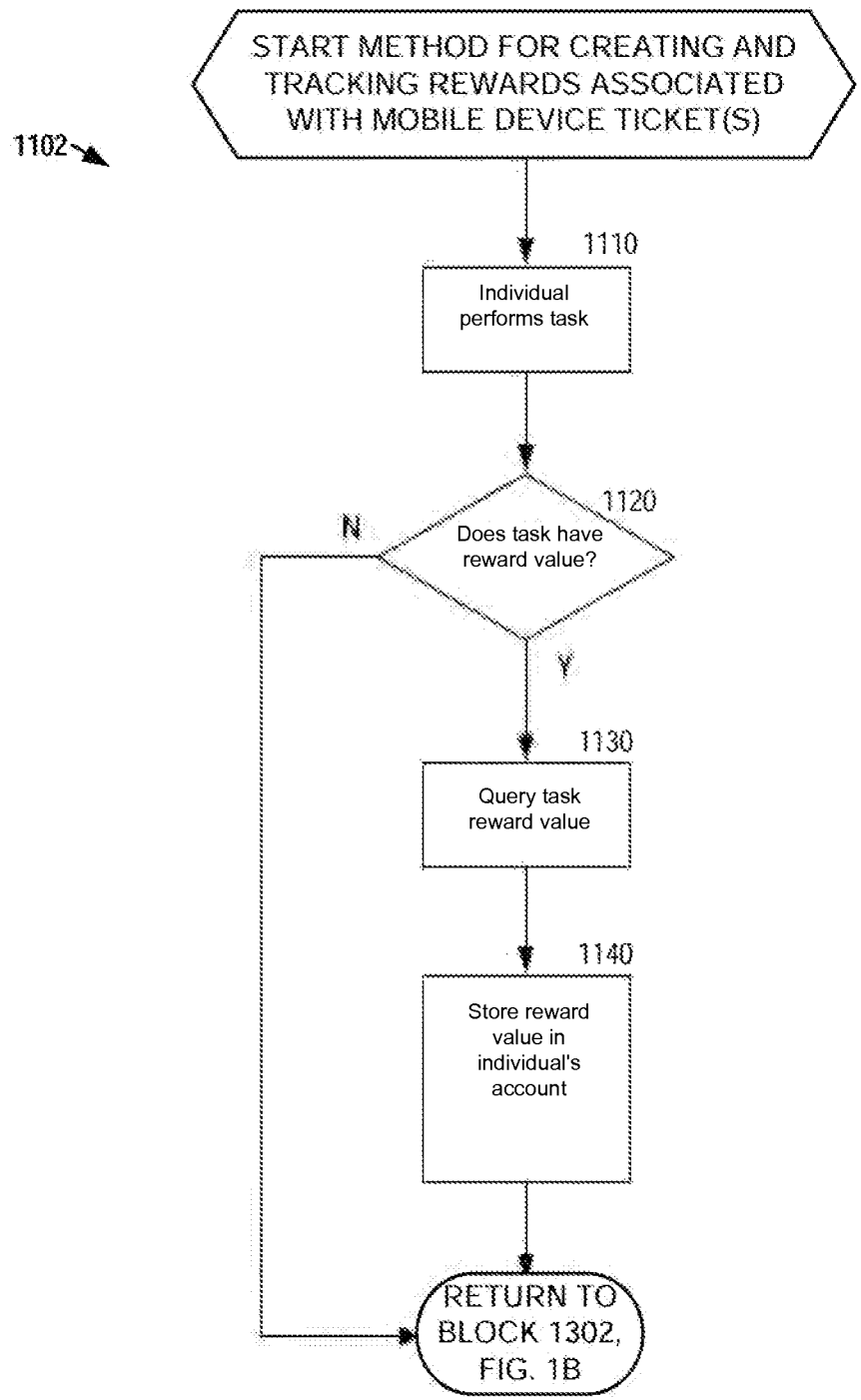
FIG. 11B is a logical flow diagram illustrating a method for creating and tracking rewards associated with portable computing device tickets according to one exemplary embodiment.

A summary of the flow chart of FIG. 11B is as follows: When an individual completes a task (Step 1110) such as purchasing a ticket upgrade, the system 1100 checks whether said task has a reward value (Step 1120). If the task has a reward value (Step 1120), the system 1100 queries the reward database to determine the task's reward value (Step 1130), and the value is deposited into the individual's account (Step 1140).

Figure 11C:
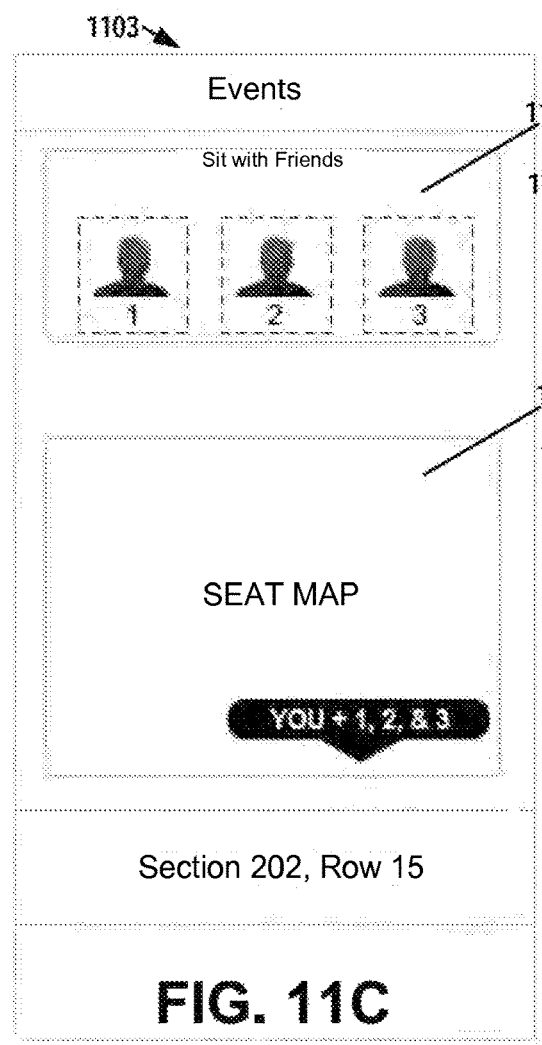
FIG. 11C illustrates a graphical user interface of a portable computing device that displays options for selecting friends to sit with an operator of a portable computing device according to one exemplary embodiment.

FIG. 11C illustrates a graphical user interface 1103 of a portable computing device 101 that displays options 1107 for selecting friends to sit with an operator of a portable computing device 101 according to one exemplary embodiment. This GUI 1103 is similar to the GUIs 603-609 of FIGS. 6D-6G.

Figure 11D:
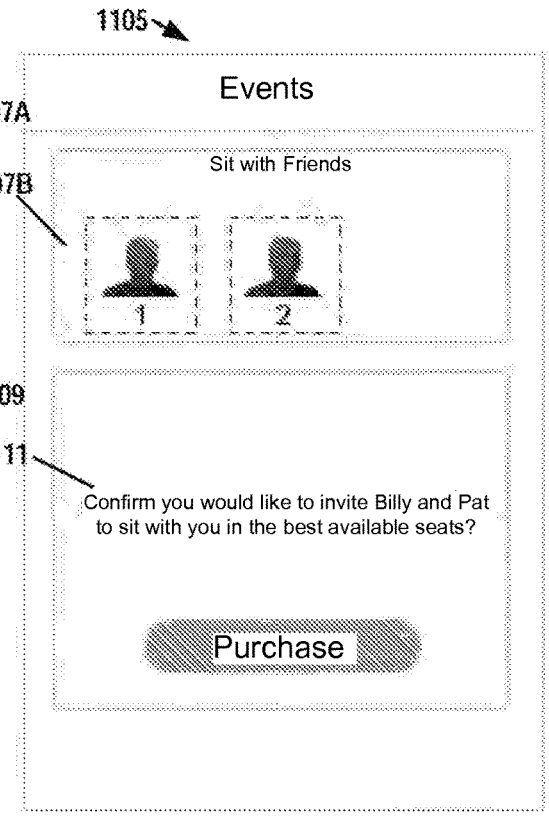
FIG. 11D illustrates a graphical user interface of a portable computing device that displays a confirmation of a selection made in the display of FIG. 11C according to one exemplary embodiment.
Figure 11E:
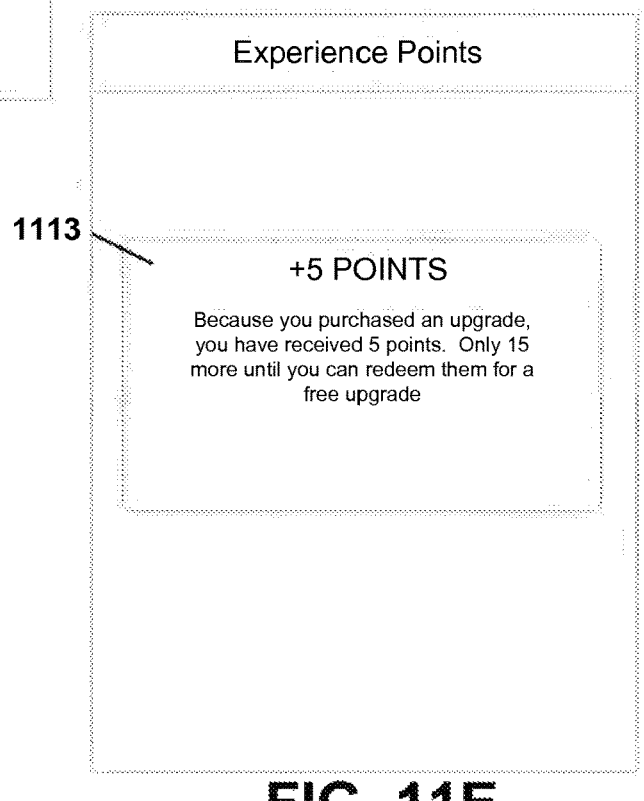
FIG. 11E illustrates a graphical user interface of a portable computing device that displays bonus points awarded due to a purchased upgrade in seating according to one exemplary embodiment.

FIG. 11D illustrates a graphical user interface 1105 of a portable computing device 101 that displays a confirmation 1111 of a selection made in the display of FIG. 11C according to one exemplary embodiment. This GUI 1105 is similar to GUI 613 of FIG. 6H. FIG. 11E illustrates a graphical user interface 791 of a portable computing device 101 that displays bonus points 113 awarded due to a purchased upgrade in seating according to one exemplary embodiment.

Referring now to FIG. 12A, this figure is a functional block diagram of an exemplary computer architecture for the inventive system 121. The system 121 may comprise a computer server 102 that executes the live concierge module 10 and other modules/software (such as Flowcharts of FIGS. 2B, 3B, 5B, 6B, 7B, 8C, 9B, 10B, 11B, and 13 that are exemplary steps executed by this server 102 and/or module 10) and a user interface module 177. The live concierge module 10 may comprise hardware or software (or both). The system 121 may further comprise a database 195, a computer communications network 105, and a plurality of client portable computing devices (PCDs).

The links between elements illustrated in FIG. 12A may comprise wired or wireless couplings or links. Wireless links include, but are not limited to, radio-frequency ("RF") links, infrared links, acoustic links, and other wireless mediums. The communications network 105 may comprise a wide area network ("WAN"), a local area network ("LAN"), the Internet, a Public Switched Telephony Network ("PSTN"), a paging network, or a combination thereof. The communications network 105 may be established by broadcast RF transceiver towers (not illustrated). However, one of ordinary skill in the art recognizes that other types of communication devices besides broadcast RF transceiver towers are included within the scope of this disclosure for establishing the communications network 105.

The server 102 running the live concierge module 10 may be directly coupled to the database 195. The database 195 may comprise a sequential query language (SQL) database as understood by one of ordinary skill the art.

The server 102 running the live concierge module 10 and user interface module 177 may support a plurality of user interfaces that are accessed by the PCDs 101 using an Internet browser. Further details of these user interfaces generated by the user interface module 177 have been described above in connection with FIGS. 1-11.

Figure 12B:
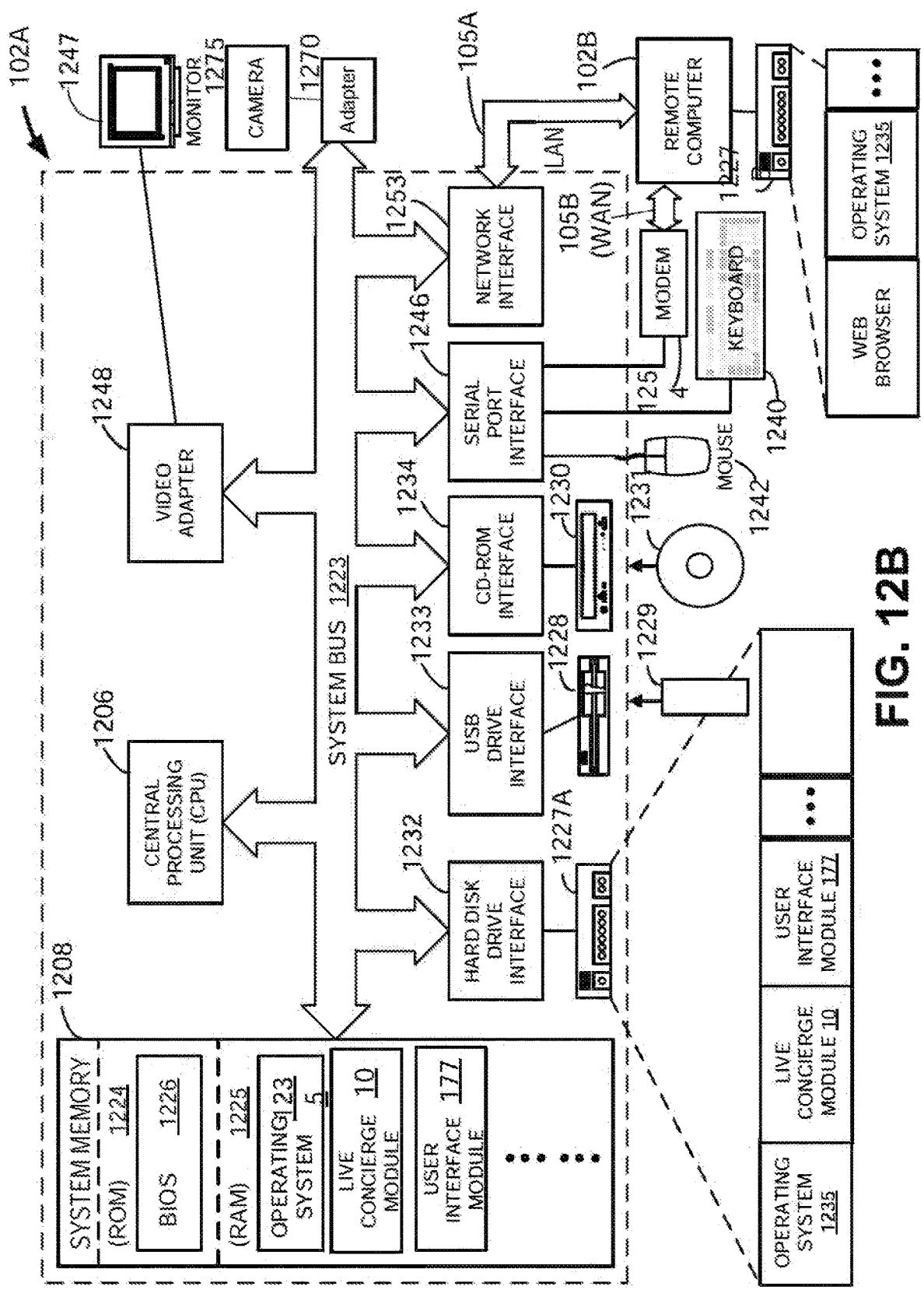
FIG. 12B illustrates an exemplary computer that is part of the computer system illustrated in FIG. 12A according to one exemplary embodiment.

Referring now to FIG. 12B, this figure is a functional block diagram of the host computer server 102 of FIG. 12A that can be used in the system 121 and method managing virtual/electronic tickets according to an exemplary embodiment of the invention. The exemplary operating environment for the system 121 includes a general-purpose computing device in the form of a conventional computer 102A.

Generally, the computer 102A includes a processing unit 1206, a system memory or storage 1208, and a system bus 1223 that couples various system components including the system memory 1208 to the processing unit 1206. The system bus 1223 may be any of several types of bus structures including a memory bus or memory controller, a peripheral bus, and a local bus using any of a variety of bus architectures. The system memory includes a read-only memory (ROM) 1224 and a random access memory (RAM) 1225. A basic input/output system (BIOS) 1226, containing the basic routines that help to transfer information between elements within computer 100A, such as during start-up, is stored in ROM 1224.

The computer 102A may include a hard disk drive 1227A for reading from and writing to a hard disk, not shown, a universal serial bus (USB) drive 1228 for reading from or writing to a removable USB flash memory unit 1229, and an optical disk drive 1230 for reading from or writing to a removable optical disk 1231 such as a CD-ROM or other optical media. Hard disk drive 1227A, USB drive 1228, and optical disk drive 1230 are connected to system bus 1223 by a hard disk drive interface 1232, a USB drive interface 1233, and an optical disk drive interface 1234, respectively.

Although the exemplary environment described herein employs hard disk 1227A, USB drive 1229, and removable optical disk 1231, it should be appreciated by those skilled in the art that other types of computer readable media which can store data that is accessible by a computer, such as magnetic cassettes, digital video disks (DVDs), Bernoulli cartridges, RAMs, ROMs, and the like, may also be used in the exemplary operating environment without departing from the scope of the invention. Such uses of other forms of computer readable media besides the hardware illustrated will be used in computer networked (i.e.—Internet) connected devices.

The drives and their associated computer readable media illustrated in FIG. 12B provide nonvolatile storage of computer-executable instructions, data structures, program modules, and other data for computer 100A. A number of program modules may be stored on hard disk 1227, USB drive 1229, optical disk 1231, ROM 1224, or RAM 1225, including, but not limited to, an operating system 1235 and the live concierge module(s) 10 and user interface module 177 of FIG. 12A.

Program modules include routines, sub-routines, programs, objects, components, data structures, etc., which perform particular tasks or implement particular abstract data types. A user may enter commands and information into computer 100A through input devices, such as a keyboard 1240 and a pointing device 1242.

Pointing devices may include a mouse, a trackball, and an electronic pen that can be used in conjunction with an electronic tablet. Other input devices (not shown) may include a microphone, joystick, game pad, satellite dish, scanner, or the like. These and other input devices are often connected to processing unit 1206 through a serial port interface 1246 that is coupled to the system bus 1223, but may be connected by other interfaces, such as a parallel port, game port, a universal serial bus (USB), Wi-Fi or the like.

The display 1247 may also be connected to system bus 1223 via an interface, such as a video adapter 1248. As noted above, the display 1247 can comprise any type of display devices such as a liquid crystal display (LCD), a plasma display, an organic light-emitting diode (OLED) display, and a cathode ray tube (CRT) display.

A camera 1275 may also be connected to system bus 1223 via an interface, such as an adapter 1270. The camera 1275 can comprise a video camera such as a webcam. The camera 1275 can be a CCD (charge-coupled device) camera or a CMOS (complementary metal-oxide-semiconductor) camera. In addition to the monitor 1247 and camera 1275, the computer 100A may include other peripheral output devices (not shown), such as speakers and printers.

The computer 102A may operate in a networked environment using logical connections to one or more remote computers 102B. These remote computers 102B may comprise an Internet browser as illustrated in FIG. 12A that is used to access the live concierge module 10. In such an exemplary scenario, the computer 102A may comprise one or more server computers coupled together across a computer network.

Each remote computer 102B may be another personal computer, a computer server, a mobile phone, a router, a network PC, a peer device, tablet (e.g., iPad) or other common network node. While the remote computer 102B typically includes many or all of the elements described above relative to the main computer 102A, only a memory storage device 1127B has been illustrated in FIG. 12B for brevity. The logical connections depicted in FIG. 12B include a local area network (LAN) 105A and a wide area network (WAN) 105B. Such networking environments are commonplace in offices, enterprise-wide computer networks, intranets, and the Internet.

When used in a LAN networking environment, the computer 102A is often connected to the local area network 105A through a network interface or adapter 1253. When used in a WAN networking environment, the computer 102A typically includes a modem 1254 or other means for establishing communications over WAN 105B, such as the Internet. Modem 1254, which may be internal or external, is connected to system bus 1223 via serial port interface 1246. In a networked environment, program modules depicted relative to the main computer 102A, or portions thereof, may be stored in the remote memory storage device 1227B of the remote computer 102B. It will be appreciated that the network connections shown are exemplary and other means of establishing a communications link between the computers 102 may be used.

Moreover, one of ordinary skill in the art will appreciate that the present invention may be implemented in other computer system configurations, including hand-held devices, multiprocessor systems, microprocessor based or programmable consumer electronics, network personal computers, minicomputers, tablets (e.g., iPad) mainframe computers, and the like. The invention may also be practiced in distributed computing environments, where tasks are performed by remote processing devices that are linked through a communications network. In a distributed computing environment, program modules may be located in both local and remote memory storage devices.

Figure 12C:
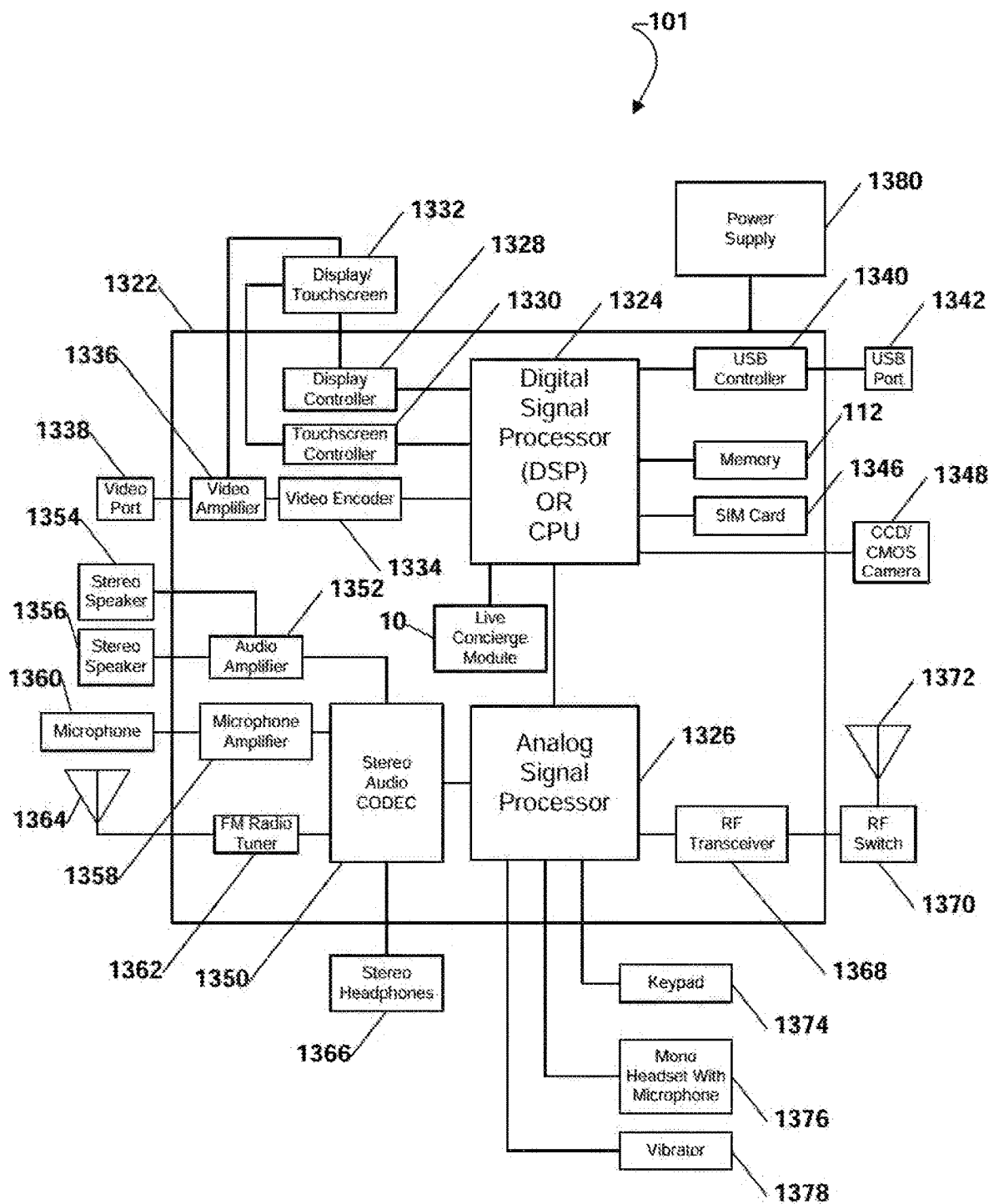
FIG. 12C illustrates an exemplary portable computing device that is part of the computer system illustrated in FIG. 12A according to one exemplary embodiment.

Referring to FIG. 12C, this figure is a diagram of an exemplary, non-limiting aspect of a portable computing device (PCD) 101 comprising a wireless mobile telephone which corresponds with FIG. 12A. In this description, the terms "communication device," "wireless device," "wireless telephone," "wireless communication device," and "wireless handset" are used interchangeably. A portable computing device 101 could be a cellular telephone, a pager, a PDA, a smartphone, a navigation device, or a hand-held computer with a wireless connection or link.

As shown, the mobile telephone 101 includes an on-chip system 1322 that includes a digital signal processor or a central processing unit 1324 and an analog signal processor 1326 that are coupled together. As illustrated in FIG. 12C, a display controller 1328 and a touchscreen controller 1330 are coupled to the digital signal processor 1324. A touchscreen display 1332 external to the on-chip system 1322 is coupled to the display controller 1328 and the touchscreen controller 1330.

FIG. 12C further illustrates a video encoder 1334, e.g., a phase-alternating line ("PAL") encoder, a sequential couleur avec memoire ("SECAM") encoder, a national television system(s) committee ("NTSC") encoder or any other video encoder, is coupled to the digital signal processor 1324. Further, a video amplifier 1336 is coupled to the video encoder 1334 and the touchscreen display 1332. A video port 1338 is coupled to the video amplifier 1336. As depicted in FIG. 12C, a universal serial bus ("USB") controller 1340 is coupled to the digital signal processor 324. Also, a USB port 1342 is coupled to the USB controller 1340. A memory 112 and a subscriber identity module ("SIM") card 1346 may also be coupled to the digital signal processor 1324.

Further, as shown in FIG. 12C, a digital camera 1348 may be coupled to the digital signal processor 1324. In an exemplary aspect, the digital camera 1348 is a charge-coupled device ("CCD") camera or a complementary metal-oxide semiconductor ("CMOS") camera.

As further illustrated in FIG. 12C, a stereo audio CODEC 1350 may be coupled to the analog signal processor 1326. Moreover, an audio amplifier 1352 may be coupled to the stereo audio CODEC 1350. In an exemplary aspect, a first stereo speaker 1354 and a second stereo speaker 1356 are coupled to the audio amplifier 1352. FIG. 12C shows that a microphone amplifier 1358 may be also coupled to the stereo audio CODEC 1350. Additionally, a microphone 1360 may be coupled to the microphone amplifier 1358. In a particular aspect, a frequency modulation ("FM") radio tuner 1362 may be coupled to the stereo audio CODEC 1350. Also, an FM antenna 1364 is coupled to the FM radio tuner 1362. Further, stereo headphones 1366 may be coupled to the stereo audio CODEC 1350.

FIG. 12C further illustrates a radio frequency ("RF") transceiver 1368 that may be coupled to the analog signal processor 1326. An RF switch 1370 may be coupled to the RF transceiver 1368 and an RF antenna 1372. The RF transceiver 1368 may communicate with conventional communications networks as well as with global positioning system ("GPS") satellites in order to obtain GPS signals for geographical coordinates.

As shown in FIG. 12C, a keypad 1374 may be coupled to the analog signal processor 1326. Also, a mono headset with a microphone 1376 may be coupled to the analog signal processor 1326. Further, a vibrator device 1378 may be coupled to the analog signal processor 1326. FIG. 12C also shows that a power supply 1380 may be coupled to the on-chip system 1322. In a particular aspect, the power supply 1380 is a direct current ("DC") power supply that provides power to the various components of the mobile telephone 2 that require power. Further, in a particular aspect, the power supply is a rechargeable DC battery or a DC power supply that is derived from an alternating current ("AC") to DC transformer that is connected to an AC power source.

FIG. 12C also shows that the mobile telephone 2 may include a wait time module 16. The wait time module 16 may comprise hardware and/or software. The wait time module 16 may communicate with the website 8 having a wait time application (FIG. 1) for updating wait time information stored in the mobile telephone 2. While only a few mobile telephones 2 and computers 4 have been illustrated with having the wait time module in FIG. 1, it is understood by one of ordinary skill in the art that each of these devices may have a copy of the wait time module 16.

As depicted in FIG. 12C, the touchscreen display 1332, the video port 1338, the USB port 1342, the camera 1348, the first stereo speaker 1354, the second stereo speaker 1356, the microphone 1360, the FM antenna 1364, the stereo headphones 1366, the RF switch 1370, the RF antenna 1372, the keypad 1374, the mono headset 1376, the vibrator 1378, and the power supply 1380 are external to the on-chip system 1322.

In a particular aspect, one or more of the method steps described herein (such as illustrated in FIGS. 1-11) may be stored in the memory 112 as computer program instructions, like the live concierge module(s) 10. These instructions may be executed by the digital signal processor or central processing unit 1324, the analog signal processor 1326, or another processor, to perform the methods described herein. Further, the processors, 1324, 1326, the memory 112, the instructions stored therein, or a combination thereof may serve as a means for performing one or more of the method steps described herein.

Figure 13:
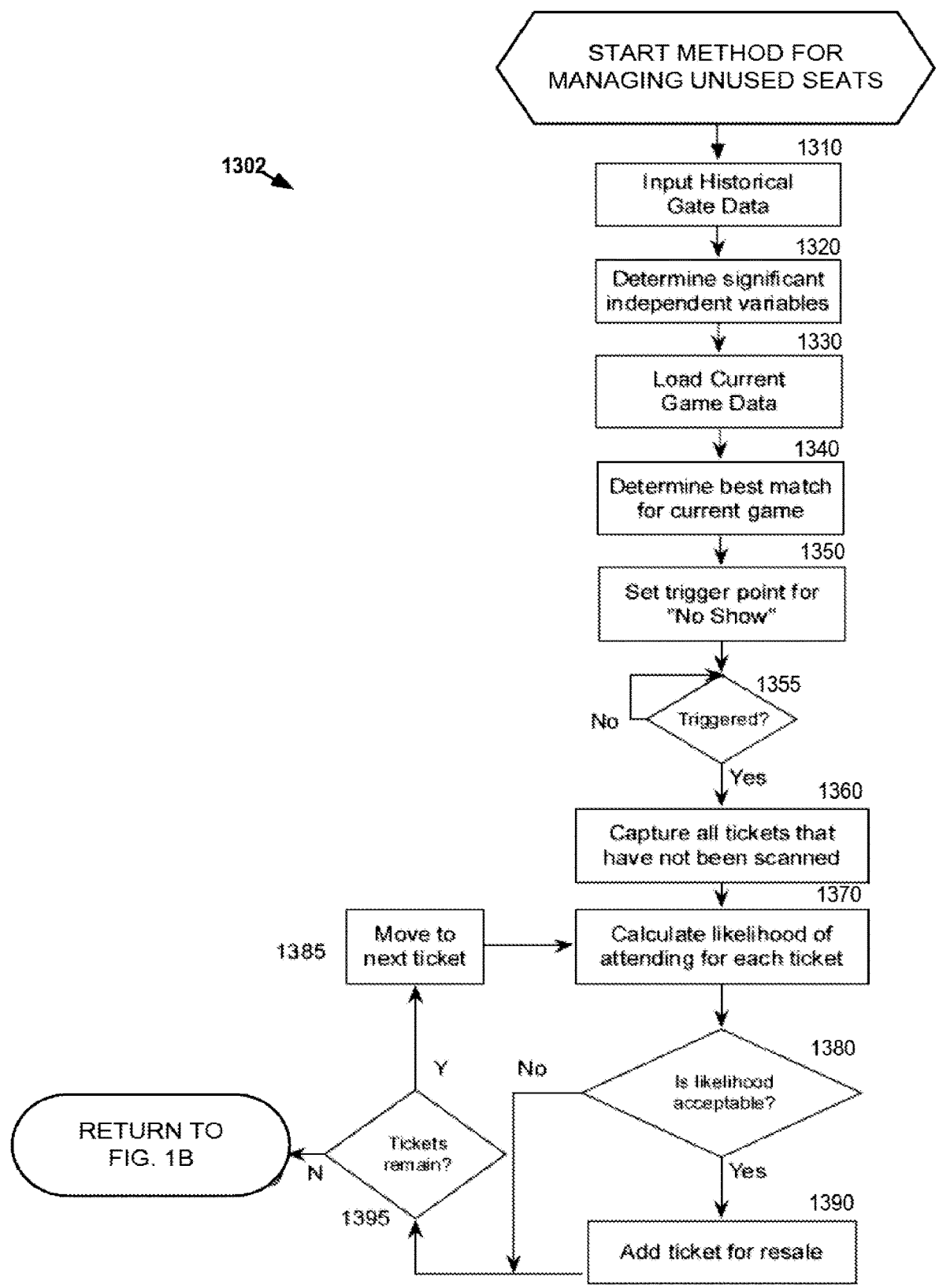
FIG. 13 is a logical flowchart illustrating a method for managing unused seats a live event according to one exemplary embodiment.

FIG. 13 is a logical flowchart illustrating a method 1302 for managing unused seats at a live event according to one exemplary embodiment. First, the system 100 takes in historical data (Step 1310) to be used to estimate the most significant independent variables (Step 1320) such as day of week, time of year, ticket section, or opponent (for sporting matches) that most strongly correlates with the rate at which fans enter a venue.

Before an event, the game details such as opponent, day of week, or game time are entered into the system (Step 1330) to determine the most meaningful past data points (Step 1340) by matching this current event to past events that match the most significant independent variables (Step 1320) which were determined using a form of multivariate regression. By leveraging the past data and the current game data, a trigger such as time since game start or the velocity at which fans enter may be determined (Step 1350) and used to estimate when a ticket can be marked unused.

When a trigger event occurs (Step 1355), all unused tickets will be individually scored (Step 1360) based on a form of a mathematical analysis that uses meaningful attributes such as ticket type, section, a ticket holder's account, and/or other historical data (Step 1370). For example, one could consider historical data on an individual account stored in user database (444—FIG. 4A) to estimate an average arrival time and standard deviation to calculate an estimated time of arrival.

The data is stored in the user database (444) may contain detailed records of season ticket holders, premium accounts, past users and any pertinent data belonging to operators. Such data may include, but is not limited to, arrival times as well as events in which a fan/patron had purchased a ticket but did not show/attend the event.

One of ordinary skill in the art may perform a linear regression using least squares fit to correlate the percent of fans who have attended at a certain time to the eventual percentage of fans whom do not show up. Additionally, a combination of such methods, or others, could be used to accurately predict the likeliness of an individual ticket being used.

For example, the user database (444) may have stored three arrival times of a season pass-holder (at 5.0 minutes, −5.0 minutes, and 10.0 minutes) for a particular seat relative to tip-off in a basketball season. This means that this season pass-holder for a particular seat has an average of arrival time of 3.33 minutes after tip and a standard deviation of 7.64.

Therefore, assuming normal distribution, at t=10 minutes post tip, there is a 80% chance the seat will remain empty/patron or fan will not attend the event. The 80% chance is the integral of the normal (Gaussian) distribution up to t=10.0 minutes post tip in a basketball season (this is also referred to as the cumulative distribution function).

If this score of likeliness to not attend reaches or exceeds a predefined minimal value (Step 1380), such as 80% here, then the ticket is added to the ticket database 430 (Step 1390), and other fans seeking tickets at the event with their PCDs 100 will be able to purchase this particular ticket.

This simple example demonstrates how one of ordinary skill in the art may use historical data to predict future outcome. As one of ordinary skill in the art recognizes, historical ticket data may be used to predict the future attendance of fans/patrons at an event. A normal distribution, or similar distribution such as a Poisson distribution or combination of such calculations as average arrival time and standard deviation of arrival time, or some linear regression correlating a historical input to the estimated likelihood of being unused, may be used to map such a future attendance.

Hence, there are multiple ways that can be used by one of ordinary skill in the art to accurately predict whether a fan/patron for an event will arrive. The next available seat ticket's score is then calculated (Step 1385) until there are no longer seat tickets to be scored (Step 1395) and the system 100 stops (RETURNs).

Figure 14:
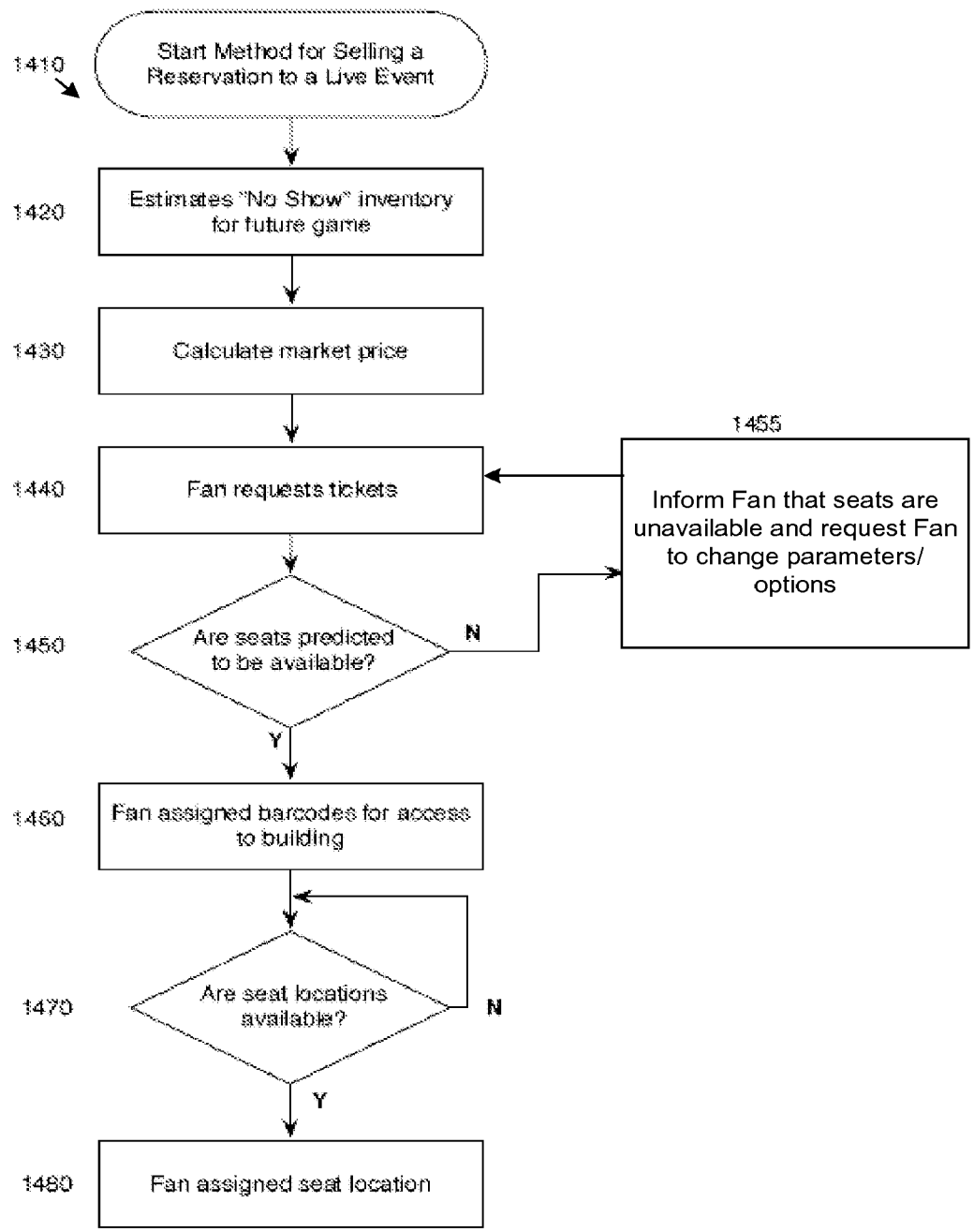
FIG. 14 is a logical flowchart illustrating a method for purchasing reservations to attend a live event on a portable computing device according to one exemplary embodiment.

FIG. 14A is a logical flowchart outlining a method 1410 for purchasing a reservation to attend a live event using a portable computing device 101 when a fan is usually in close proximity to the live event, such as in a parking lot adjacent to the live event. First, the core inventory service 401 may take in historical data to accurately predict the number of no show seats (Step 1420). As understood by one of ordinary skill in the art, a mathematical regression may be performed to predict an expected number of no show or unused seats. At this point, market pricing system/database 441 calculates a market price (Step 1430) and operators of PCDs 101 are able to request tickets (Step 1440).

Figure 15A:
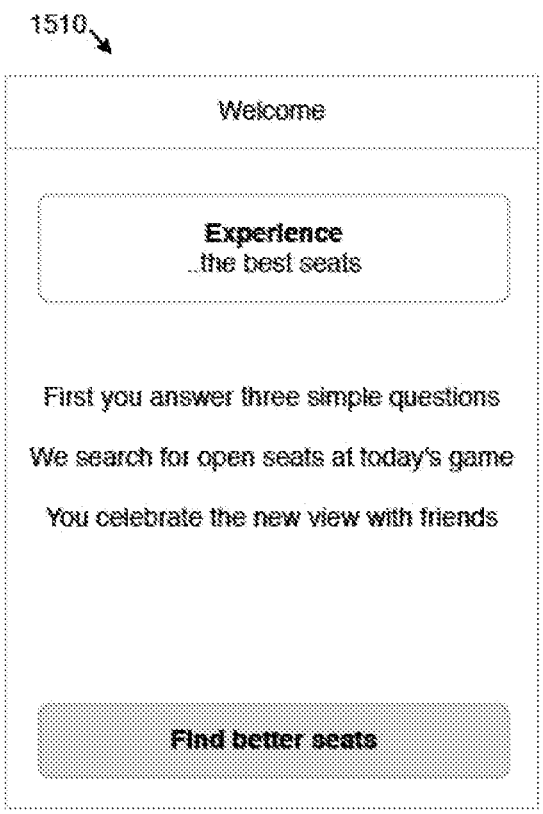
FIGS. 15A-I illustrate graphical user interfaces (GUIs) for an exemplary portable computing device for purchasing and redeeming a reservation to attend a live event.
Figure 15B:
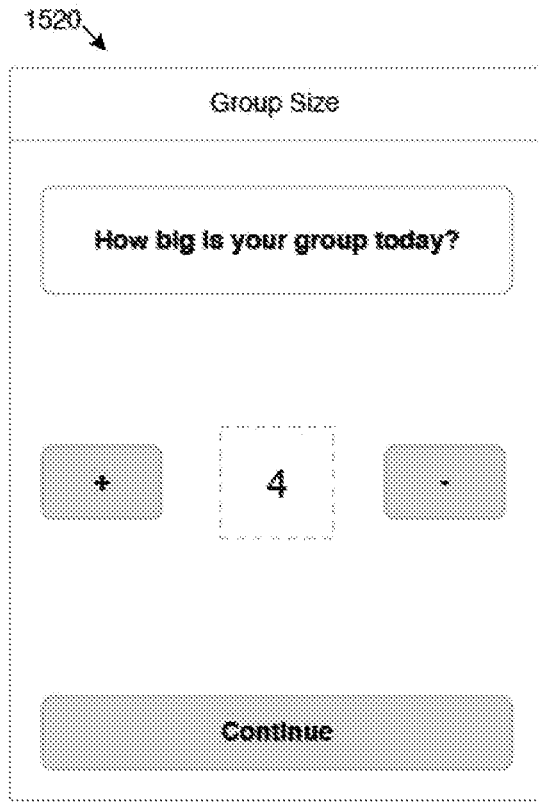
Figure 15C:
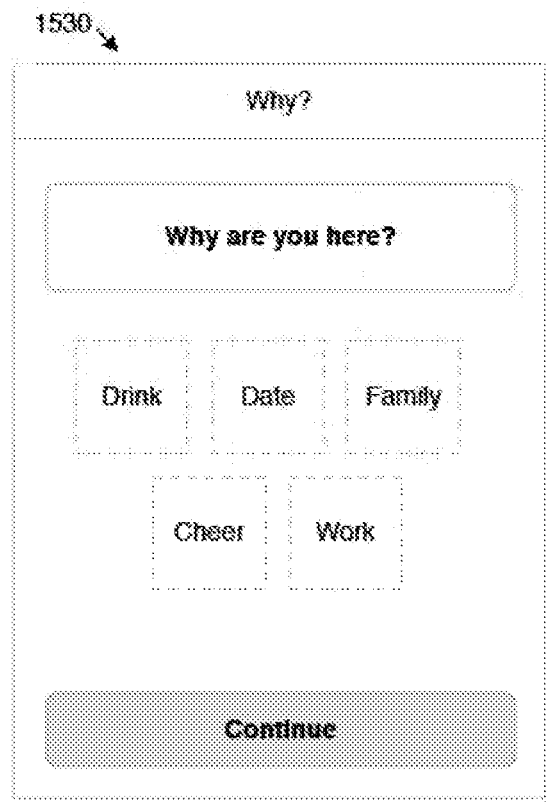
Figure 15D:
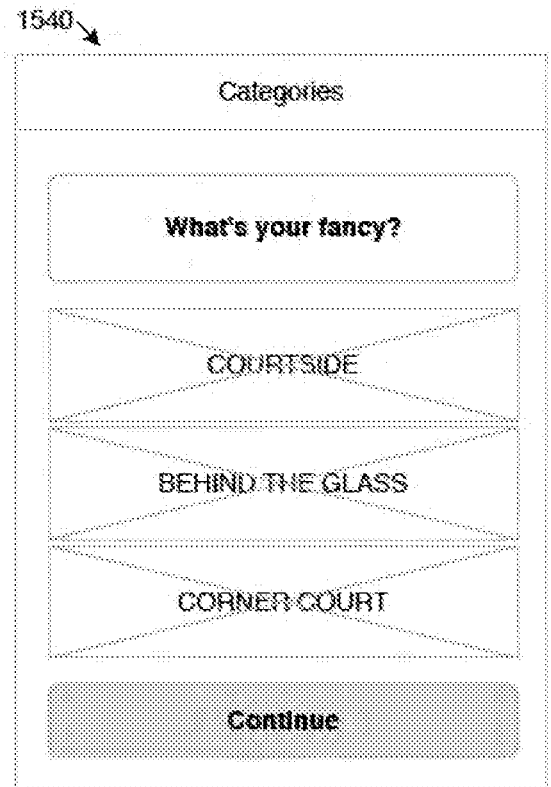

To request a ticket, a fan/operator of PCD 101 is first shown by the core inventory service 401 an information screen (GUI 1510—FIG. 15A), and asked by the core inventory service 401 to enter their group size (GUI 1520—FIG. 15B), and additional questions such as why they are attending, (GUI 1530—FIG. 15C), and what type of seat they would like (GUI 1540—FIG. 15D).

Figure 15E:
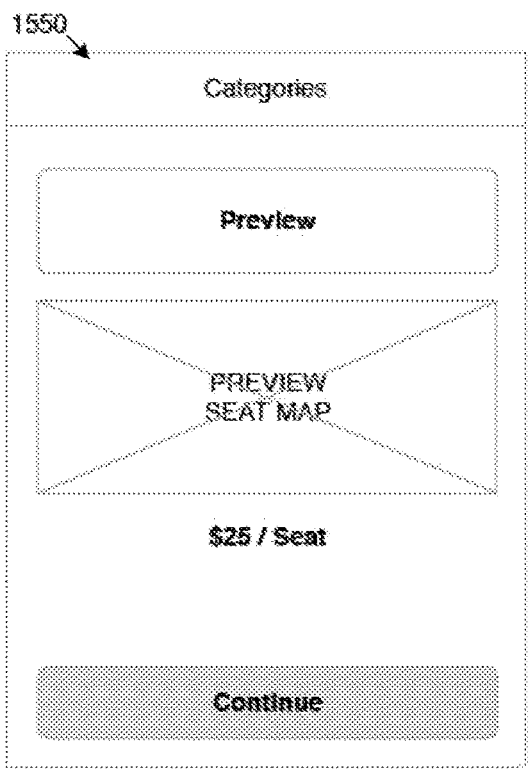
Figure 15F:
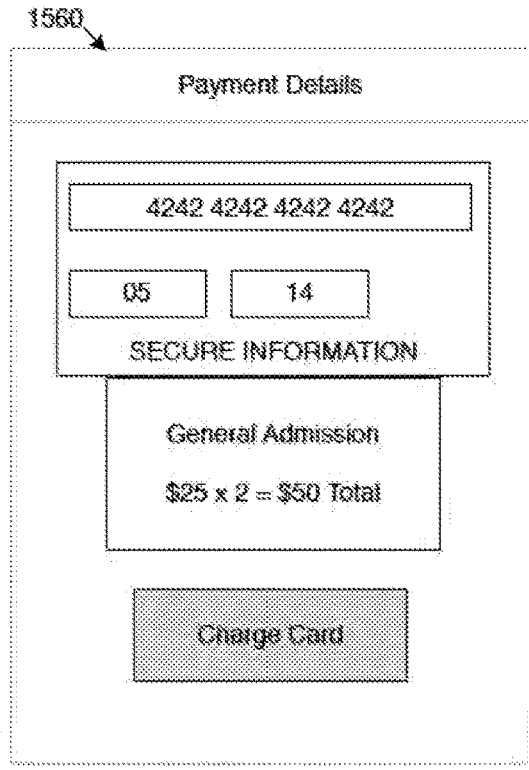

If a seat is not available (Step 1450), the fan is notified by the core inventory service 401 and asked if they would like to change certain parameters such as group size to find a suitable seat (Step 1455). If a seat matching those qualities is available (Step 1450), the fan is shown by the core inventory service 401 a preview and a price (GUI 1550—FIG. 15E). The fan is then required to enter payment information, such as a credit card (GUI 1560—FIG. 15F), and payment is received.

Figure 15G:
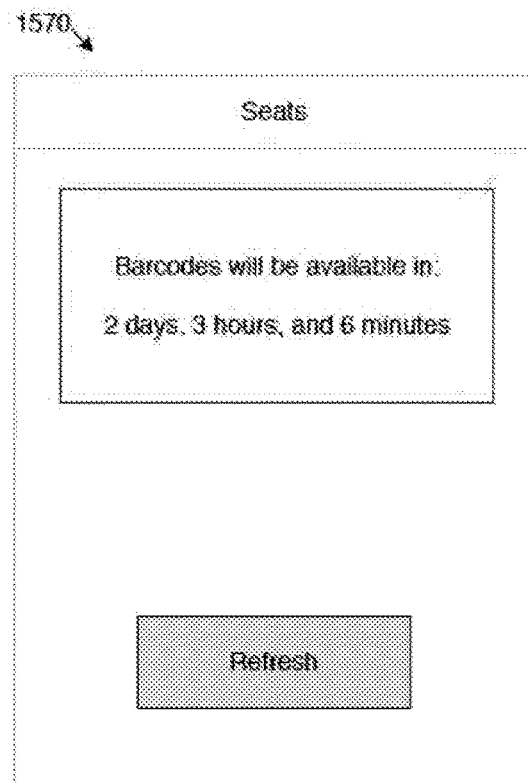
Figure 15H:
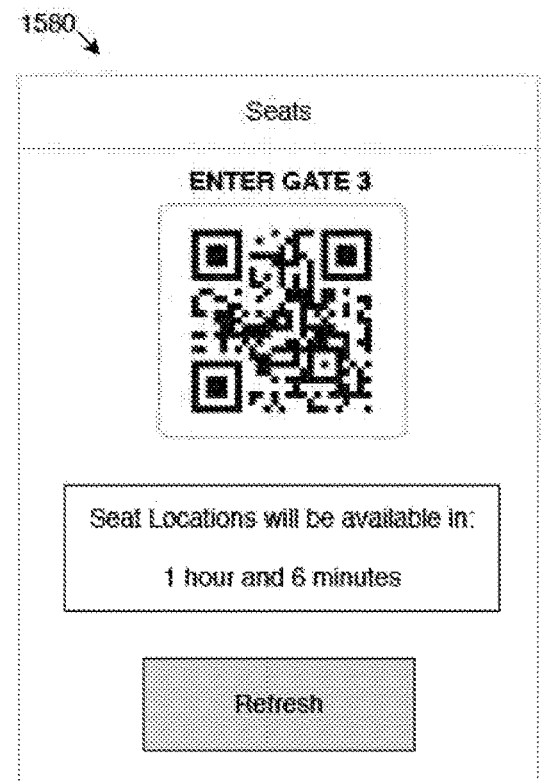
Figure 15I:
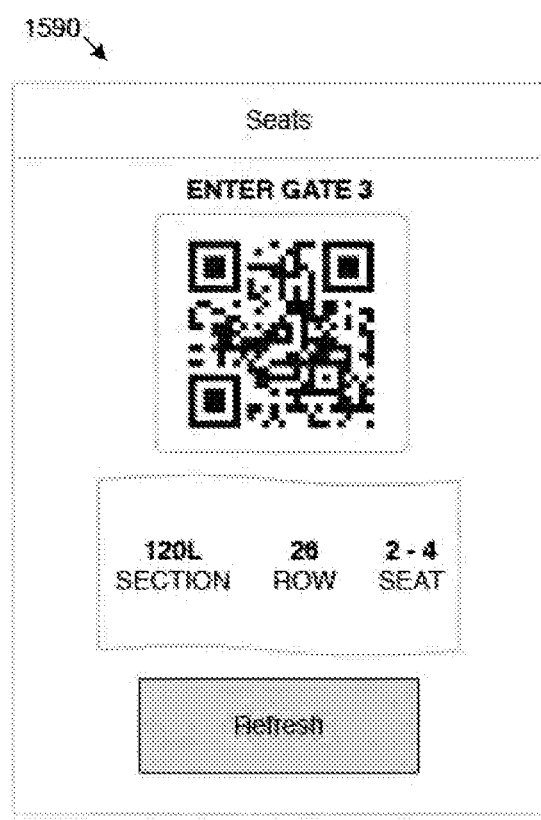

At this point, the fan is assigned barcodes by the core inventory service 401 that grant access into the venue (Step 1460), and is displayed the barcode for entrance (GUI 1580—FIG. 15H). The fan could also be shown a countdown timer for seat location information (Step 1480)(GUI 1570—FIG. 15G). When seat locations are available (Step 1470), the fan is assigned a seat location by the core inventory service 401, and it is displayed (Step 1490)(GUI 1590—FIG. 15I). Seat availability may be determined by the method described in FIG. 13.

Figure 16:
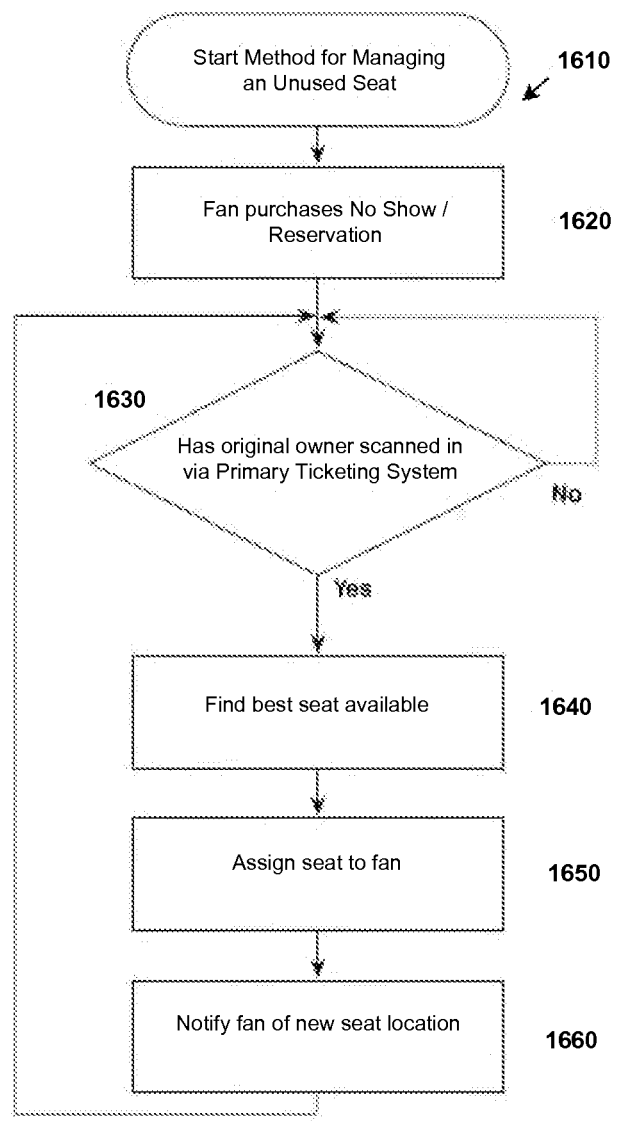
FIG. 16 is a logical flowchart illustrating a method for managing, monitoring, and assigning an unused seat at a live event according to one exemplary embodiment.
Figure 17A:
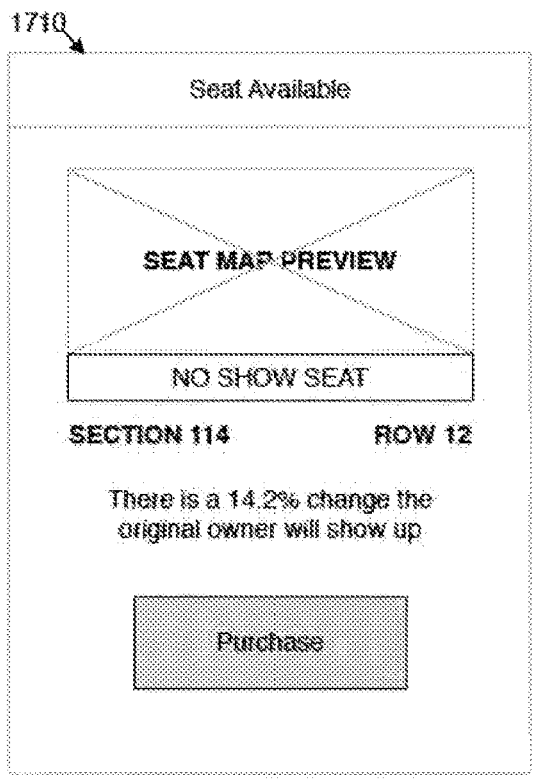
FIGS. 17A-F illustrate graphical user interfaces (GUIs) for an exemplary portable computing device for purchasing and managing an unused seat at a live event.
Figure 17B:
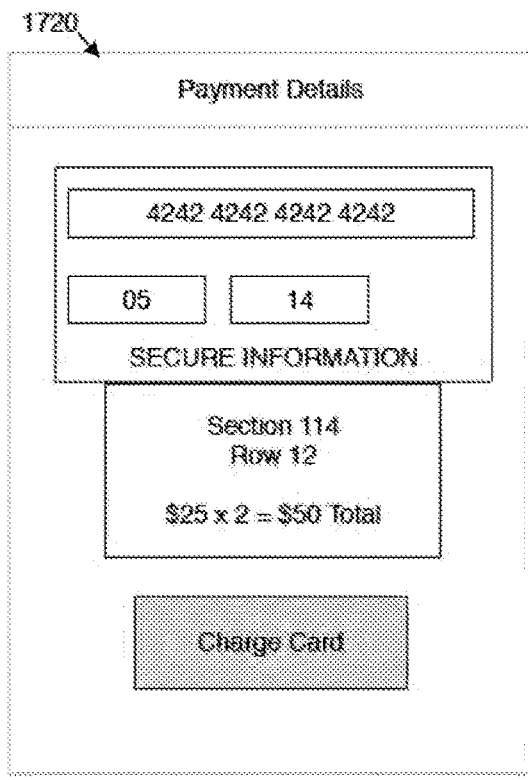

FIG. 16 is a logical flow chart outlining the method 1610 to manage a "no show" seat as either an upgrade or reservation. When previewing a no show seat, the core inventory service 401 may provide the fan with relevant information to be displayed such as, but not limited to, a likelihood of the original seat holder showing up and a price (GUI 1710—See FIG. 17A). The fan purchasing the no show seat may be required to provide payment information (GUI 1720—See FIG. 17B), to purchase a no show seat (Step 1620).

Once a user has purchased a no show seat, a fan is displayed the seat information (GUI 1730—See FIG. 17C) and the core inventory service 401 constantly monitors the Primary Ticketing System 433 for the original seat holder's arrival (Step 1630). If the original seat holder arrives, the fan who purchased the no show seat is now in need of a new seat location (Step 1630—YES).

The core inventory service 401 may determine the best available seat (Step 1640) that meets both the hard requirements, such as group size, and the soft requirements, such as, but not limited to, quality of seat, proximity to current seats, likelihood of original seat holder arriving, etc. After a vacant seat has been found, the core inventory service 401 assigns the new seat to the user (Step 1650) and the fan is notified by the core inventory service 401 of this change (GUI 1740—See FIG. 17D) via a communication platform such as SMS, email, or in-app notifications (Step 1660).

Figure 17C:
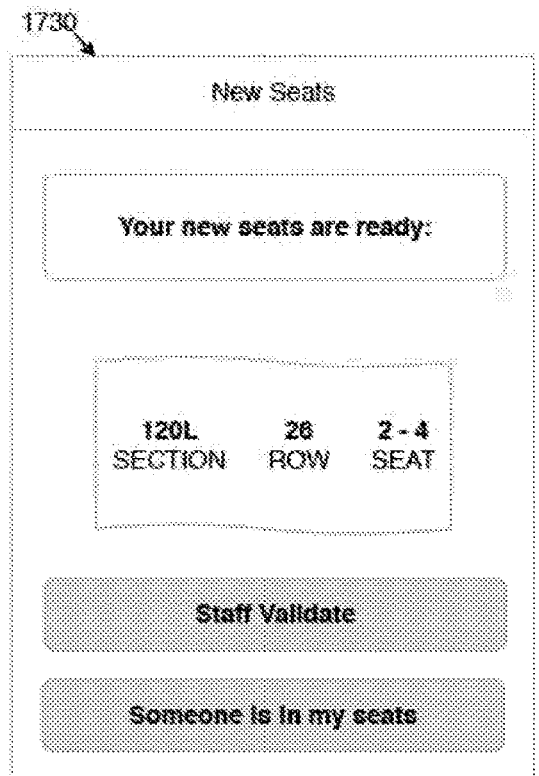
Figure 17D:
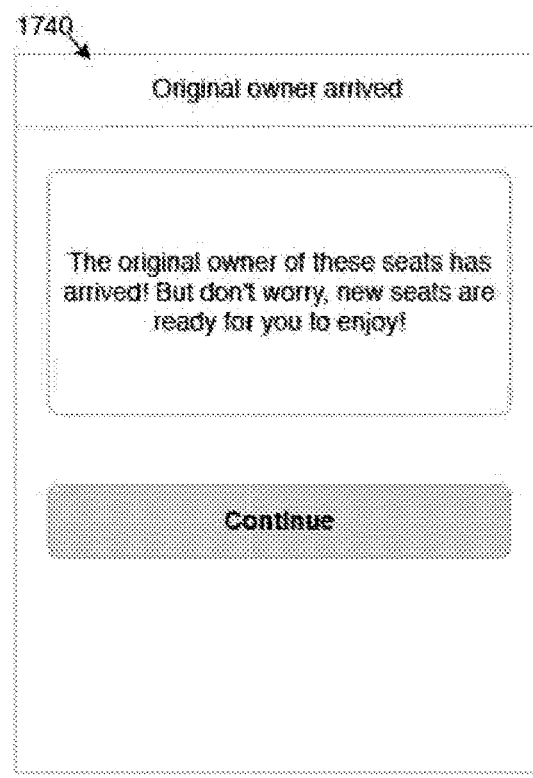
Figure 17E:
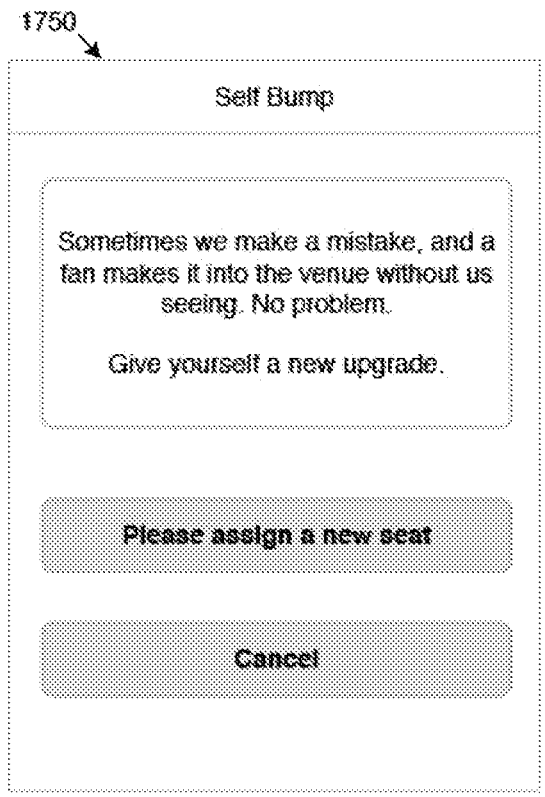

After the fan confirms the new seat location, the fan is displayed the new seat location (GUI 1730—See FIG. 17C). At this stage, the core inventory service 401 continues monitoring the Primary Ticketing System 433 for the original seat holder's owner arrival (Step 1630). If the Primary Ticketing System 433 does not detect the original seat holder's arrival, the fan who purchased the alleged no show seat has the ability to self generate a new seat location (GUI 1750—See FIG. 17E).

Figure 17F:
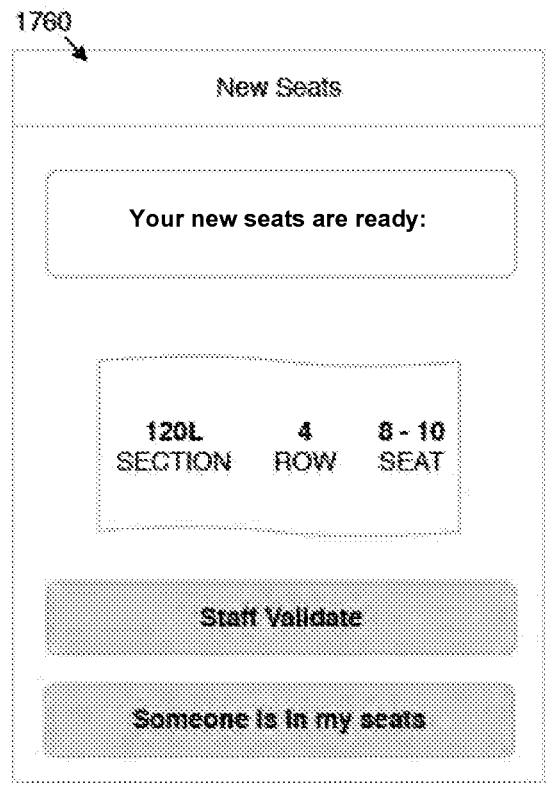

A fan may be restricted by the core inventory service 401 to how often and how many times they are able to generate new seat locations. After requesting a new seat location, the core inventory service 401 finds the new seat location and the fan is displayed the new seat (GUI 1760—See FIG. 17F).

Figure 19:
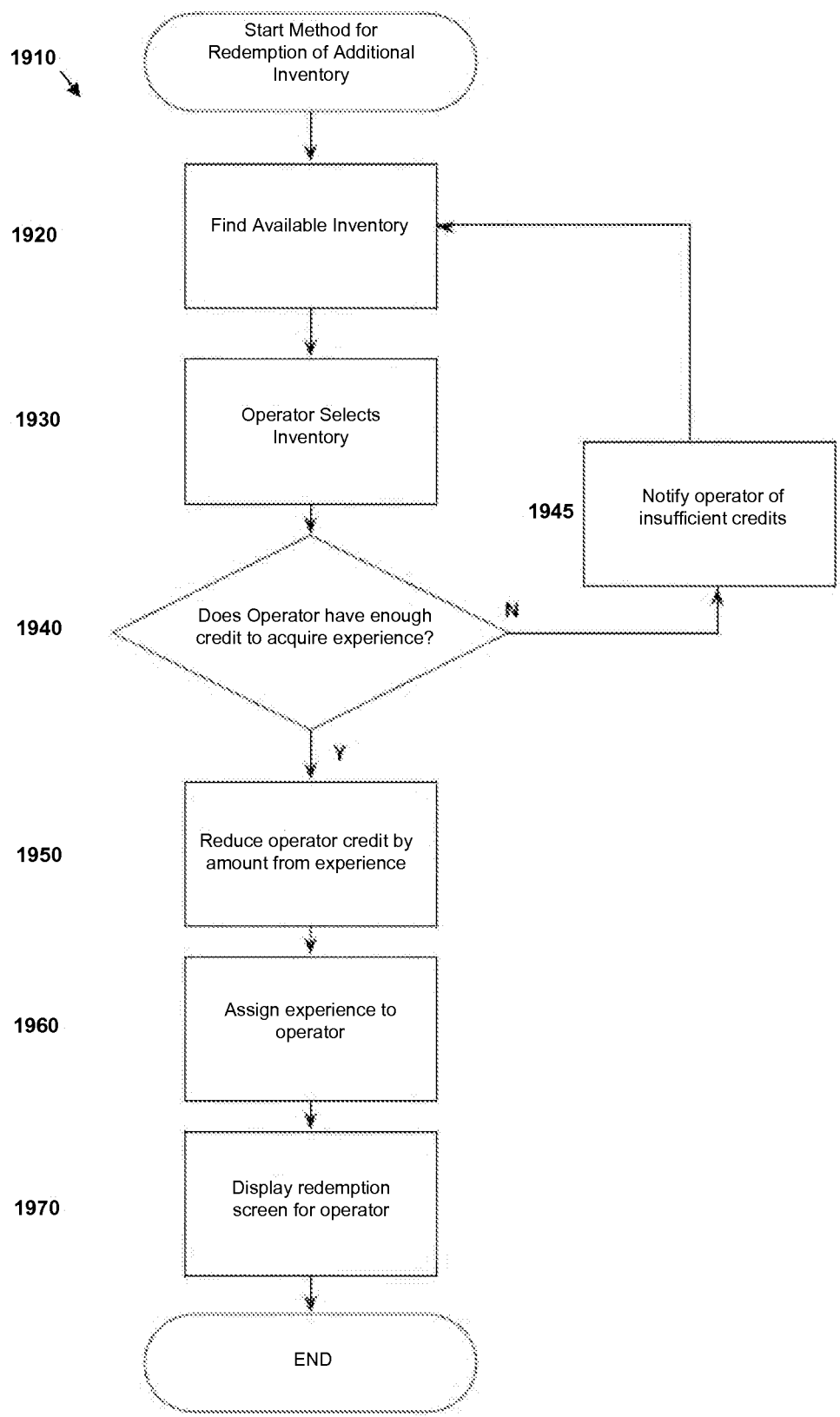
FIG. 19 is a logical flowchart illustrating a method for redeeming and managing additional types of inventory.

FIG. 19 is a logical flow chart outlining a method 1910 for the redemption of additional and/or different types of inventory compared to just seats ("non-seat inventory"). For example, additional inventory ("non-seat inventory") in a baseball context may include, but is not limited to, running the bases on the playing field, a $7^{th}$ inning kiss cam, and a dugout interview. See GUI 1810 of FIG. 18A which lists these three examples. As appreciated by one of ordinary skill in the art, additional inventory besides seats ("non-seat inventory") for an event is dependent on the type of live event being presented at a particular venue.

Available additional inventory may be determined by the core inventory service 401 (Step 1920). Additional inventory is determined by the core inventory service 401 taking into consideration the user ranking system 445 in the case that certain inventory is restricted by access or to a time for fanss of a certain rank/class.

Once the availablity is determined by the core inventory service 401, the fan is presented with a list of available inventory (GUI 1810—See FIG. 18A) The fan may be shown the fan's available credit from the user credit system 446 (See FIG. 4A). After the fan selects a certain inventory (Step 1930), the core inventory service 401 may generate a screen previewing the inventory which may include an image or video, descriptive text, and the cost of said inventory (GUI 1820—See FIG. 18B).

If the fan attempts to acquire the inventory, the core inventory service 401 must confirm that the fan has sufficient credits from the user credit system 446 (Step 1940). If the fan does not have enough credit, the fan is displayed a proper notification from the core inventory service 401 (Step 1945), and is taken back to the screen displaying available inventory (GUI 1810—See FIG. 18B).

If the fan does have enough credit, their balance on the user credits system 446 is debited by the proper amount (Step 1950). The core inventory service 401 then assigns the fan with the inventory (Step 1960). Lastly, the fan is displayed a screen (GUI 1830—See FIG. 18c) with the needed details to redeem the purchased inventory (Step 1970).

During the purchase of a ticket from a vendor such as StubHub, Ticketmaster, Tickets.com, or some alternative provider of tickets, an operator of a PCD 101 could be presented with the a graphical user interface 2001 such as illustrated in FIG. 20A which has an option 2007 to enable a BEST AVAILABLE FOREVER™ optimization algorithm for a fee or for free, or another simple mechanism to sign up for a service allowing the operator of the PCD 101 to change their tickets pre or post-purchase. Additionally, this option 2007 could become available after purchasing tickets and may be offered via alternative delivery mechanisms such as, but not limited to, email, SMS, push notification, or other similar methods.

The service behind the BEST AVAILABLE FOREVER™ optimization algorithm option 2007 may guarantee the operator of a PCD 101 that although better seats are not currently available due to limited inventory or lack of information in the system 2301, if and or when betters seats do become available they will have the ability to move into the better seats. Each offer for a better seat may be performed with or without additional interaction by the operator of the PCD 101. After the initial offer of a better seat, the operator of the PCD 101 could be presented with numerous additional offers up to the event and during the event based on both automatic processing by the system or by requests made by the operator of the PCD 101. Each offer for a better seat could be processed for free or each offer could be subject to an additional fee.

For example, after the BEST AVAILABLE FOREVER™ optimization algorithm option 2007 is selected in FIG. 20A, the operator of the PCD 101 may be presented with the user interface 2002 as illustrated in FIG. 20B. In this exemplary embodiment, the operator of the PCD 101 may be presented with a message 2008 which indicates how close the operator is to receiving the benefits under the BEST AVAILABLE FOREVER™ optimization algorithm option 2007. In this particular embodiment, the message 2008 indicates that the operator of the PCD 101 is number four out of two-hundred forty requests for the BEST AVAILABLE FOREVER™ optimization algorithm.

At a later instance of time or immediately after the user interface 2001 of FIG. 20A is displayed, the operator of the PCD 101 may be presented with the user interface 2003 as illustrated in FIG. 20C. In this exemplary embodiment, a message 2009 may be presented to the operator of the PCD 101 which states that the BEST AVAILABLE FOREVER™ optimization algorithm option 2007 has been granted to the operator of the PCD 101. As a result, the operator of the PCD 101 may be presented with additional options 2011 for selecting the upgraded seat which has been awarded under the BEST AVAILABLE FOREVER™ optimization algorithm described below in connection with FIG. 21. Exemplary options 2011 include, but are not limited to, sit with friends; move seats; and upgrade.

Figure 23:
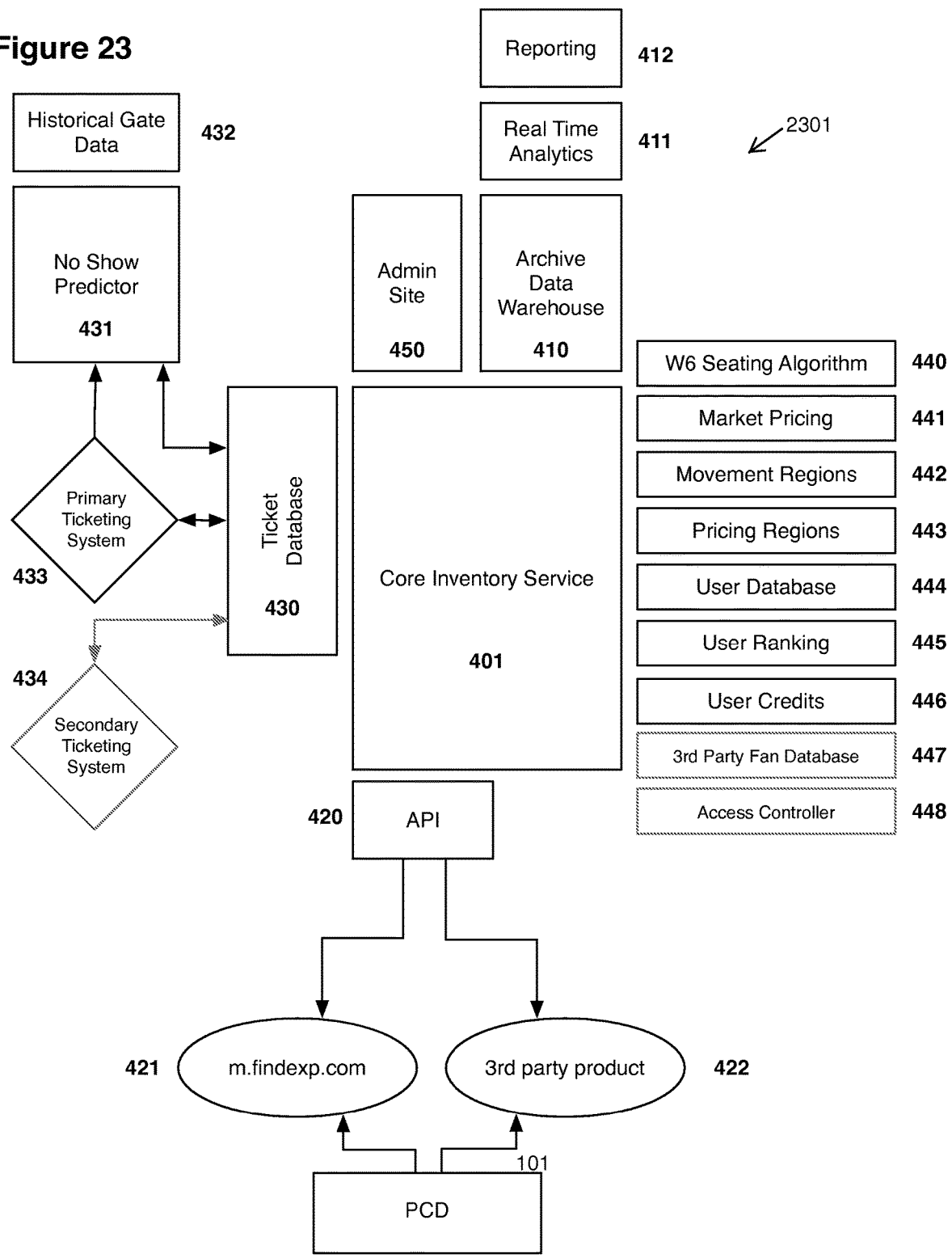
FIG. 23 is a system diagram illustrating a secondary ticketing system and a third party operator of the PCD database.

Referring now to FIG. 23, upon signing up for the BEST AVAILABLE FOREVER™ optimization service, the account identifier for the operator of the PCD 101 and ticket data are transmitted between the primary ticketing system 433 or secondary ticketing system 434, a 3rd party fan database 447, the Ticketing Database 430, and User Database 444. The primary ticketing system 433 may include existing systems such as, but not limited to, TICKETMASTER™ ticket servers or TICKETS.COM™ servers which are coupled to the Internet for tracking current inventory as not all tickets will be "fluid tickets" and to remove specific tickets from the available inventory as illustrated in FIG. 5B and FIG. 6B described above. The user database 444 may contain records of season ticket holders, premium accounts, past users and any pertinent data belonging to operators of PCDs 101 who subscribe to the system 400.

The 3rd party fan database 447 is typically going to be a customer resource management (CRM) like system managed by the event team/partner. Data is captured and re-store data from the third party database 447 (the team's CRM) and placed it into user database 444.

The operator of the PCD 101 may then be placed on a rank ordered list that controls access to moving seats such as described above in connection with the user interface 2003 illustrated in FIG. 20C. At this stage, the electronic ticket and operator of the PCD 101 are managed by the system 2301 illustrated in FIG. 23.

Alternatively, if an operator of the PCD 101 purchases a physical or "paper" ticket and elects to not enable the service during purchase, the operator of the PCD 101 would be able to enable the service before or during the event. First, as illustrated in FIG. 25 which illustrates user interface 2501, the operator of the PCD 101 would be required to enter any machine-readable code information from their physical ticket in a field 2505 of the user interface 2501 either via manual entry or scanning a barcode. The operator of the PCD 101 may also be required to confirm ownership of the physical ticket by either entering a name, email, or last 4 digits of a credit card.

At this stage, the same operator of the PCD 101 and ticket data is transmitted from the primary ticketing system 433 or secondary ticketing system 434 and the 3rd party operator of the PCD 101 database 447 to the Ticketing Database 430 and User Database 444. This transmission occurs similar to when the operator of the PCD 101 elects to enable BEST AVAILABLE FOREVER™ optimization algorithm option 2007 during the purchase as described above.

Referring again to FIG. 23, after an account for the operator of the PCD 101 has been created in the User Database 444, leading up to the event, in conjunction with the seating optimization algorithm 440 described above, an access controller 448 determines when a operator of the PCD 101 is granted access to begin moving their seats such as illustrated in the user interface 2003 of FIG. 20C. The access controller 448 first places fans/users in an order/sequence based on the flow illustrated in FIG. 9B described above, but additional parameters could alter the order at which operators of the PCDs 101 may be arranged.

For instance, if a company such a large beverage provider was a sponsor, an operator of the PCD 101 could post a picture to a social network such as a TWITTER™ brand short messaging system and increase their priority. Additionally, an operator of the PCD 101 could donate money to one or more volunteer agencies or non-profits, like the RED CROSS™ organization, or purchase an upgrade for a military family all in an effort to increase their place on the BEST AVAILABLE FOREVER™ optimization algorithm list.

Figures 20D, 20E, 20F:
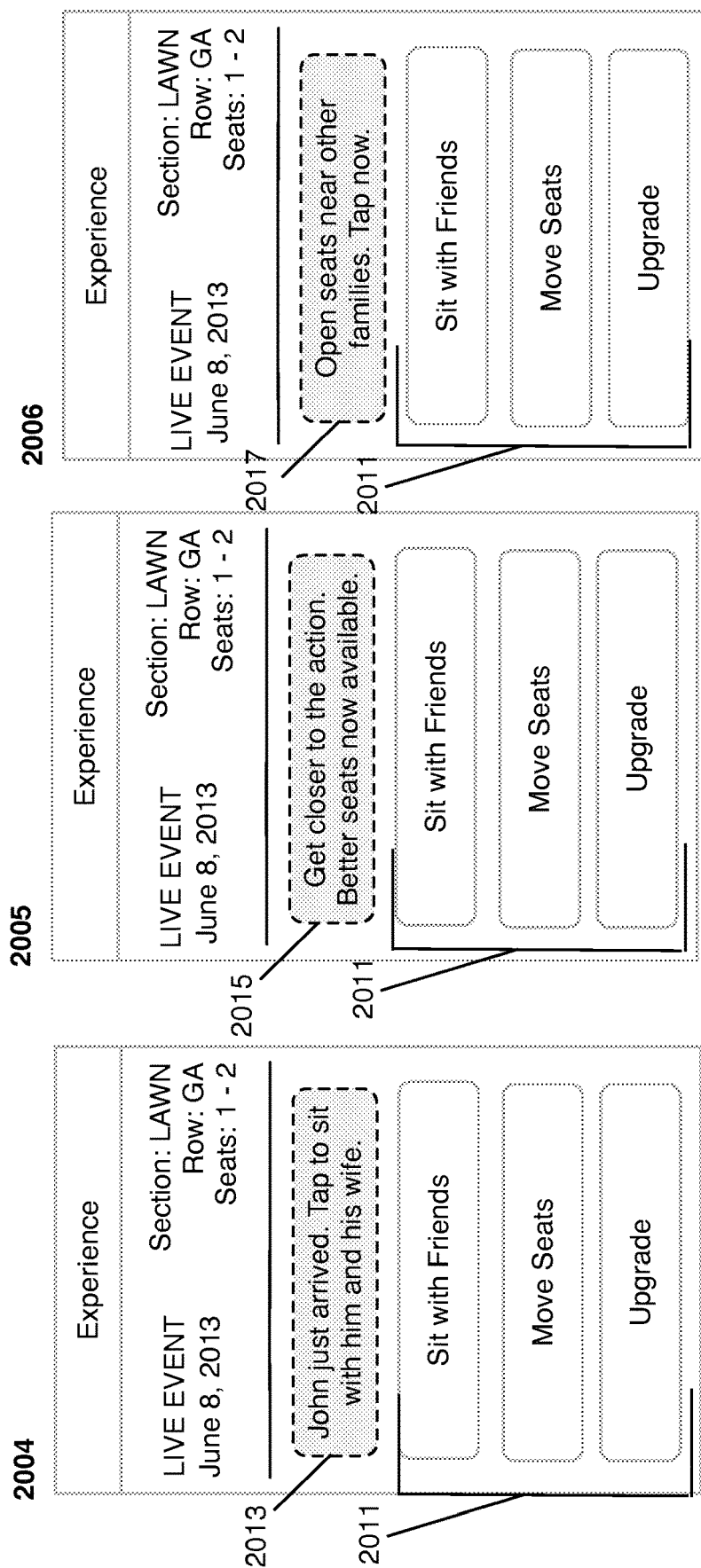

As the operator of the PCD 101 is now granted access to the system 2301, he/she is able to perform at least three functions 2011 as illustrated in FIG. 20C: move seats, upgrade seats, and sit with friends. Additionally, at times, the operator of the PCD 101 may be prompted by the system 2301 to perform one of these options, as inventory becomes available such as illustrated in user interface 2004 of FIG. 20D. Additionally, the system 2301 may elect at times to automatically update the seat of the operator of the PCD 101 without additional interaction or prompt.

As illustrated in user interface 2004, if a known friend of the operator of the PCD 101 arrives, such as the person named "John" contained in the message 2013, and inventory next to the friend or enough seating inventory nearby is available, the operator of the PCD 101 is made aware of this opportunity to change seats. Alternatively, if seats physically located in a better section become available, such as illustrated in user interface 2007 containing message 2015 of FIG. 20E, or if seats physically located near other like-minded fans such as families or dates such as illustrated in user interface 2006 containing message 2017 of FIG. 20F, the operator of the PCD 101 could be notified of such available inventory or alternatively automatically moved.

Referring now to FIG. 21, this figure illustrates a logical flow chart for a method 2100 for managing seats according to a BEST AVAILABLE FOREVER™ optimization algorithm. Block 2110 is the first block of method 2100. The Access Controller 448 of FIG. 23 is responsible for determining when fans are able to modify their seats and what movements between seats may be enabled. First, in block 2110, the system 2301 of FIG. 23 collects and stores all of the operators of PCDs who have selected the BEST AVAILABLE FOREVER™ optimization algorithm option 2007, their respective group sizes, price paid, and intent of attendance received from databases 430, 444 of FIG. 23.

And then, in block 2115, the access controller 448 orders this list by the seat location and then the group sizes in descending order such that the best seat location and largest group is at the top of the list and the worst seat location and smallest group is on the bottom of the list. In block 2120, this list is fed into the W6 Seating Algorithm 440 described above that determines the optimal arrangement of fans. Subsequently, in block 2130, the list of movements required to create this optimal arrangement is stored. Additional modifications may be performed in block 2140 based on external factors such as whether the operator of the PCD 101 is a season ticket holder, or is a customer of a sponsor, or some other relevant and meaningful characteristic. For instance, all season ticket holders could be placed above single game purchasers regardless of quality of seat, group size, or price paid. Alternatively, customers of a given sponsor could be moved up above single game buyers but still below season ticket holders.

With these additional attributes in place, the list may be ranked and sorted in block 2150 by the access controller 448. In this block 2150, the list may be ranked and sorted by sponsors and season ticket holder status.

Next, a respective entrance time may be assigned by the access controller 448 in block 2160 based on an operator of the PCD 101's rank in the list. Also, during block 2160, message 2009 and options 2011 of FIG. 20C may be displayed to the PCD operator. The process 2100 then may return. The original "old" ticket from which the PCD operator switched may be placed into the original ticketing system (primary or secondary) and/or the Best Available Forever pool of seats.

If an operator of the PCD 101 elects to sell their current tickets on the secondary market, it could also be made available to sell their tickets through the secondary ticketing system 434 of FIG. 23. Referring now to FIG. 22A, this figure illustrates a user interface 2200 for a web page of supported by the secondary ticketing system 434 of FIG. 23 and which allows an operator of a PCD 101 or a person with a physical ticket to upload ticket information to the secondary ticketing system 434.

During the uploading of a ticket as illustrated in FIG. 22A, the operator of the PCD 101 could be presented with a check box and input field to offer their tickets leading up to the game for sale on the system 2301. For instance, an operator of the PCD 101 could elect to offer their tickets at a predetermined time, such as fifteen minutes before the start of an event, for exemplary amount, such as, but not limited to, $50 U.S. Dollars. Or an operator of the PCD 101 could elect to offer their tickets for sale at another predetermined time, such as five minutes after the event has started for a lower price compared to the earlier pre-event time such as, but not limited to, $10 U.S. Dollars. The user interface 2200 may also prompt the operator to enter their seat location information with respect to their venue.

Figure 22B:
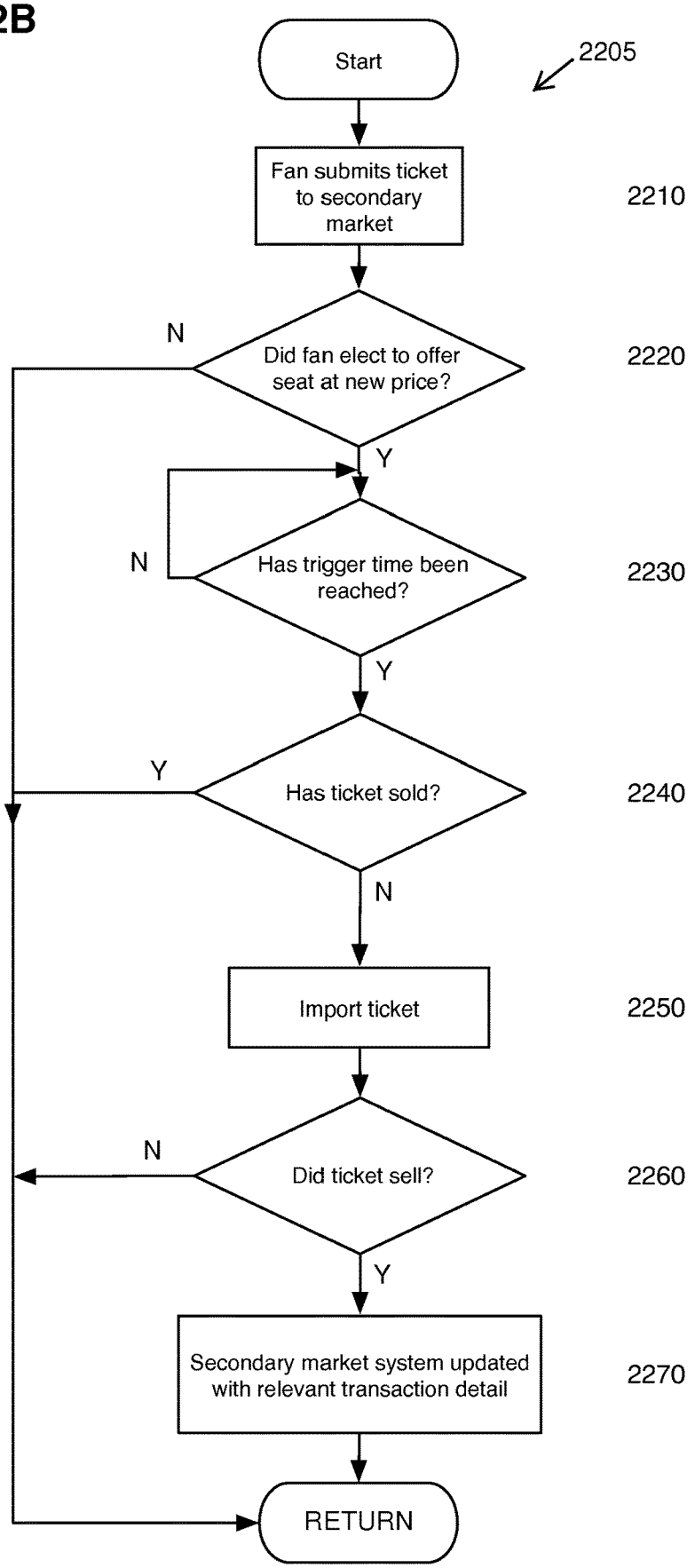
FIG. 22B is a logic flow diagram illustrating the exchange of a ticket from the secondary market to the system for sale to fans.

Referring to FIG. 22B, this figure illustrates a logical flow chart for a method 2205 for selling seats according a secondary ticketing system 434. Block 2210 is the first block of method 2205. After the operator of the PCD 101 or operator of a computer has entered in the information for user interface 2200 of FIG. 22A in block 2210, the system 434 in block 2220 determine if the operator offered the ticket at a new price. If the price remains the same, then the "NO" branch is followed in which the method 2205 returns.

If the operator has offered his/her ticket at a new price, which may be higher or lower than its face value, then the process 2205 proceeds to decision block 2230 in which the secondary ticketing system 434 may wait until the predetermined time triggers completed with the user interface 2200 of FIG. 22A. If a predetermined time set by the ticket holder has been reached, then the process 2205 proceeds to decision block 2240. In decision block 2240, it is determined if the ticket has been sold. If the ticket has sold, then the "YES" branch from decision block 2240 is followed and the process 2205 returns.

If the ticket has not sold, then the "NO" branch from decision block 2240 is followed to block 2250 in which the ticket is imported into the Ticket Database 430. Next, in decision block 2260, it is again determined by the secondary ticketing system 434 if the ticket has been sold. If during the event, the imported ticket is purchased by another operator of the PCD 101, then the "YES" branch from decision block 2260 is followed. If the ticket did not sell, then the "NO" branch from decision block 2260 is followed in which the process 2205 returns.

From the "YES" branch of decision block 2260, in block 2270, the secondary ticket system 434 confirms the sale and exchanges funds with the secondary ticketing system 434. The method or process 2205 then returns.

Referring to FIG. 24, this figure illustrates a logical flow chart for a method 2400 for converting a physical, paper ticket into a "fluid" electronic ticket that may be managed with a PCD 101. Blocks 2410 and 2420 may be alternate first blocks of method 2400.

An operator of a PCD 101 is able to import a paper, digital, or any other type of ticket into the system 2301 of FIG. 23. An operator of the PCD 101 is able to scan or enter their barcodes manually in block 2410 via the core inventory service 401 running a ticket receiving portal/website 421 and an API 420 of FIG. 23. In block 2415, the system 2301 of FIG. 23 via its API 420 then communicates with the primary ticketing system 433 or secondary ticketing system 434 of FIG. 23 and retrieves the relevant operator of the PCD 101 and ticket data, such as contact information for the operator of the PCD 101 and seat location of the ticket.

Alternatively, in block 2420, an operator of the PCD 101 is able to request the primary ticketing system 433 or secondary ticket system 434 during or after an electronic purchase to import their tickets using the BEST AVAILABLE FOREVER™ optimization algorithm option 2007 that may be selected with user interface 2001 of FIG. 20A. After this request is made in block 2420, then in block 2425, the relevant operator of the PCD 101 information and ticket data is sent to the User Database 444 and Ticket Database 430.

In block 2430, the data from either blocks 2415 or 2425 is then used to create a new entry for the operator of the PCD 101 in the User Database 444 is and the ticket is assigned to the operator of the PCD 101. In block 2440, the system 2301 of FIG. 23 then generates a mobile ready machine-readable code such as, but not limited to, a QR, Code 128, Aztec, NFC, or other similar machine-readable formats. In block 2450, the barcodes are then transmitted over the communications network to the PCD 101 where the operator of the PCD 101 is able to manage the ticket as if they were purchased originally on the system 2301 of FIG. 23.

Figure 26A:
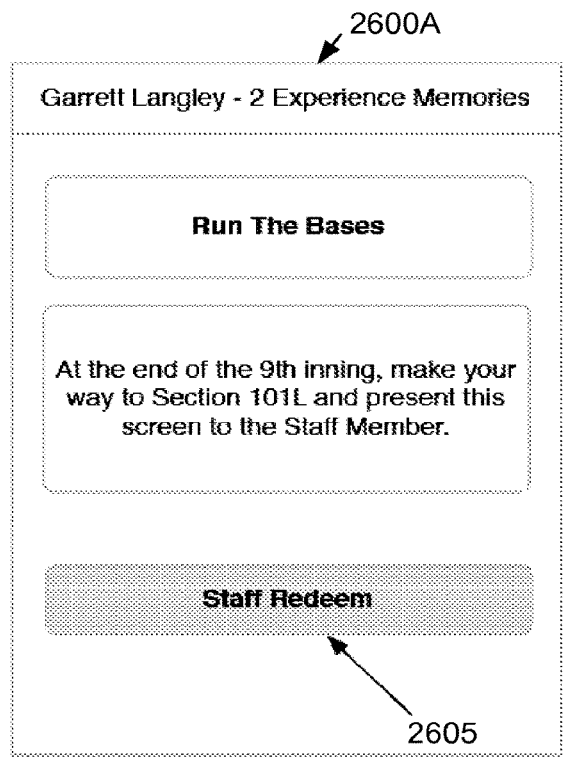
FIG. 26A illustrates an exemplary graphical user interface of an exemplary portable computing device (PCD) for redeeming a purchase or a reward/award such as an upgrade, like running the bases at a baseball game.

Referring now to FIG. 26A, this figure illustrates an exemplary graphical user interface 2600A of an exemplary portable computing device (PCD) 101 for redeeming a purchase or a reward/award such as an upgrade, like running the bases at a baseball game. The exemplary graphical user interface 2600A may provide a redemption mechanism 2605 that may comprise an on-screen button. The redemption mechanism 2605 may be activated by the operator of the PCD 101 or it may be activated by personnel associated with the upgrade, such as, but not limited to, security staff at a sporting event. Further details about the redemption mechanism 2605 will be described below.

Figure 26B:
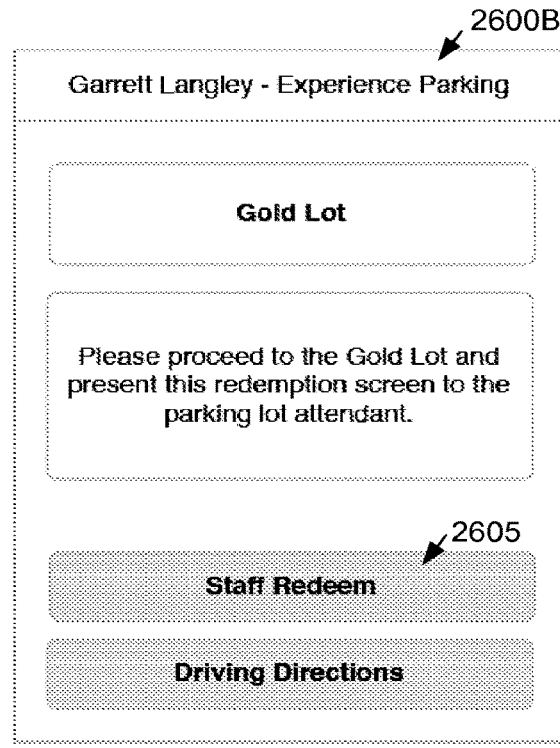
FIG. 26B illustrates an exemplary graphical user interface of an exemplary portable computing device for redeeming a purchase or a reward/award such as an upgrade, like upgraded parking at a live event.
Figure 26C:
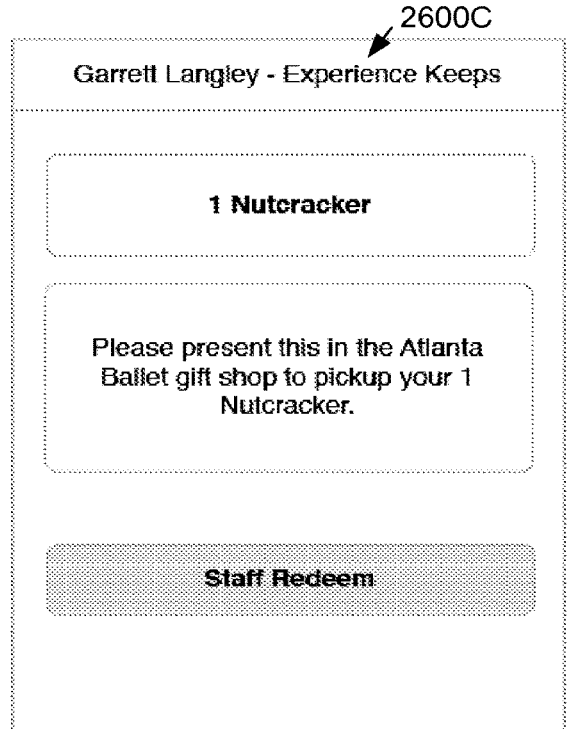
FIG. 26C illustrates an exemplary graphical user interface of an exemplary portable computing device for redeeming a purchase or a reward/award such as a credit for a gift in a gift shop of a live event.

Referring now to FIG. 26B, this figure illustrates an exemplary graphical user interface 2600B of an exemplary portable computing device 101 for redeeming a purchase or a reward/award such as an upgrade, like upgraded parking at a live event. FIG. 26C illustrates an exemplary graphical user interface 2600C of an exemplary portable computing device 101 for redeeming a purchase or a reward/award such as a gift, like a credit for a gift in a gift shop of a live or stadium/auditorium event.

Figure 26D:
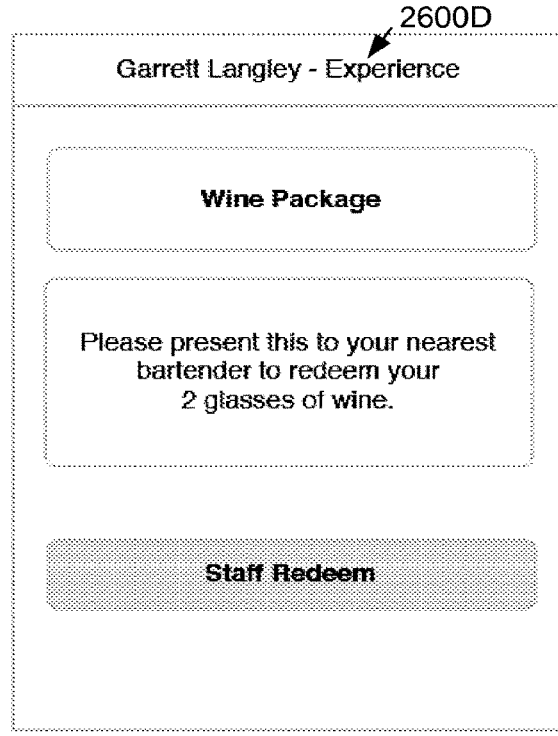
FIG. 26D illustrates an exemplary graphical user interface of an exemplary portable computing device for redeeming a purchase or a reward/award such as a gift, like one or more drinks at a bar.
Figure 26E:
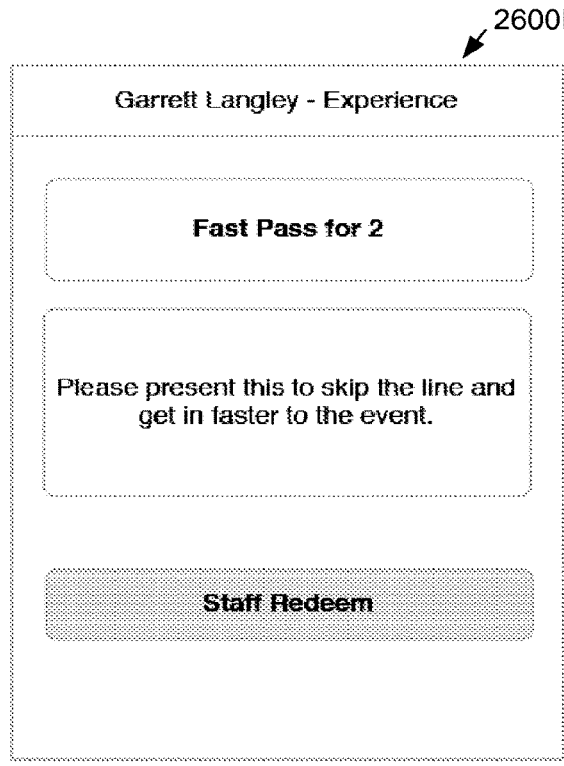
FIG. 26E illustrates an exemplary graphical user interface of an exemplary portable computing device for redeeming a purchase or a reward/award such as an upgraded ticket, like a fast-pass at a theme park in order to avoid long lines or a long wait for a ride and/or a event.

FIG. 26D illustrates an exemplary graphical user interface 2600D of an exemplary portable computing device 101 for redeeming a purchase or a reward/award such as a gift, like one or more drinks at a bar. FIG. 26E illustrates an exemplary graphical user interface 2600E of an exemplary portable computing device 101 for redeeming a purchase or a reward/award such as an upgraded ticket, like a fast-pass at a theme park in order to avoid long lines or a long wait for a ride and/or a event.

Figure 26F:
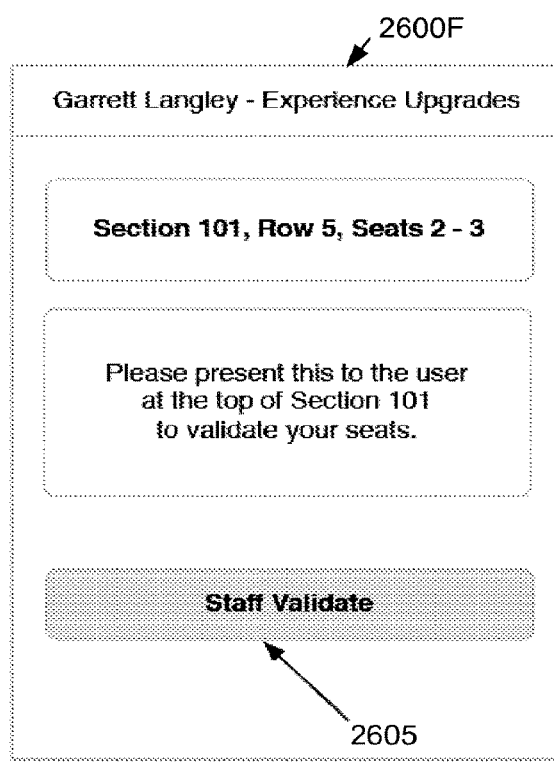
FIG. 26F illustrates an exemplary graphical user interface of an exemplary portable computing device for redeeming a purchase or a reward/award such as an upgraded ticket at a venue, like an upgraded ticket at a sport event.
Figure 26G:
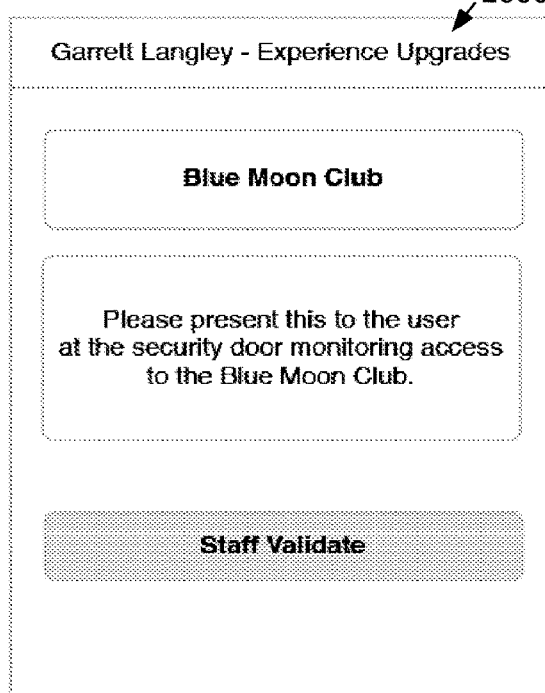
FIG. 26G illustrates an exemplary graphical user interface of an exemplary portable computing device for redeeming a purchase or a reward/award such as access, like access to exclusive or a restricted entrance to club.

FIG. 26F illustrates an exemplary graphical user interface 2600F of an exemplary portable computing device 101 for redeeming a purchase or a reward/award such as an upgraded ticket at a venue, like an upgraded ticket at a sport event. FIG. 26G illustrates an exemplary graphical user interface 2600G of an exemplary portable computing device 101 for redeeming a purchase or a reward/award such as access, like access to exclusive or a restricted entrance to club.

Figure 26H:
FIG. 26H illustrates an exemplary graphical user interface of an exemplary portable computing device for redeeming a purchase or a reward/award such as a gift, like glasses of wine at a bar.

Referring now to FIG. 26H, this figure illustrates an exemplary graphical user interface 2600H of an exemplary portable computing device 101 for redeeming a purchase or a reward/award such as a gift, like glasses of wine at a bar. According to this exemplary embodiment, the operator of the PCD 101 may be provided with a screen counter 2610 which indicates the remaining number of redemptions available and associated with the upgrade for the operator of the PCD 101.

Figure 26I:
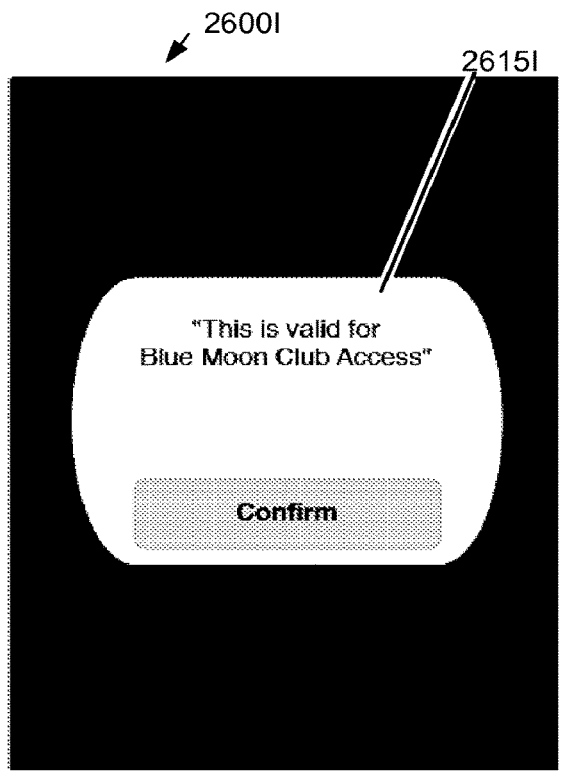
FIG. 26I illustrates an exemplary graphical user interface of an exemplary portable computing device after a redemption mechanism has been activated.

Referring now to FIG. 26I, this figure illustrates an exemplary graphical user interface 2600I of an exemplary portable computing device 101 after a redemption mechanism 2605 has been activated. According to this exemplary embodiment, a modal dialog box 2615I is presented within the graphical user interface 2600I. The modal dialog box 2615I may present a unique set of alphanumeric text that is known by personnel associated with the upgrade and/or reward/award available with the redemption mechanism 2605. In this exemplary embodiment, the unique set of alphanumeric text comprises the following phrase: "This is valid for blue moon club access." As understood by one of ordinary skill the art, the personnel associated with the upgrade may select the unique set of alphanumeric text for security purposes. The modal dialog box 2615I may contain any type of information and may be programmed at any frequency as desired by the personnel associated with the upgrade.

Figure 26J:
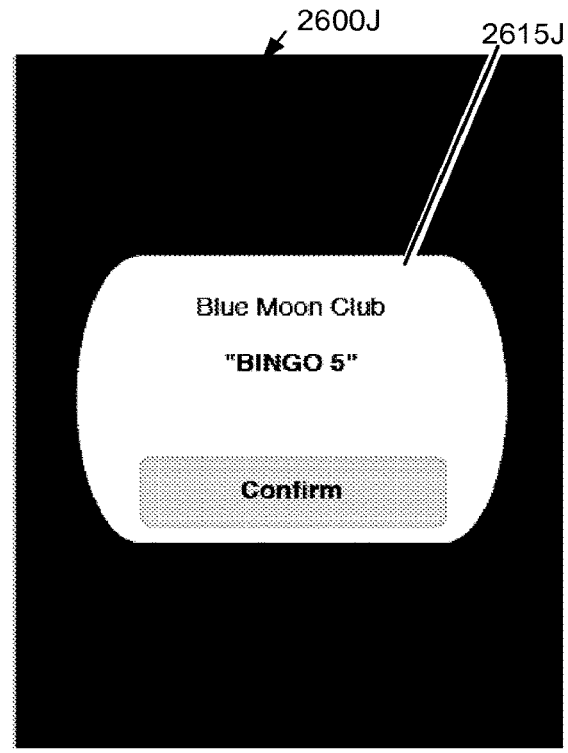
FIG. 26J illustrates an exemplary graphical user interface of an exemplary portable computing device after a redemption mechanism has been activated and in which the modal dialog box comprises the security phrase "BINGO 5" which is only known to the personnel associated with the upgrade.

Referring now to FIG. 26J, this figure illustrates an exemplary graphical user interface 2600J of an exemplary portable computing device 101 after a redemption mechanism 2605 has been activated and in which the modal dialog box 2615J comprises the security phrase "BINGO 5" which is only known to the personnel associated with the upgrade. In this way, the personnel associated with the upgrade may reduce or eliminate the risk of counterfeits and/or attempts by users to create fake or unauthorized upgrades with their portable computing devices 101.

Figure 26K:
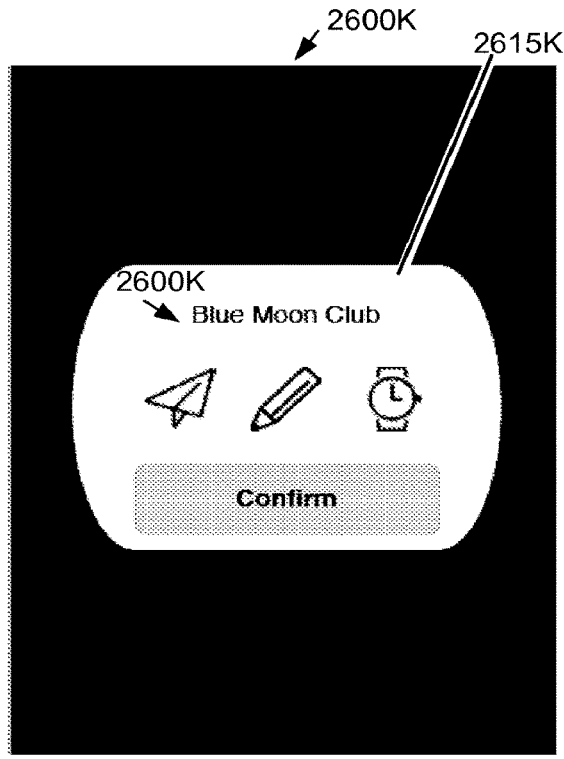
FIG. 26K illustrates an exemplary graphical user interface of an exemplary portable computing device after a redemption mechanism has been activated and in which the modal dialog box comprises security graphical symbols.

Referring now to FIG. 26K, this figure illustrates an exemplary graphical user interface 2600K of an exemplary portable computing device 101 after a redemption mechanism 2605 has been activated and in which the modal dialog box 2615K comprises security graphical symbols. According to this exemplary embodiment, the security symbols comprise a paper airplane, a pencil, and a watch symbol. As understood by one of ordinary skill the art, any number and/or types of symbols may be selected by personnel associated with the upgrade for display in the modal dialog box 2615K.

Figure 26L:
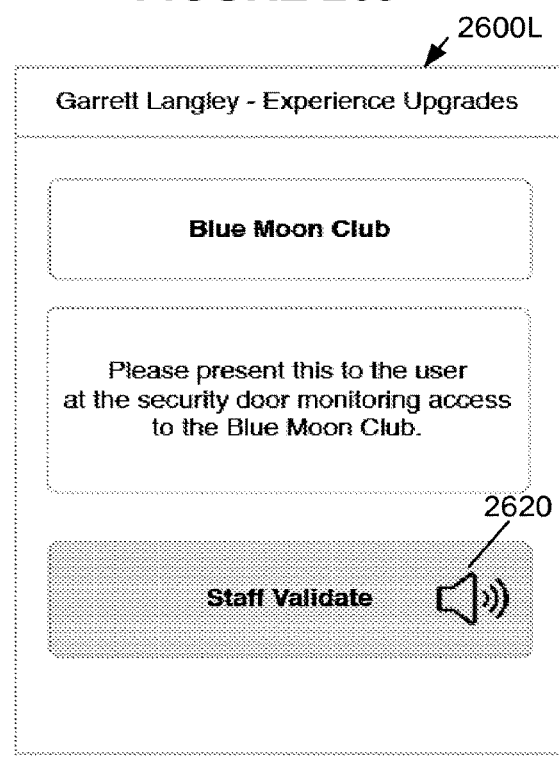
FIG. 26L illustrates an exemplary graphical user interface of an exemplary portable computing device after a redemption mechanism has been activated and in which a dialog box comprises a security validation mechanism.

Referring now to FIG. 26L, this figure illustrates an exemplary graphical user interface 2600L of an exemplary portable computing device 101 after a redemption mechanism 2605 has been activated and in which a dialog box comprises a security validation mechanism 2620. According to this exemplary embodiment, the security validation mechanism 2620 comprises a button for activating an audible tone that is generated by the PCD 101. The audible tone may comprise any sound(s) selected by personnel associated with the upgrade. The audible tone may also comprise synthetic speech generated by the PCD 101.

Figure 26M:
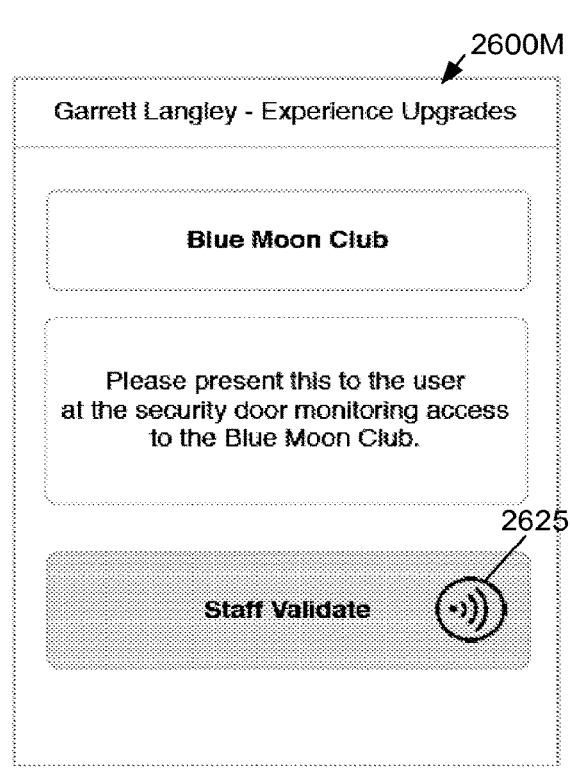
FIG. 26M illustrates another an exemplary graphical user interface of an exemplary portable computing device after a redemption mechanism has been activated and in which a dialog box comprises a security validation mechanism.

Referring now to FIG. 26M, this figure illustrates an exemplary graphical user interface 2600M of an exemplary portable computing device 101 after a redemption mechanism 2605 has been activated and in which a dialog box comprises a security validation mechanism 2625. According to this exemplary embodiment, the security validation mechanism 2625 comprises an on-screen button for activating a wireless machine readable code. According to one exemplary embodiment, the wireless machine readable code may comprise a Bluetooth signal as understood by one of ordinary skill in the art. However, other types of wireless machine readable codes are included within the scope of this disclosure and may include, but are not limited to, acoustic, infrared, radio frequency, and other types of wireless machine readable codes.

Figure 26N:
FIG. 26N illustrates a further exemplary graphical user interface of an exemplary portable computing device after a redemption mechanism has been activated and in which a dialog box comprises a security validation mechanism.

Referring now to FIG. 26N, this figure illustrates an exemplary graphical user interface 2600N of an exemplary portable computing device 101 after a redemption mechanism 2605 has been activated and in which a dialog box comprises a security validation mechanism 2630. According to this exemplary embodiment, the security validation mechanism 2630 comprises a visual machine-readable code. The visual machine-readable code may comprise a barcode. In the exemplary embodiment illustrated, a two-dimensional barcode is provided, however, other types of barcodes are feasible and include one-dimensional barcodes as understood by one of ordinary skill in the art. Any type of barcode may be used as the machine-readable code as understood by one of ordinary skill in the art.

Figure 26O:
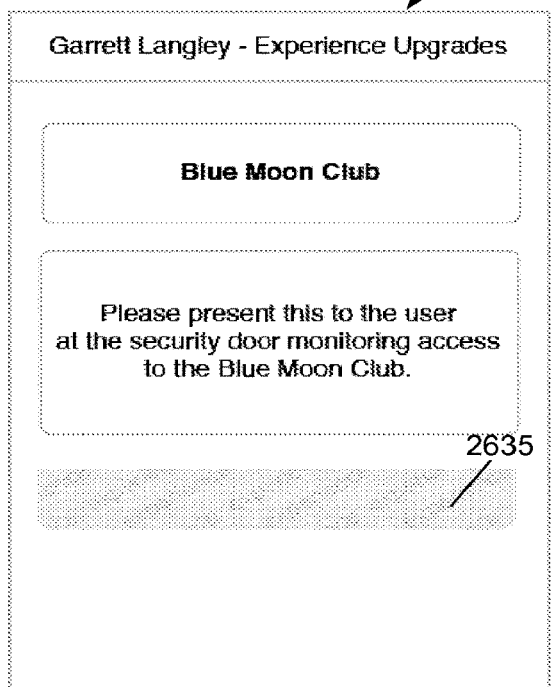
FIG. 26O illustrates an additional exemplary graphical user interface of an exemplary portable computing device after a redemption mechanism has been activated and in which a dialog box comprises a security validation mechanism.

Referring now to FIG. 26O, this figure illustrates an exemplary graphical user interface 2600O of an exemplary portable computing device 101 after a redemption mechanism 2605 has been activated and in which a dialog box comprises a security validation mechanism 2635. According to this exemplary embodiment, the security validation mechanism 2635 comprises a an on-screen visual validation mechanism such as a hologram type image as understood by one of ordinary skill the art.

Figure 26P:
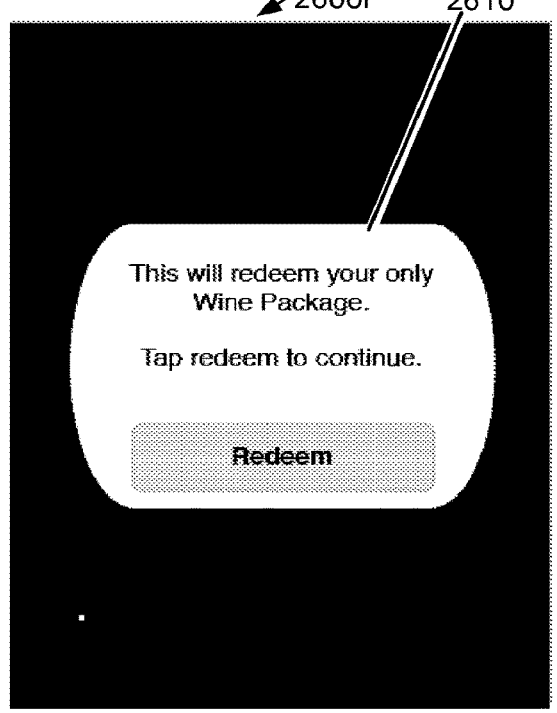

Referring now to FIGS. 26P-Q, these figures illustrate exemplary graphical user interfaces 2600P-Q of an exemplary portable computing device 101 after a redemption mechanism 2605 has been activated. According to these exemplary embodiments, a modified screen counter 2610'/2610" is presented within the graphical user interfaces 2600P-Q. The modified screen counters 2610'/2610" may display the number of upgrades/gifts that remain and it may provide an on-screen button to activate redemption for the upgrade/gift which is available.

Referring now to FIG. 26R, this figure illustrates an exemplary graphical user interface 2600R of an exemplary portable computing device 101 after a redemption mechanism 2605 has been activated and after redemption of an upgrade has been made, such as tapping the on-screen button for confirming upgrades as illustrated in FIGS. 26P-Q. According to this exemplary embodiment, a redemption message 2640 may be displayed within the graphical user interface 2600R. This redemption message 2640 may comprise a text message such as the word "Redeemed" shown on the display. Other words and phrases are possible and are included within the scope of this disclosure.

Referring now to FIG. 26S, this figure illustrates an exemplary graphical user interface 2600S of an exemplary portable computing device 101 after a redemption mechanism 2605 has been activated and after redemption of an upgrade has been made, such as tapping the on-screen button for confirming upgrades as illustrated in FIGS. 26P-Q. According to this exemplary embodiment, a redemption message 2640' may be displayed within the graphical user interface 2600R. This redemption message 2640' may comprise a text message as well as a modal dialog box which states: "This upgrade is no longer valid." Other words and phrases are possible and are included with the scope of this disclosure.

Figure 27:
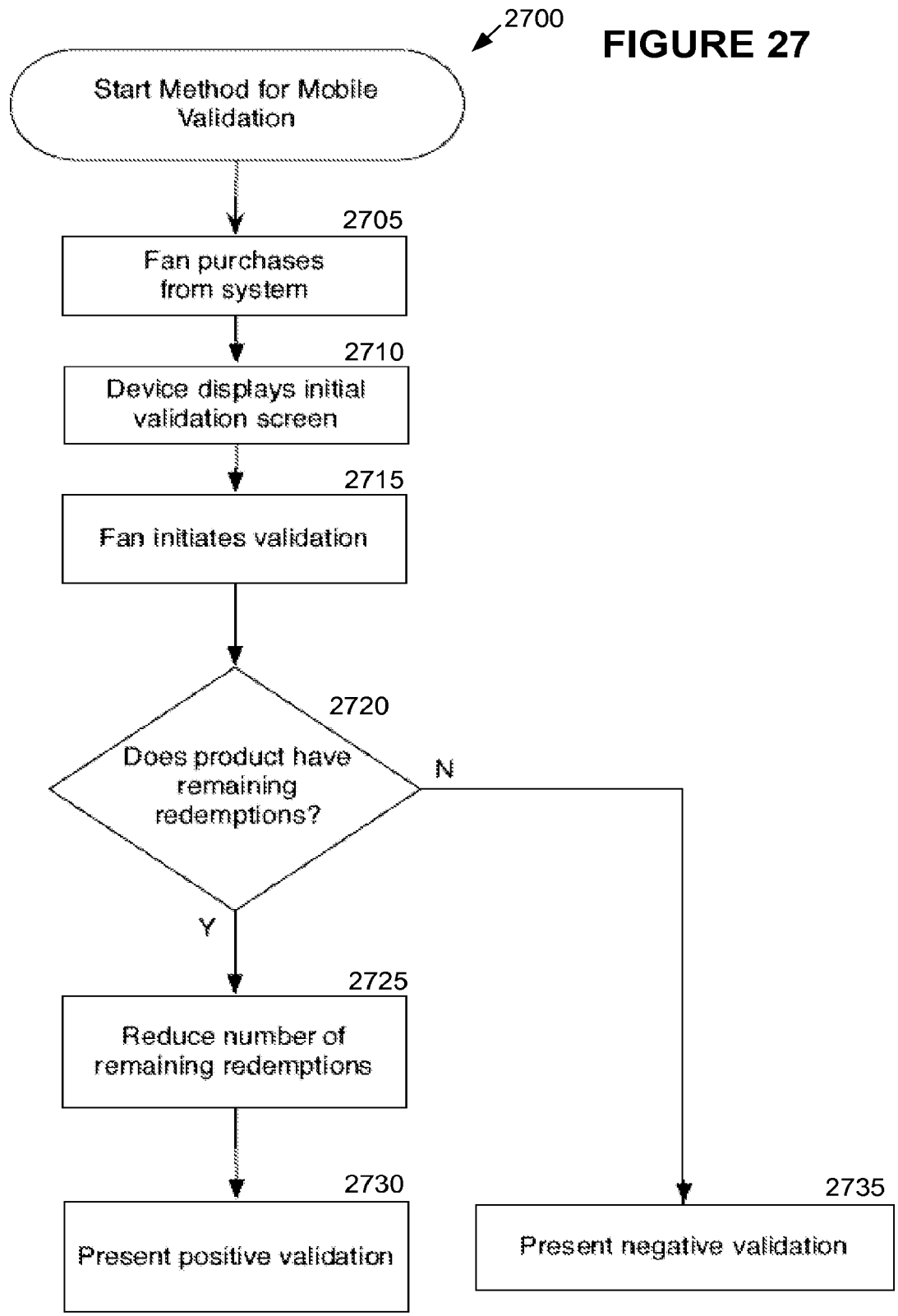
FIG. 27 illustrates a method for validating a purchase with a portable computing device.

Referring now to FIG. 27, this figure illustrates a method 2700 for validating a purchase with a portable computing device. In block 2705, an operator of a PCD 101 may purchase a product or service that will require validation by personnel associated with a product or service. For example, an operator of the PCD 101 may have purchased the service of/access for running the bases at a professional baseball game as illustrated in FIG. 26A.

Next, in block 2710, a validation screen of a graphical user interface may be presented on the display 1332 of the portable computing device 101. For example, any one of the type of graphical user interfaces illustrated in FIGS. 26A-26G may be presented to an operator of a PCD 101. Next, in block 2715, the operator of the PCD 101 may activate an on-screen redemption mechanism 2605 in order to initiate validation.

After the validation has been initiated by the portable computing device 101, the portable computing device 101 may communicate with one or more server computers 401, as illustrated in FIG. 23, that may store and track the number of redemptions available for a particular operator of a PCD 101. Next, in decision block 2720, the server computer 401 may determine if the operator of the PCD 101 has any remaining redemptions available for processing.

If the inquiry to decision block 2720 is negative, then the "No" branch is followed to block 2735 in which the server 401 of FIG. 23 sends a message to the PCD 101 to display a negative validation. For example, exemplary graphical user interface 2600H of FIG. 26S may be displayed in which the operator is informed that zero or no redemptions exist for the operator.

If the inquiry to decision block 2720 is positive, then the "Yes" branch is followed to block 2725 in which the computer server 401 reduces the number of remaining redemptions available for the operator of the PCD 101 by at least one count. Subsequently in block 2730, the server 401 instructs the PCD 101 to present a positive validation of the redemption. For example, graphical user interfaces 2600I-K of FIGS. 26I-O may be displayed as well as graphical user interface 2600Q of FIG. 26Q which also displays the remaining number of redemptions available to the operator of the PCD 101. As illustrated in FIGS. 26I-O, the graphical user interfaces 2600I-K may comprise modal dialog boxes 2615 which may display unique codes, alphanumeric text, as well machine readable code activation mechanisms 2625-2635.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example.

Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the Figures which may illustrate various process flows.

In one or more exemplary aspects, the functions described may be implemented in hardware, software, firmware, or any combination thereof. Specifically, as noted above and illustrated in the several figures, while several different computer servers have been illustrated and described, such as the live concierge server 102 of FIG. 1A, the experience ("EXP") server 102 of FIGS. 3A, 5A, 6A, 7A, 8A, and 11A, the dynamic group transport server 202 of FIG. 2A, and the core ticket service server 401 of FIG. 4A, one of ordinary skill in the art recognizes that these servers 102, 202, and 401 may be combined into a single server as appropriate and based on the design/demands of a particular system. Similarly, these servers 102, 202, and 401 may be maintained as separate hardware devices as appropriate and based on the design/demands of a particular system. Thus, various combinations of hardware and/or software may be employed without departing from the inventive system and method described herein.

If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source, such as in "cloud" computing, using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Although selected aspects have been illustrated and described in detail, it will be understood that various substitutions and alterations may be made therein without departing from the spirit and scope of the present invention, as defined by the following claims.

The invention claimed is:

1. A method of distributing electronic ticket status information over a network to a remote subscriber portable computing device during a live event, the method comprising:
   providing an electronic ticket manager application to a subscriber for installation on the remote subscriber portable computing device;
   receiving ticket data at a transmission server during the live event about an existing electronic ticket associated with the remote subscriber portable computing device sent from a data source over the Internet, the ticket data including a location of a seat associated with the remote subscriber portable computing device and locations of other seats available within a venue for the live event; the transmission server comprising a microprocessor and a memory that stores the remote subscriber's preferences for ticket information format, destination address, and specified tickets; the ticket data further comprising a group size for electronic tickets associated with one or more requests for group seating, the group seating being defined by two or more requests originating from two or more portable computing devices of remote subscribers who have existing personal relationships among each other identified in a database which is accessed by the transmission server;
   wherein the microprocessor filters locations of available seats within the venue for the live event according to a seating optimization algorithm to identify optimal and available seats corresponding to the group seating; the microprocessor generating a first, ranked list of locations of each seat associated with an electronic ticket presently assigned to each portable computing device of remote subscribers within the venue during the live event who requested participation in the electronic seating optimization algorithm; the first, ranked list of locations being sorted where larger groups of available seats with seat locations within the venue have a higher ranking over smaller groups of seats with less seat locations within the venue; the microprocessor generating a second, ranked list of locations of each seat that is available for the group seating and in accordance with the electronic seating optimization algorithm; the second, ranked list of locations being sorted where remote subscribers requesting group seating and having sponsor status or frequent ticket holder status are provided with a higher ranking over remote subscribers requesting group seating and that do not have sponsor status or frequent ticket holder status;
   generates an electronic ticket alert during the live event from the filtered data indicating locations of seats corresponding to the group seating of the second list;
   formats the electronic ticket alert into data blocks according to said information format; and
   transmits the formatted ticket alert during the live event over a wireless communication channel to the remote subscriber portable computing device based upon the destination address, wherein the ticket alert causes a message to be displayed on a display of the remote subscriber portable computing device, the message comprising an electronic ticket presenting a location of a plurality of seats within the venue corresponding to the group seating available during the live event.

2. The method of claim 1, wherein the transmission server transmits an invitation message over the wireless communication channel to the remote subscriber portable computing device based upon the destination address, the invitation message comprising a selectable option for participating in the seating optimization algorithm.

3. The method of claim 1, wherein the first list is further ranked with the microprocessor according to the personal relationships between originators of the requests.

4. The method of claim 3, wherein the personal relationships include at least one of friend relationships and family relationships.

5. The method of claim 4, wherein the transmission server transmits an arrival message over the wireless communication channel to the remote subscriber portable computing device, the arrival message advising if at least one of a friend and a family member has arrived during the live event.

6. The method of claim 5, wherein the arrival message further comprises a selectable option for participating in the seating optimization algorithm in order to provide a seat adjacent to the arrived friend or family member.

7. The method of claim 1, wherein the portable computing device comprises at least one of a mobile telephone, a satellite telephone, a pager, a personal digital assistant ("PDA"), a smartphone, a navigation device, a smartbook or reader, a media player, and a tablet Portable Computer ("PC").

8. A method of distributing electronic ticket status information over a network to a remote subscriber portable computing device during a live event, the method comprising providing an electronic ticket manager application to a subscriber for installation on the remote subscriber portable computing device;

a transmission server transmits an invitation message over a wireless communication channel to the remote subscriber portable computing device based upon a destination address, the invitation message comprising a selectable option displayed on a display of the remote subscriber portable computing device for participating in a seating optimization algorithm for group seating;

receiving ticket data at the transmission server during the live event about an existing electronic ticket associated with the remote subscriber portable computing device sent from a data source over the Internet, the ticket data including a location of a seat associated with the remote subscriber portable computing device and locations of other seats available within the venue for the live event; the transmission server comprising a microprocessor and a memory that stores the remote subscriber's preferences for ticket information format, destination address, and specified tickets; the ticket data further comprising a group size for electronic tickets associated with one or more requests for group seating, the group seating being defined by two or more requests originating from two or more portable computing devices of remote subscribers who have existing personal relationships among each other identified in a database which is accessed by the transmission server;

wherein the microprocessor filters locations of available seats within the venue for the live event according to a seating optimization algorithm to identify optimal and available seats corresponding to the group seating; the microprocessor generating a first, ranked list of locations of each seat associated with an electronic ticket presently assigned to each portable computing device of remote subscribers within the venue during the live event who requested participation in the electronic seating optimization algorithm; the first, ranked list of locations being sorted where larger groups of available seats with seat locations within the venue have a higher ranking over smaller groups of seats with seat locations within the venue; the microprocessor generating a second, ranked list of locations of each seat that is available for the group seating and in accordance with the electronic seating optimization algorithm; the second, ranked list of locations being sorted where remote subscribers requesting group seating and having sponsor status or frequent ticket holder status are provided with a higher ranking over remote subscribers requesting group seating and that do not have sponsor status or frequent ticket holder status;

generates an electronic ticket alert during the live event from the filtered data indicating locations of seats corresponding to the group seating of the second list;

format the electronic ticket alert into data blocks according to said information format; and transmits the formatted ticket alert during the live event over the wireless communication channel to the remote subscriber portable computing device based upon the destination address, wherein the ticket alert causes a message to be displayed on the display of the remote subscriber portable computing device, the message comprising an electronic ticket presenting a location of a plurality of seats within the venue corresponding to the group seating available during the live event.

9. The method of claim 8, wherein the first list is further ranked with the microprocessor according to the personal relationships between originators of the requests.

10. The method of claim 9, wherein the personal relationships include at least one of friend relationships and family relationships.

11. The method of claim 10, wherein the transmission server transmits an arrival message over the wireless communication channel to the remote subscriber portable computing device, the arrival message advising if at least one of a friend and a family member has arrived during the live event.

12. The method of claim 11, wherein the arrival message further comprises a selectable option for participating in the seating optimization algorithm in order to provide a seat adjacent to the arrived friend or family member.

13. The method of claim 8, wherein the portable computing device comprises at least one of a mobile telephone, a satellite telephone, a pager, a personal digital assistant ("PDA"), a smartphone, a navigation device, a smartbook or reader, a media player, and a tablet Portable Computer ("PC").

14. The method of claim 13, wherein the first list is further ranked with the microprocessor according to personal relationships between originators of the requests.

15. The method of claim 14, wherein the personal relationships include at least one of friend relationships and family relationships.

* * * * *